(12) United States Patent
Denise

(10) Patent No.: US 8,661,087 B2
(45) Date of Patent: Feb. 25, 2014

(54) ELECTRONIC COMMUNICATION REMINDER TECHNOLOGY

(75) Inventor: Jason Adam Denise, Bowie, MD (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/493,674

(22) Filed: Jun. 11, 2012

(65) Prior Publication Data

US 2012/0246252 A1     Sep. 27, 2012

Related U.S. Application Data

(63) Continuation of application No. 13/244,370, filed on Sep. 24, 2011, now Pat. No. 8,224,917, which is a continuation of application No. 13/071,468, filed on Mar. 24, 2011, now Pat. No. 8,046,418, which is a continuation of application No. 12/822,173, filed on Sep. 14, 2010, now Pat. No. 7,921,174, which is a continuation of application No. 12/509,431, filed on Jul. 24, 2009.

(51) Int. Cl.
    *G06F 15/16*     (2006.01)

(52) U.S. Cl.
    USPC .......................................... 709/206; 709/207

(58) Field of Classification Search
    USPC ................................................ 709/206, 207
    See application file for complete search history.

(56) References Cited

U.S. PATENT DOCUMENTS

| | | |
|---|---|---|
| 5,384,832 A | 1/1995 | Zimmerman et al. |
| 5,694,616 A | 12/1997 | Johnson et al. |
| 5,818,447 A | 10/1998 | Wolf et al. |
| 5,878,230 A | 3/1999 | Weber et al. |
| 5,892,909 A | 4/1999 | Grasso et al. |
| 5,905,863 A | 5/1999 | Knowles et al. |
| 5,920,576 A | 7/1999 | Eaton et al. |
| 6,002,763 A | 12/1999 | Lester et al. |
| 6,040,781 A | 3/2000 | Murray |
| 6,073,133 A | 6/2000 | Chrabaszcz |
| 6,073,142 A | 6/2000 | Geiger et al. |
| 6,092,114 A | 7/2000 | Shaffer et al. |
| 6,108,688 A | 8/2000 | Nielsen |
| 6,122,353 A | 9/2000 | Brady et al. |
| 6,185,603 B1 | 2/2001 | Henderson et al. |
| 6,212,553 B1 | 4/2001 | Lee et al. |
| 6,215,859 B1 * | 4/2001 | Hanson ...................... 379/88.22 |

(Continued)

OTHER PUBLICATIONS

Androutsopoulos, An Experimental Comparison of Naive Bayesian and Keyword-Based Anti-Spam Filtering with Personal E-mail Messages, Jul. 2000, 8 pgs.

(Continued)

*Primary Examiner* — Kristie Shingles
(74) *Attorney, Agent, or Firm* — Morgan, Lewis & Bockius LLP

(57) ABSTRACT

Systems and methods concerning electronic communication reminder technology are disclosed. A receiving device having one or more processors and a memory storing one or more programs for execution by the one or more processors, receives a first electronic message addressed to a particular user, from a first sender, and in accordance with a determination that the particular user has not responded to the first electronic message, alerts the particular user, at a predefined time, to the first electronic message. The predefined time is determined based at least in part on response pattern data corresponding to one or more characteristics associated with the receiving device, the first electronic message, the particular user, or the first sender.

21 Claims, 41 Drawing Sheets

(56) References Cited

U.S. PATENT DOCUMENTS

| | | |
|---|---|---|
| 6,253,075 B1 | 6/2001 | Beghtol et al. |
| 6,272,532 B1 | 8/2001 | Feinleib |
| 6,317,488 B1 | 11/2001 | DePond et al. |
| 6,317,788 B1 | 11/2001 | Richardson |
| 6,353,778 B1 | 3/2002 | Brown |
| 6,396,497 B1 | 5/2002 | Reichlen |
| 6,408,177 B1 | 6/2002 | Parikh et al. |
| 6,449,492 B1 | 9/2002 | Kenagy et al. |
| 6,519,335 B1 | 2/2003 | Bushnell |
| 6,532,489 B1 | 3/2003 | Merchant |
| 6,565,608 B1 | 5/2003 | Fein et al. |
| 6,647,108 B1 | 11/2003 | Wurster et al. |
| 6,671,718 B1 | 12/2003 | Meister et al. |
| 6,687,745 B1 | 2/2004 | Franco et al. |
| 6,697,824 B1 | 2/2004 | Bowman-Amuah |
| 6,745,230 B1 | 6/2004 | Cao et al. |
| 6,751,485 B2 | 6/2004 | Ranta |
| 6,760,727 B1 | 7/2004 | Schroeder et al. |
| 6,799,163 B2 | 9/2004 | Nolan |
| 6,816,885 B1 | 11/2004 | Raghunandan |
| 6,823,368 B1 | 11/2004 | Ullmann et al. |
| 6,829,348 B1 | 12/2004 | Schroeder et al. |
| 6,859,213 B1 | 2/2005 | Carter |
| 6,871,214 B2 | 3/2005 | Parsons et al. |
| 6,912,564 B1 | 6/2005 | Appelman et al. |
| 6,968,364 B1 | 11/2005 | Wong et al. |
| 6,970,908 B1 | 11/2005 | Larky et al. |
| 7,007,066 B1 | 2/2006 | Malik |
| 7,054,905 B1 | 5/2006 | Hanna et al. |
| 7,092,743 B2 | 8/2006 | Vegh |
| 7,107,276 B2 | 9/2006 | Johnson, Jr. |
| 7,107,544 B1 | 9/2006 | Luke |
| 7,120,278 B2 | 10/2006 | Sukegawa et al. |
| 7,120,865 B1 | 10/2006 | Horvitz et al. |
| 7,146,402 B2 | 12/2006 | Kucherawy |
| 7,152,018 B2 | 12/2006 | Wicks |
| 7,209,953 B2 | 4/2007 | Brooks |
| 7,231,426 B1 | 6/2007 | Hall et al. |
| 7,233,229 B2 | 6/2007 | Stroupe et al. |
| 7,257,639 B1 | 8/2007 | Li et al. |
| 7,272,627 B2 | 9/2007 | Petrovykh |
| 7,284,033 B2 | 10/2007 | Jhanji |
| 7,327,834 B1 * | 2/2008 | Hiers et al. ............ 379/88.18 |
| 7,337,181 B2 | 2/2008 | Horvitz |
| 7,392,160 B2 | 6/2008 | Wicks |
| 7,401,122 B2 | 7/2008 | Chen |
| 7,413,085 B2 | 8/2008 | Zager et al. |
| 7,444,384 B2 | 10/2008 | Horvitz |
| 7,502,828 B2 | 3/2009 | Gardner |
| 7,506,263 B1 | 3/2009 | Johnston et al. |
| 7,565,403 B2 | 7/2009 | Horvitz et al. |
| 7,571,249 B2 | 8/2009 | Wu |
| 7,584,256 B2 | 9/2009 | Osborne et al. |
| 7,587,491 B2 | 9/2009 | Hinton |
| 7,603,420 B2 | 10/2009 | Doan et al. |
| 7,627,640 B2 | 12/2009 | Gardner et al. |
| 7,640,507 B2 * | 12/2009 | Bedingfield, Sr. ............ 715/752 |
| 7,673,002 B1 | 3/2010 | Damarla |
| 7,693,940 B2 | 4/2010 | Carmel et al. |
| 7,720,923 B2 | 5/2010 | Lipton et al. |
| 7,752,279 B2 | 7/2010 | Hardy et al. |
| 7,774,417 B2 | 8/2010 | Callanan et al. |
| 7,788,326 B2 | 8/2010 | Buchheit et al. |
| 7,895,277 B2 * | 2/2011 | Drory et al. ............ 709/206 |
| 8,190,213 B2 | 5/2012 | Sierawski |
| 8,296,376 B2 * | 10/2012 | Goldberg et al. ............ 709/206 |
| 2001/0034769 A1 | 10/2001 | Rast |
| 2002/0029247 A1 | 3/2002 | Kawamoto |
| 2002/0046250 A1 | 4/2002 | Nassiri |
| 2002/0116466 A1 | 8/2002 | Trevithick et al. |
| 2002/0120600 A1 | 8/2002 | Schiavone et al. |
| 2002/0120702 A1 | 8/2002 | Schiavone et al. |
| 2002/0159575 A1 | 10/2002 | Skladman et al. |
| 2003/0014491 A1 | 1/2003 | Horvitz et al. |
| 2003/0037117 A1 | 2/2003 | Tabuchi |
| 2003/0182323 A1 | 9/2003 | Demsky et al. |
| 2003/0195937 A1 | 10/2003 | Kircher, Jr. et al. |
| 2003/0204569 A1 | 10/2003 | Andrews et al. |
| 2004/0006598 A1 | 1/2004 | Damm et al. |
| 2004/0039630 A1 | 2/2004 | Begole et al. |
| 2004/0054737 A1 | 3/2004 | Daniell |
| 2004/0068545 A1 | 4/2004 | Daniell et al. |
| 2004/0073616 A1 | 4/2004 | Fellenstein et al. |
| 2004/0083191 A1 | 4/2004 | Ronnewinkel et al. |
| 2004/0103162 A1 | 5/2004 | Meister et al. |
| 2004/0114735 A1 | 6/2004 | Arning et al. |
| 2004/0114747 A1 | 6/2004 | Trandal et al. |
| 2004/0128357 A1 | 7/2004 | Giles et al. |
| 2004/0143569 A1 | 7/2004 | Gross et al. |
| 2004/0158607 A1 | 8/2004 | Coppinger et al. |
| 2004/0162879 A1 | 8/2004 | Arcuri et al. |
| 2004/0181587 A1 | 9/2004 | Cao et al. |
| 2004/0220925 A1 | 11/2004 | Liu et al. |
| 2004/0243676 A1 | 12/2004 | Blankenship |
| 2004/0243679 A1 | 12/2004 | Tyler |
| 2004/0249890 A1 | 12/2004 | Fellenstein et al. |
| 2005/0076085 A1 | 4/2005 | Budd et al. |
| 2005/0108336 A1 | 5/2005 | Naick et al. |
| 2005/0132066 A1 | 6/2005 | Heilmann |
| 2005/0197138 A1 | 9/2005 | Kaminsky et al. |
| 2005/0204001 A1 | 9/2005 | Stein et al. |
| 2005/0204009 A1 | 9/2005 | Hazarika et al. |
| 2005/0223062 A1 | 10/2005 | Doan et al. |
| 2005/0223066 A1 | 10/2005 | Buchheit et al. |
| 2005/0228774 A1 | 10/2005 | Ronnewinkel |
| 2005/0228790 A1 | 10/2005 | Ronnewinkel et al. |
| 2005/0229150 A1 | 10/2005 | Ronnewinkel |
| 2005/0262203 A1 | 11/2005 | Buchheit et al. |
| 2005/0276277 A1 | 12/2005 | Pace |
| 2006/0010217 A1 | 1/2006 | Sood |
| 2006/0012563 A1 | 1/2006 | Fyke et al. |
| 2006/0031309 A1 | 2/2006 | Luoffo et al. |
| 2006/0031310 A1 | 2/2006 | Lee |
| 2006/0031358 A1 | 2/2006 | Canis |
| 2006/0036748 A1 * | 2/2006 | Nusbaum et al. ............ 709/228 |
| 2006/0046694 A1 | 3/2006 | Yu |
| 2006/0075228 A1 | 4/2006 | Black et al. |
| 2006/0089972 A1 | 4/2006 | Malik |
| 2006/0101126 A1 | 5/2006 | Huang |
| 2006/0126806 A1 | 6/2006 | Trandal et al. |
| 2006/0133590 A1 | 6/2006 | Jiang |
| 2006/0149819 A1 | 7/2006 | Auhagen |
| 2006/0150088 A1 | 7/2006 | Kraft et al. |
| 2006/0168065 A1 | 7/2006 | Martin |
| 2006/0168074 A1 | 7/2006 | Gardner et al. |
| 2006/0184584 A1 | 8/2006 | Dunn et al. |
| 2006/0248579 A1 | 11/2006 | Gerritsen et al. |
| 2006/0259556 A1 | 11/2006 | Auhagen |
| 2006/0282575 A1 | 12/2006 | Schultz et al. |
| 2007/0001820 A1 | 1/2007 | Luo |
| 2007/0022172 A1 | 1/2007 | Anglin et al. |
| 2007/0032225 A1 | 2/2007 | Konicek et al. |
| 2007/0036301 A1 | 2/2007 | Voticky et al. |
| 2007/0037605 A1 | 2/2007 | Logan |
| 2007/0043822 A1 | 2/2007 | Brumfield |
| 2007/0061403 A1 | 3/2007 | Seaburg |
| 2007/0072016 A1 | 3/2007 | Irani |
| 2007/0073686 A1 | 3/2007 | Brooks et al. |
| 2007/0094217 A1 | 4/2007 | Ronnewinkel |
| 2007/0130369 A1 | 6/2007 | Nayak |
| 2007/0143425 A1 | 6/2007 | Kieselbach et al. |
| 2007/0143428 A1 | 6/2007 | Kumar et al. |
| 2007/0188465 A1 | 8/2007 | Lee et al. |
| 2007/0203997 A1 | 8/2007 | Ingerman et al. |
| 2007/0250585 A1 | 10/2007 | Ly et al. |
| 2007/0259685 A1 | 11/2007 | Engblom et al. |
| 2007/0271345 A1 | 11/2007 | Callanan et al. |
| 2007/0288575 A1 | 12/2007 | Gillum et al. |
| 2007/0299923 A1 | 12/2007 | Skelly et al. |
| 2008/0036623 A1 | 2/2008 | Rosen |
| 2008/0057926 A1 | 3/2008 | Forstall et al. |
| 2008/0065736 A1 | 3/2008 | Gross |
| 2008/0091786 A1 | 4/2008 | Jhanji |
| 2008/0114838 A1 | 5/2008 | Taylor |

(56) References Cited

U.S. PATENT DOCUMENTS

| | | |
|---|---|---|
| 2008/0126951 A1 | 5/2008 | Sood et al. |
| 2008/0132290 A1 | 6/2008 | Sharabi et al. |
| 2008/0137913 A1 | 6/2008 | Hildreth |
| 2008/0147816 A1 | 6/2008 | Damm et al. |
| 2008/0208980 A1 | 8/2008 | Champan et al. |
| 2008/0235335 A1 | 9/2008 | Hintermeister et al. |
| 2009/0063674 A1 | 3/2009 | Brillhart et al. |
| 2009/0070704 A1 | 3/2009 | Ording |
| 2009/0070705 A1 | 3/2009 | Ording |
| 2009/0073194 A1 | 3/2009 | Ording |
| 2009/0077178 A1 | 3/2009 | Callanan et al. |
| 2009/0077488 A1 | 3/2009 | Ording |
| 2009/0106375 A1 | 4/2009 | Carmel et al. |
| 2009/0119600 A1* | 5/2009 | O'Sullivan et al. ........... 715/745 |
| 2009/0125602 A1 | 5/2009 | Bhatia et al. |
| 2009/0132659 A1 | 5/2009 | Facemire et al. |
| 2009/0172176 A1 | 7/2009 | Regnier |
| 2009/0182830 A1 | 7/2009 | Goldman et al. |
| 2009/0228583 A1 | 9/2009 | Pocklington et al. |
| 2009/0249252 A1 | 10/2009 | Lundy et al. |
| 2009/0254624 A1 | 10/2009 | Baudin et al. |
| 2009/0319314 A1 | 12/2009 | Good et al. |
| 2009/0319619 A1 | 12/2009 | Affronti et al. |
| 2010/0017475 A1 | 1/2010 | Colson et al. |
| 2010/0017484 A1 | 1/2010 | Accapadi et al. |
| 2010/0017701 A1 | 1/2010 | Bargeron et al. |
| 2010/0036917 A1 | 2/2010 | McCaffrey et al. |
| 2010/0057879 A1 | 3/2010 | Buchheit et al. |
| 2010/0064017 A1 | 3/2010 | Buchheit et al. |
| 2010/0100436 A1 | 4/2010 | Phifer et al. |
| 2010/0138377 A1 | 6/2010 | Wright et al. |
| 2010/0138553 A1 | 6/2010 | Yuan et al. |
| 2010/0169264 A1* | 7/2010 | O'Sullivan et al. ............. 706/52 |
| 2010/0191637 A1 | 7/2010 | Alderucci et al. |
| 2010/0205246 A1 | 8/2010 | Collins |
| 2010/0205476 A1 | 8/2010 | Burgoyne et al. |
| 2010/0211644 A1 | 8/2010 | Lavoie et al. |
| 2010/0229172 A1 | 9/2010 | Burns et al. |
| 2010/0250682 A1* | 9/2010 | Goldberg et al. ............. 709/206 |
| 2010/0332602 A1* | 12/2010 | O'Sullivan et al. ........... 709/206 |

OTHER PUBLICATIONS

Bellotti, Quality Versus Quantity: E-Mail-Centric Task Management and Its Relation With Overload, Human Computer Interaction, 2005, vol. 20, pp. 89-138.

Dredze, Intelligent Email: Aiding Users with AI, 2009, 250 pgs.

Geyer, Activity Explorer: Activity-centric collaboration from research to product, 2006, pp. 713-738.

Gwizdka, Reinventing the Inbox—Supporting the Management of Pending Tasks in Email, Apr. 20-25, 2002, 2 pgs.

Hershkop, Behavior-based Email Analysis with Application to Spam Detection, 2006, 229 pgs.

Neustaedter, Beyond "From" and "Received": Exploring the Dynamics of Email Triage, Apr. 2-7, 2005, pp. 1977-1980.

Sahami, A Bayesian Approach to Filtering Junk E-mail, 1998, 8 pgs.

Whitworth, Channel E-mail: A Sociotechnical Response to Spam, IEEE, Jul. 2009, pp. 63-71.

\* cited by examiner

400

| | Type | Response Rate | Response Time | Response Date/Time |
|---|---|---|---|---|
| 450 | Sender | 75% | 2 Hours | 7 PM – 10 PM |
| 452 | Group | 65% | 30 Minutes | Monday – Friday; 8 AM – 6 PM |
| 454 | Content | 95% | 4 Hours | Monday – Friday; 8 AM – 10 AM |
| 456 | Medium | 55% | 1 Minute | Saturday; Sunday 1PM – 6PM |
| 458 | Priority | 85% | 10 Minutes | Monday – Friday; 8 AM – 6 PM |
| 460 | Address Line | 10% | 4 Days | No Pattern |
| 462 | Message String | 20% | 1 Hours | No Pattern |
| 464 | Other Recipients | 10% | 7 Days | Monday; 8 AM – 9 AM |
| 466 | Device | 5% | 5 Minutes | Saturday; 7 AM – 11 PM |
| 468 | Size | 90% | 1 Day | No Pattern |

Columns: 410 Type, 420 Response Rate, 430 Response Time, 440 Response Date/Time

| Type | Forward Rate | Forward Time | Forward Date/Time |
|---|---|---|---|
| Sender | 75% | 2 Hours | 7 PM – 10 PM |
| Group | 65% | 30 Minutes | Monday – Friday; 8 AM – 6 PM |
| Content | 95% | 4 Hours | Monday – Friday; 8 AM – 10 AM |
| Medium | 55% | 1 Minute | Saturday; Sunday 1PM – 6PM |
| Priority | 85% | 10 Minutes | Monday – Friday; 8 AM – 6 PM |
| Address Line | 10% | 4 Days | No Pattern |
| Message String | 20% | 1 Hours | No Pattern |
| Other Recipients | 10% | 7 Days | Monday; 8 AM – 9 AM |
| Device | 5% | 5 Minutes | Saturday; 7 AM – 11 PM |
| Size | 90% | 1 Day | No Pattern |

| Type | Outgoing Communication Time | Outgoing Date/Time |
|---|---|---|
| Sender | 2 Hours | 7 PM – 10 PM |
| Group | 30 Minutes | Monday – Friday; 8 AM – 6 PM |
| Content | 4 Hours | Monday – Friday; 8 AM – 10 AM |
| Medium | 1 Minute | Saturday; Sunday 1PM – 6PM |

Fig. 39

ELECTRONIC COMMUNICATION REMINDER TECHNOLOGY

RELATED APPLICATION

This application is a continuation of U.S. application Ser. No. 13/244,370, filed Sep. 24, 2011 now U.S. Pat. No. 8,224, 917, which is a continuation of U.S. application Ser. No. 13/071,468, filed Mar. 24, 2011, now U.S. Pat. No. 8,046,418, which is a continuation of Ser. No. 12/882,173, filed Sep. 14, 2010, now U.S. Pat. No. 7,921,174, which is a continuation of U.S. application Ser. No. 12/509,431, filed Jul. 24, 2009, which are incorporated herein by reference in their entirety.

BACKGROUND

This application relates to electronic communication reminder technology.

Electronic communication devices may be configured to receive electronic communications and provide output to users based on received electronic communications. Users may use the electronic communication devices to respond to received electronic communications.

SUMMARY

Implementations of the described techniques may include hardware, a method or process implemented at least partially in hardware, or a computer-readable storage medium encoded with executable instructions that, when executed by a processor, perform operations.

The details of one or more implementations are set forth in the accompanying drawings and the description below. Other features will be apparent from the description and drawings, and from the claims.

DESCRIPTION OF DRAWINGS

FIGS. 4, 35, and 39 illustrate example data structures.

DETAILED DESCRIPTION

Figure 1:
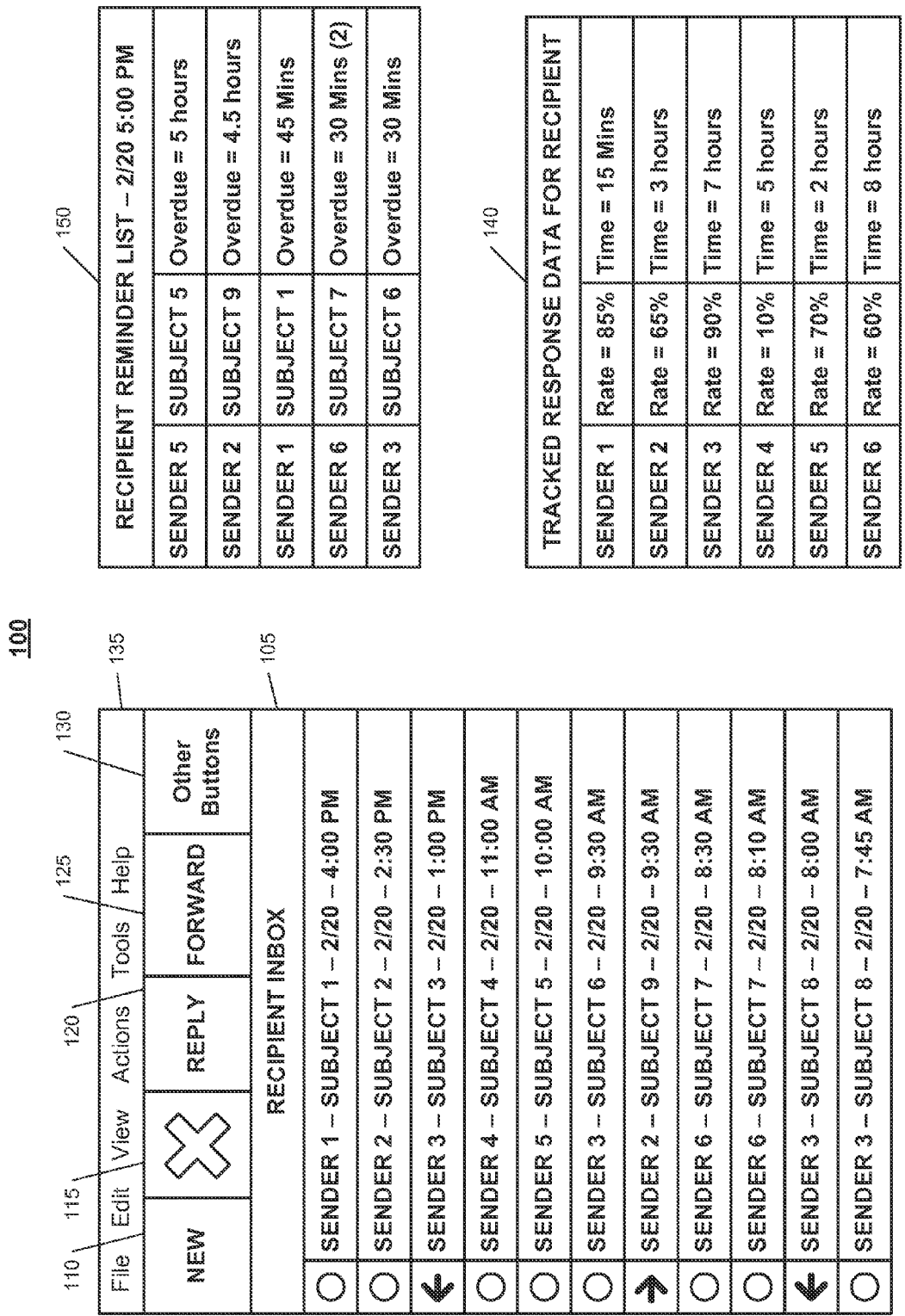
FIGS. 1, 6-15, 17, 19, 20, 22-29, 31-33, 37, and 41 illustrate example diagrams.

Techniques are described for providing reminders related to electronic communications. With the proliferation of electronic communication technology, users are able to communicate with other users with relative ease, over great distances, and at a high frequency. Based on the ease of electronic communication, the volume of communications exchanged between users has increased and at least some users receive a large number of communications at a high rate. Given the volume of communications, the users may have difficulty managing the communications and efficiently responding to all communications for which a response is desired. In the context of electronic mail, some users have electronic mail inboxes that have a large number of messages, that are unmanageable, and that are a place where electronic mail messages become lost or forgotten if not handled soon after reading the electronic mail message. To assist users with managing a high volume of communications and providing timely responses, response reminders may be automatically provided to a user for stale communications that may have been lost or forgotten.

In certain circumstances, providing a large number of response reminders all at the same time or spacing may add to the problem of managing a large volume of communications and may not effectively alert users to important communications. Accordingly, to better focus automatically set response reminders, the response reminders may be automatically provided to a user based on the user's past communication activity. In this regard, timing of response reminders may be set based on a time the user typically takes to respond to certain types of messages. Also, response reminders may be set for certain types of messages to which the user typically responds, but not set for certain types of messages to which the user typically does not respond. Using the user's past communication activity in setting reminders may enhance the quality of the reminders provided and assist the user in responding to more important communications.

In some implementations, reminders are set based on past communication history of a user for particular types of communications. In these implementations, a reminder may be set based on prior sending rates, sending timing, response rates, and/or response timing by the user for particular types of communications. The reminders may be reminders to send a particular type of communication and/or reminders to respond to a particular type of communication. The reminders may be applicable to any communication medium, such as electronic mail (email) messages, text or Short Message Service (SMS) messages, instant messages (IM), voice telephone calls, etc.

For example, a communication system may track how a user responds to received communications and sets reminders for new communications based on the tracked response patterns of the user. In the email context, the system tracks how long it takes the user to respond to particular types of email messages and provides a reminder based on a time it typically takes the user to respond to a particular type of a newly-received email. For instance, if the system determines that the user typically responds to a particular sender's email messages within one day, the system provides a reminder to the user when the system determines that the user has received an email message from the particular sender and the user has not responded within one day.

In some implementations, the system considers a percentage of time the user responds to particular types of communications in determining whether to set a reminder at all for a newly-received communication. In these implementations, if the system determines that the user responds to communications from a first sender less than fifty percent of the time, the system determines not to set a reminder for a new communication received from the first sender. If the system determines that the user responds to communications from a first sender more than fifty percent of the time, the system determines to set a reminder for a new communication received from the first sender.

In some examples, the system may consider other types of communications in addition to or instead of a sender of the communication. In these examples, the system may consider content of received messages in tracking and evaluating past communication history. For instance, if the system determines that the user typically responds to shipping notices within two hours, the system sets a reminder for a shipping notice for two hours from receipt, even if a sender of the shipping notice is different than prior senders of shipping notices.

The electronic communication reminder technology described throughout this document may assist people with managing business and personal communications. For example, if the system determines that the user typically responds to emails from the user's boss within one hour, a reminder for an email received from the user's boss is set to one hour after receipt or user perception of the boss's email. The system helps keep track of electronic business communications, ensures that the user responds to electronic business communications in a timely manner, and helps the user manage the user's received communications. In another example, if the system determines that the user typically responds to emails from the user's friend within one week, a reminder for an email received from the user's friend is set to a week after receipt or user perception of the friend's email. In this regard, the system tracks communication behavior for personal relationships and ensures that communications between friends/family, etc. do not lapse for too long.

FIG. 1 is a diagram 100 that illustrates an example of providing communication reminders. As shown, a graphical user interface of an electronic mail (email) system includes an email inbox 105 for a user. The email inbox 105 includes a list of displayed representations of emails received for the user. Each displayed representation includes a sender name of a sender of the email, a subject of the email, and a day/time of receipt of the email. Each displayed representation includes an activity indicator that shows whether the user has responded to the email, the user has forwarded the email, or whether the user has taken no action with respect to the email. The list of representations of received email in the email inbox 105 is ordered based on time of receipt of the emails. Other information may be displayed in the email inbox 105 and other types of ordering may be used.

The graphical user interface of the email system also includes controls for handling emails using the email system. For example, the graphical user interface includes a new control 110, a delete control 115, a reply control 120, and a forward control 125. The new control 110 enables the user to send a new email message when the new control 110 is selected. The delete control 115 enables the user to delete an email included in the user's email inbox 105 when the delete control 115 is selected. The reply control 120 enables the user to respond to an email included in the user's email inbox 105 when the reply control 120 is selected. The forward control 125 enables the user to forward an email included in the user's email inbox 105 when the forward control 125 is selected. Other control buttons 130 may be provided in the graphical user interface of the email system. The graphical user interface of the email system further includes a menu list 135 that includes other input controls that enable a user to control the email system.

The diagram 100 also shows tracked response data 140 for the user associated with the email inbox 105. The tracked response data 140 includes data generated by the email system monitoring past response behavior of the user and identifying response patterns of the user based on the monitoring. The tracked response data 140 is stored in electronic storage (e.g., any type of computer-readable storage medium, such as a hard disk, memory, etc.). The tracked response data 140 is updated as the user responds to additional emails.

As shown, the tracked response data 140 includes past response behavior of the user by sender of the email. For each sender, the tracked response data 140 includes a response rate of the user and a response time of the user. The response rate indicates how frequently the user responds to email messages from a particular sender. For instance, the response rate may be a percentage computed by dividing a number of past email messages received from a particular sender for which the user responded by a total number of past email messages received from the particular sender. As one example, the user has responded to 90% of email messages received from Sender 3 (e.g., the email system determines that the user has received 10 email messages from Sender 3 and responded to nine of them). As another example, the user has responded to 10% of email messages received from Sender 4 (e.g., the email system determines that the user has received 10 email messages from Sender 4 and responded to one of them).

The response time data indicates how quickly the user typically responds to email messages from a particular sender. For instance, the response time may be computed by determining a response delay each time the user responds to an email message from the particular sender and computing a running average of the determined response delays. As one example, the user has responded to email messages received from Sender I on average in 15 minutes (e.g., the email system determines that the user has responded to three email messages from Sender I with response times of 5 minutes, 10 minutes, and 30 minutes, respectively). As another example, the user has responded to email messages received from Sender 6 on average in 8 hours (e.g., the email system determines that the user has responded to four email messages from Sender 1 with response times of one hour, one day (i.e., 24 hours), five hours, and two hours, respectively).

The email system uses the tracked response data 140 to generate a response reminder list 150. The response reminder list 150 displays a list of response reminders for email messages included in the email inbox 105 for which a response is overdue according to the user's past response behavior as reflected by the tracked response data 140. The response reminder list 150 is ordered based on an amount of time responses to the email messages arc overdue, which may differ than an order based on time of receipt of the email messages. The response reminder list 150 may be displayed each time the user begins using the email system (e.g., logs on, starts an email program, etc.), each time the user controls an input device to initiate a new email message or new reply email message, each time the user controls an input device to hover over a graphical control (e.g., button) that initiates a new email message or new reply email message, and/or each time a new reminder is added to the list 150 based on a response becoming overdue or a response deadline approaching.

As shown, for the first email message included at the top of the email inbox 105, the email system has automatically set a response reminder for 4:15 PM on Feb. 20, 2009. More specifically, when the first email message is received, the email system compares the sender of the first email message (Sender 1) to the tracked response data 140, identifies a record corresponding to Sender 1, and accesses the response rate data and response time data included in the identified record. The email system determines whether to set a response reminder for the first email message by comparing the accessed response rate data to a response rate threshold (e.g., 50%, 25%, etc.). In this example, the email system determines, based on the comparison, that the response rate of the user for email messages received from Sender I (i.e., 85%) is greater than the response rate threshold and that a response reminder should be set for the first email message.

In response to determining that a response reminder should be set, the email system determines a response reminder time at which to provide the response reminder for the first email message using the accessed response time data. In this regard, the email system determines that the first email message was received at 4:00 PM on Feb. 20, 2009 and the accessed response time data indicates that the user typically responds to email messages from Sender I in 15 minutes. The email system then adds 15 minutes to the determined 4:00 PM time of receipt and automatically, without human intervention, sets a response reminder time for the first email message as 4:15 PM on Feb. 20, 2009.

Based on the automatically set response reminder time for the first email message (i.e., 4:15 PM), the email system determines that, at 5:00 PM on Feb. 20, 2009 when the response reminder list 150 is being displayed, a response for the first email message is 45 minutes overdue. Accordingly, the email system displays a reminder entry in the response reminder list 150 (i.e., the third entry in the list as shown) for the first email message. The displayed reminder entry indicates that the first email message was sent by Sender 1, has a subject of Subject 1, and that a response to the first email message is overdue by 45 minutes. Other information may be displayed in the reminder entry and other types of reminders may be provided in addition to (or instead of) the response reminder list 150.

For the second email message included in the email inbox 105, the email system has automatically set a response reminder for 5:30 PM on Feb. 20, 2009. More specifically, when the second email message is received, the email system compares the sender of the first email message (Sender 2) to the tracked response data 140, identifies a record corresponding to Sender 2, and accesses the response rate data and response time data included in the identified record. The email system determines whether to set a response reminder for the second email message by comparing the accessed response rate data to a response rate threshold (e.g., 50%, 25%, etc.). In this example, the email system determines, based on the comparison, that the response rate of the user for email messages received from Sender 2 (i.e., 65%) is greater than the response rate threshold and that a response reminder should be set for the second email message.

In response to determining that a response reminder should be set, the email system determines a response reminder time at which to provide the response reminder for the second email message using the accessed response time data. In this regard, the email system determines that the second email message was received at 2:30 PM on Feb. 20, 2009 and the accessed response time data indicates that the user typically responds to email messages from Sender 2 in 3 hours. The email system then adds 3 hours to the determined 2:30 PM time of receipt and automatically, without human intervention, sets a response reminder time for the second email message as 5:30 PM on Feb. 20, 2009.

Based on the automatically set response reminder time for the second email message (i.e., 5:30 PM), the email system determines that, at 5:00 PM on Feb. 20, 2009 when the response reminder list 150 is being displayed, a response for the second email message is not yet overdue. Accordingly, the email system does not include a reminder entry in the response reminder list 150 corresponding to the second email message because, in this implementation, the response reminder list 150 includes entries corresponding to email messages for which a response is overdue.

In other implementations, the response reminder list 150 may include reminder entries corresponding to email messages for which a response is not yet due. In these implementations, the email system may distinguish, in the response reminder list 150, the reminder entries corresponding to overdue responses from reminder entries corresponding to responses that are not yet due. For example, the email system may display an overdue time for reminder entries corresponding to overdue responses (as shown in FIG. 1) and display a "due in" time for reminder entries corresponding to responses that are not yet due. The email system also may display reminder entries corresponding to overdue responses in a first color (e.g., red) and display reminder entries corresponding to responses that are not yet due in a second color (e.g., green). The email system further may display separate reminder lists for overdue responses and responses that are not yet due.

In implementations in which a reminder list includes entries for responses that are not yet due, the email system may display entries for only a subset of the reminders for which a response is not yet due. For example, the email system may only include reminders for which a response is due within a threshold period of time (e.g., 1 day, 1 hour, etc.). In this example, the email system determines a time at which a response reminder is due, a current time, and whether a period of time between the current time and the time at which the response reminder is due exceeds the threshold. In response to a determination that the period of time exceeds the threshold, the email system determines not to include an entry corresponding to the response reminder in the response reminder list. In response to a determination that the period of time is less than the threshold, the email system determines to include an entry corresponding to the response reminder in the response reminder list. Limiting the response reminder list to response reminders that have deadlines that are approaching may assist a user in prioritizing email messages to which to respond.

Referring again to FIG. 1, for the third email message included in the email inbox 105, the email system has cancelled a reminder set for the third email message because the user has already responded to the third email message. More specifically, when the third email message is received, the email system compares the sender of the third email message (Sender 3) to the tracked response data 140, identifies a record corresponding to Sender 3, and accesses the response rate data and response time data included in the identified record. The email system determines whether to set a response reminder for the third email message by comparing the accessed response rate data to a response rate threshold (e.g., 50%, 25%, etc.). In this example, the email system determines, based on the comparison, that the response rate of the user for email messages received from Sender 3 (i.e., 90%) is greater than the response rate threshold and that a response reminder should be set for the third email message.

In response to determining that a response reminder should be set, the email system determines a response reminder time at which to provide the response reminder for the third email message using the accessed response time data. In this regard, the email system determines that the third email message was received at 1:00 PM on Feb. 20, 2009 and the accessed response time data indicates that the user typically responds to email messages from Sender 3 in 7 hours. The email system then adds 7 hours to the determined 1:00 PM time of receipt and automatically, without human intervention, sets a response reminder time for the third email message as 8:00 PM on Feb. 20, 2009.

After setting the response reminder time for the third email message, the email system monitors actions of the user with respect to the third email message. In this example, the email system detects that the user responds to the third email message based on the monitored actions of the user. In response to a detection that the user has responded to the third email message, the email system cancels the automatically set reminder for the third email message. As such, the email system does not provide a reminder for the third email message to the user at 8:00 PM on Feb. 20, 2009. In this regard, if the response reminder list 150 was displayed at 8:00 PM on Feb. 20, 2009 or later, a reminder entry for the third email message would be absent from the response reminder list 150.

For the fourth email message included in the email inbox 105, the email system has determined not to set a response reminder for the fourth email message because the user responds to email messages from the sender of the fourth email message at a relatively low rate. More specifically, when the fourth email message is received, the email system compares the sender of the fourth email message (Sender 4) to the tracked response data 140, identifies a record corresponding to Sender 4, and accesses the response rate data. The email system determines whether to set a response reminder for the fourth email message by comparing the accessed response rate data to a response rate threshold (e.g., 50%, 25%, etc.). In this example, the email system determines, based on the comparison, that the response rate of the user for email messages received from Sender 4 (i.e., 10%) is less than the response rate threshold and that a response reminder should not be set for the fourth email message. In response to determining that a response reminder should not be set for the fourth email message, the email system handles the fourth email message without setting or otherwise providing a reminder.

For the fifth email message included in the email inbox 105, the email system has automatically set a response reminder for 12:00 PM on Feb. 20, 2009. More specifically, when the fifth email message is received, the email system compares the sender of the fifth email message (Sender 5) to the tracked response data 140, identifies a record corresponding to Sender 5, and accesses the response rate data and response time data included in the identified record. The email system determines whether to set a response reminder for the fifth email message by comparing the accessed response rate data to a response rate threshold (e.g., 50%, 25%, etc.). In this example, the email system determines, based on the comparison, that the response rate of the user for email messages received from Sender 5 (i.e., 70%) is greater than the response rate threshold and that a response reminder should be set for the fifth email message.

In response to determining that a response reminder should be set, the email system determines a response reminder time at which to provide the response reminder for the fifth email message using the accessed response time data. In this regard, the email system determines that the fifth email message was received at 10:00 AM on Feb. 20, 2009 and the accessed response time data indicates that the user typically responds to email messages from Sender 5 in 2 hours. The email system then adds 2 hours to the determined 10:00 AM time of receipt and automatically, without human intervention, sets a response reminder time for the fifth email message as 12:00 PM on Feb. 20, 2009.

Based on the automatically set response reminder time for the fifth email message (i.e., 12:00 PM), the email system determines that, at 5:00 PM on Feb. 20, 2009 when the response reminder list 150 is being displayed, a response for the fifth email message is 5 hours overdue. Accordingly, the email system displays a reminder entry in the response reminder list 150 (i.e., the first entry in the list as shown) for the fifth email message. The displayed reminder entry indicates that the fifth email message was sent by Sender 5, has a subject of Subject 5, and that a response to the fifth email message is overdue by 5 hours. Other information may be displayed in the reminder entry and other types of reminders may be provided in addition to (or instead of) the response reminder list 150.

For the sixth email message included in the email inbox 105, the email system has automatically set a response reminder for 4:30 PM on Feb. 20, 2009. More specifically, when the sixth email message is received, the email system compares the sender of the sixth email message (Sender 3) to the tracked response data 140, identifies a record corresponding to Sender 3, and accesses the response rate data and response time data included in the identified record. The email system determines whether to set a response reminder for the sixth email message by comparing the accessed response rate data to a response rate threshold (e.g., 50%, 25%, etc.). In this example, the email system determines, based on the comparison, that the response rate of the user for email messages received from Sender 3 (i.e., 90%) is greater than the response rate threshold and that a response reminder should be set for the sixth email message.

In response to determining that a response reminder should be set, the email system determines a response reminder time at which to provide the response reminder for the sixth email message using the accessed response time data. In this regard, the email system determines that the sixth email message was received at 9:30 AM on Feb. 20, 2009 and the accessed response time data indicates that the user typically responds to email messages from Sender 3 in 7 hours. The email system then adds 7 hours to the determined 9:30 AM time of receipt and automatically, without human intervention, sets a response reminder time for the sixth email message as 4:30 PM on Feb. 20, 2009.

Based on the automatically set response reminder time for the sixth email message (i.e., 4:30 PM), the email system determines that, at 5:00 PM on Feb. 20, 2009 when the response reminder list 150 is being displayed, a response for the sixth email message is 30 minutes overdue. Accordingly, the email system displays a reminder entry in the response reminder list 150 (i.e., the fifth entry in the list as shown) for the sixth email message. The displayed reminder entry indicates that the sixth email message was sent by Sender 3, has a subject of Subject 6, and that a response to the sixth email message is overdue by 30 minutes. Other information may be displayed in the reminder entry and other types of reminders may be provided in addition to (or instead of) the response reminder list 150.

For the seventh email message included in the email inbox 105, the email system has automatically set a response reminder for 12:30 PM on Feb. 20, 2009. More specifically, when the seventh email message is received, the email system compares the sender of the seventh email message (Sender 2) to the tracked response data 140, identifies a record corresponding to Sender 2, and accesses the response rate data and response time data included in the identified record. The email system determines whether to set a response reminder for the seventh email message by comparing the accessed response rate data to a response rate threshold (e.g., 50%, 25%, etc.). In this example, the email system determines, based on the comparison, that the response rate of the user for email messages received from Sender 2 (i.e., 65%) is greater than the response rate threshold and that a response reminder should be set for the seventh email message.

In response to determining that a response reminder should be set, the email system determines a response reminder time at which to provide the response reminder for the seventh email message using the accessed response time data. In this regard, the email system determines that the seventh email message was received at 9:30 AM on Feb. 20, 2009 and the accessed response time data indicates that the user typically responds to email messages from Sender 2 in 3 hours. The email system then adds 3 hours to the determined 9:30 AM time of receipt and automatically, without human intervention, sets a response reminder time for the seventh email message as 12:30 PM on Feb. 20, 2009.

Based on the automatically set response reminder time for the seventh email message (i.e., 12:30 PM), the email system determines that, at 5:00 PM on Feb. 20, 2009 when the response reminder list 150 is being displayed, a response for the seventh email message is four hours and 30 minutes overdue. Accordingly, the email system displays a reminder entry in the response reminder list 150 (i.e., the second entry in the list as shown) for the seventh email message. The displayed reminder entry indicates that the seventh email message was sent by Sender 2, has a subject of Subject 9, and that a response to the seventh email message is overdue by four hours and 30 minutes. Other information may be displayed in the reminder entry and other types of reminders may be provided in addition to (or instead of) the response reminder list 150.

The response reminder for the seventh email message is set and remains active despite the user having forwarded the seventh email message. Accordingly, unlike replying to the seventh email message (or deleting the seventh email message), the user action of forwarding the seventh email message does not impact the response reminder when detected by the email system. In some implementations, when the email system detects a forwarding action related to an email message, the email system modifies a reminder time of a reminder associated with the forwarded email. In these implementations, the email system may extend the reminder time based on detection of the forwarding action because the forwarding action indicates that the user has viewed the message and is taking action to handle the message.

For the eighth and ninth email messages included in the email inbox 105, the email system has automatically set a single response reminder for 4:30 PM on Feb. 20, 2009. More specifically, when the ninth email message is received, the email system compares the sender of the ninth email message (Sender 6) to the tracked response data 140, identifies a record corresponding to Sender 6, and accesses the response rate data and response time data included in the identified record. The email system determines whether to set a response reminder for the ninth email message by comparing the accessed response rate data to a response rate threshold (e.g., 50%, 25%, etc.). In this example, the email system determines, based on the comparison, that the response rate of the user for email messages received from Sender 6 (i.e., 60%) is greater than the response rate threshold and that a response reminder should be set for the ninth email message.

In response to determining that a response reminder should be set, the email system determines a response reminder time at which to provide the response reminder for the ninth email message using the accessed response time data. In this regard, the email system determines that the ninth email message was received at 8:10 AM on Feb. 20, 2009 and the accessed response time data indicates that the user typically responds to email messages from Sender 6 in 8 hours. The email system then adds 8 hours to the determined 8:10 AM time of receipt and automatically, without human intervention, sets a response reminder time for the ninth email message as 4:10 PM on Feb. 20, 2009.

Subsequent to setting the reminder for the ninth email message, the email system receives the eighth email message. In response to receiving the eighth email message, the email system compares the sender (Sender 6) and subject (Subject 7) of the eighth email message to the response reminders included in the response reminder list 150 and identifies a reminder corresponding to Sender 6 and Subject 7 in the response reminder list 150. Based on the identified reminder that exists for the sender (Sender 6) and subject (Subject 7) of the eighth email message, the email system determines to modify the set reminder based on receipt of the eighth email message, rather than setting another reminder for the eighth email message.

To modify the set reminder, the email system compares the sender of the eighth email message (Sender 6) to the tracked response data 140, identifies a record corresponding to Sender 6, and accesses the response time data included in the identified record. In some examples, the email system determines not to analyze the response rate data for Sender 6 because a reminder has already been set for an email message received from Sender 6. Using the accessed response time data, the email system determines that a response reminder for the eighth email message should be set at 4:30 PM. Accordingly, the email system changes the set reminder time from 4:10 PM to 4:30 PM. The email system also may modify the reminder time by computing a new reminder time that accounts for both the reminder time of the eighth email message and the reminder time of the ninth email message (e.g., an average).

In some implementations of handling multiple messages from the same sender and/or having the same subject, the email system computes a difference between a reminder time determined based on the latter received email message and a set reminder time based on the earlier received email message. In these implementations, the email system compares the computed difference in reminder time to a threshold (e.g., 30 minutes or one hour) and determines whether and how to modify the set reminder based on the comparison of the difference to the threshold. For example, when the comparison reveals that the difference is less than the threshold, the email system determines to adjust the reminder time to that of the latter received email message. This example is illustrated by the eighth and ninth email messages included in the email inbox 105 (e.g., 4:30−4:10=20, which is less than a threshold of 30 minutes, so modify reminder time to 4:30). In other examples, when the comparison reveals that the difference is less than the threshold, the email system determines to maintain the reminder time set based on the earlier received email message (e.g., 4:30−4:10=20, which is less than a threshold of 30 minutes, so maintain reminder time to 4:10).

When the comparison reveals that the difference is greater than the threshold, the email system may determine a new reminder time that accounts for both the reminder time of the earlier received email message and the reminder time of the latter received email message. For instance, the email system may compute an average of the two reminder times and modify the set reminder time to be the computed average (e.g., a midpoint between the two reminder times). In some examples, when the comparison reveals that the difference is greater than the threshold, the email system may determine to set separate reminders for the multiple messages or may determine to maintain the set reminder time or use the reminder time of the latter received email message.

In some implementations, the email system accelerates the set reminder time based on receipt of the additional email message from the same sender that has the same subject as a set reminder. In these implementations, the email system accelerates the reminder time because the sender appears to be anxiously seeking a response. For example, the email system may modify the reminder time to a certain time period after receipt of the additional email message (e.g., 15 minutes). In another example, the email system may reduce the set reminder time by a certain time period (e.g., 30 minutes) based on receipt of the additional email message.

The email system also may track response pattern behavior of the recipient in circumstances in which additional messages having the same sender and subject are received. The email system may use the tracked response pattern behavior of the recipient in these circumstances in modifying the set reminder time.

Referring again to FIG. 1, based on the automatically set response reminder time for the eighth and ninth email messages (i.e., 4:30 PM), the email system determines that, at 5:00 PM on Feb. 20, 2009 when the response reminder list 150 is being displayed, a response for the eighth and ninth email messages is 30 minutes overdue. Accordingly, the email system displays a reminder entry in the response reminder list 150 (i.e., the fourth entry in the list as shown) for the eighth and ninth email messages. The displayed reminder entry indicates that the eighth and ninth email messages were sent by Sender 6, have a subject of Subject 7, and that a response to the eighth and ninth email messages is overdue by 30 minutes. The number two in parentheses adjacent to the reminder time indicates that the response reminder corresponds to two received email messages. Other information may be displayed in the reminder entry and other types of reminders may be provided in addition to (or instead of) the response reminder list 150.

For the tenth and eleventh email messages included in the email inbox 105, the email system has cancelled a set reminder because the user has already responded to the tenth email message. More specifically, when the eleventh email message is received, the email system compares the sender of the eleventh email message (Sender 3) to the tracked response data 140, identifies a record corresponding to Sender 3, and accesses the response rate data and response time data included in the identified record. The email system determines whether to set a response reminder for the eleventh email message by comparing the accessed response rate data to a response rate threshold (e.g., 50%, 25%, etc.). In this example, the email system determines, based on the comparison, that the response rate of the user for email messages received from Sender 3 (i.e., 90%) is greater than the response rate threshold and that a response reminder should be set for the eleventh email message.

In response to determining that a response reminder should be set, the email system determines a response reminder time at which to provide the response reminder for the eleventh email message using the accessed response time data. In this regard, the email system determines that the eleventh email message was received at 7:45 AM on Feb. 20, 2009 and the accessed response time data indicates that the user typically responds to email messages from Sender 3 in 7 hours. The email system then adds 7 hours to the determined 7:45 AM time of receipt and automatically, without human intervention, sets a response reminder time for the eleventh email message as 2:45 PM on Feb. 20, 2009.

Subsequent to setting the reminder for the eleventh email message, the email system receives the tenth email message. In response to receiving the tenth email message, the email system either sets another reminder for the tenth email message or modifies a reminder time of the set reminder for the eleventh email message.

After setting one or more response reminders for the tenth and eleventh email messages, the email system monitors actions of the user with respect to the tenth and eleventh email messages. In this example, the email system detects that the user responds to the tenth email message based on the monitored actions of the user. In response to a detection that the user has responded to the tenth email message, the email system cancels the one or more automatically set reminders for the tenth and eleventh email messages because the tenth and eleventh email messages are from the same sender and have the same subject. As such, the email system does not provide a reminder for the tenth and eleventh email messages to the user. In this regard, the response reminder list 150 does not include a reminder entry for the tenth email message or the eleventh email message.

In some examples, ordering of the response reminder list 150 may be different from ordering of the user's inbox 105. In these examples, the response reminder list 150 may be ordered based on a combination of time of receipt of an email message of a first type and an average response time by the user for email messages having the first type. Accordingly, the order in the response reminder list 150 may be quite different than the order in the email inbox 105 because the order in the response reminder list 150 accounts for past response behavior/patterns, whereas the email inbox may only account for time of receipt. In one example, a first email may be received at time one and a second email may be received at time two that is later than (e.g., further in the future) than time one. In this example, a reminder for the second email may be provided prior to a reminder for the first email because the user typically responds to a second type of email corresponding to the second email more quickly than a first type of email corresponding to the first email.

In some implementations, ties in reminder time exist for automatically set reminders. Generally, ties in reminder time may be broken by time of receipt. However, the email system also may break ties based on whether or not the email system has received multiple messages corresponding to a reminder.

In some implementations, the response reminder list 150 may include reminders that are not yet due and instead show a time by which a response is due, rather than overdue. In these implementations, the email system may distinguish, in response reminder list 150, reminders for which a response is overdue (e.g., highlight or display in a different color, such as red) from reminders for which a response is not yet due, but approaching.

Figure 2:
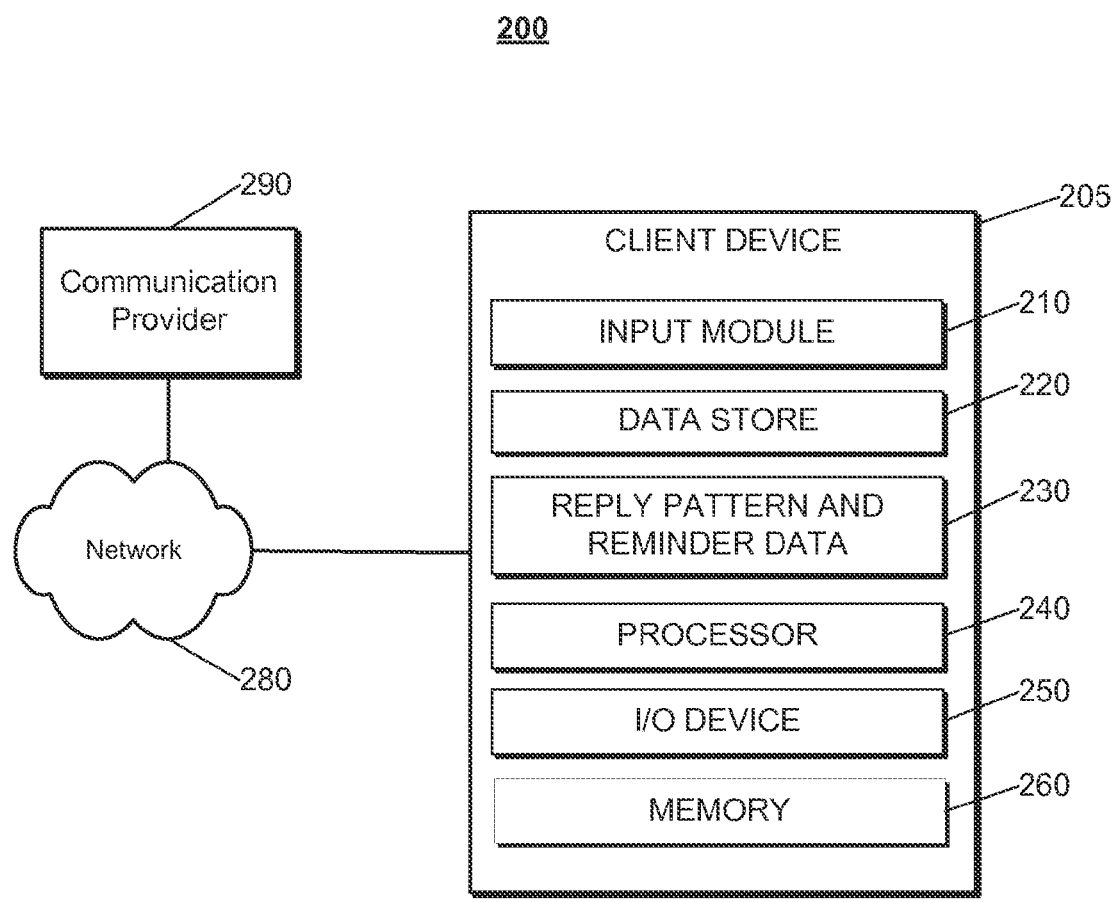
FIG. 2 depicts an example of a system.

Referring to FIG. 2, a block diagram of an electronic communication system 200 is shown. The system 200 includes a client device 205, a network 280, and a communication provider 290. The network 280 enables the client device 205 and the communication provider 290 to exchange electronic communications.

The client device 205 includes an input module 210, a data store 220, reply pattern and reminder data 230, a processor 240, an input/output (I/O) device 250, and a memory 260. The client device 205 outputs received electronic communications to a user and allows a user to send electronic communications. For instance, the client device 205 allows a user to perceive received electronic communications and respond to the received electronic communications. The client device 205 may be a portable device (e.g., smart phone, tablet PC, laptop computer, etc.) or a desktop computer. The client device 205 may be implemented within hardware or a combination of hardware and software.

The input module 210 imports data associated with communication interfaces. The data may include data resulting from received electronic communications. The data also may include data related to settings input by a user that are used in handling electronic communications. The input module 210 may input data from a device (e.g., the communication provider 290) connected to the network 280. In some implementations, the input module 210 reformats and/or transforms the data such that the data may be processed and stored by other components within the client device 205.

The client device 205 also includes a data store 220. In some implementations, data from the input module 210 is stored in the data store 220. The data store 220 may be, for example, a database that logically organizes data into a series of database tables. The data store 220 may be a hard disk drive, non-volatile memory (e.g., Flash memory), or another type of electronic storage device.

The client device 205 also includes reply pattern and reminder data 230. The reply pattern and reminder data 230 may include tracked data indicative of reply patterns by communication type and data defining set reminders. The reply pattern and reminder data 230 may include any communication pattern data and reminder data described throughout the disclosure. In some implementations, the reply pattern and reminder data 230 may be received, by the client device 205, from the communication provider 290, or may be stored, at least partially, by the communication provider 290.

The client device 205 also includes a processor 240. The processor 240 may be a processor suitable for the execution of a computer program such as a general or special purpose microprocessor, and any one or more processors of any kind of digital computer. Generally, a processor receives instructions and data from a read-only memory or a random access memory or both. The processor 240 receives instructions and data from the components off the client device 205 to, for example, display interfaces related to electronic communications of a user. In some implementations, the client device 205 includes more than one processor.

The client device 205 further includes the I/O device 250, which is configured to allow user input and display output. For example, the I/O device 250 may be a mouse, a keyboard, a stylus, a touch screen, a track ball, a toggle control, one or more user input buttons, a microphone, or any other device that allows a user to input data into the client device 205 or otherwise communicate with the client device 205. In some implementations, the user may be a machine and the user input may be received from an automated process running on the machine. In other implementations, the user may be a person.

The I/O device 250 also may include a device configured to output electronic communications. For instance, the I/O device 250 may include a display device configured to display graphical user interfaces that enable a user to perceive electronic communication information and enable a user to interact with the client device 205. The I/O device 250 also may include a speaker configured to provide audible output related to electronic communication information (e.g., audible electronic content or reminders).

The client device 205 also includes a memory 260. The memory 260 may be any type of tangible machine-readable storage medium. The memory 260 may, for example, store the data included in the data store 220. In some implementations, the memory 260 may store instructions that, when executed, cause the client device 205 to, for example, process and display electronic communications. The memory 260 may store instructions that, when executed, cause the client device 205 to perform operations described throughout the disclosure.

The electronic communication system 200 also includes a network 280. The network 280 is configured to enable exchange of electronic communications between devices connected to the network 280. For example, the network 280 may be configured to enable exchange of electronic communications between the client device 205 and the communication provider 290. The network 280 may include, for example, one or more of the Internet, Wide Area Networks (WANs), Local Area Networks (LANs), analog or digital wired and wireless telephone networks (e.g., a PSTN, Integrated Services Digital Network (ISDN), a cellular network, and Digital Subscriber Line (DSL)), radio, television, cable, satellite, or any other delivery or tunneling mechanism for carrying data. Network 280 may include multiple networks or subnetworks, each of which may include, for example, a wired or wireless data pathway. The network 280 may include a circuit-switched network, a packet-switched data network, or any other network able to carry electronic communications. For example, the network 280 may include networks based on the Internet protocol (IP) or asynchronous transfer mode (ATM).

The communication provider 290 is an electronic device configured to execute programs and exchange communications with the client device 205 (e.g., multiple client devices) over the network 280. For example, the communication provider 290 may be configured to execute a program that performs electronic communication processing operations. In this example, the communication provider 290 may exchange communications with the client device 205 to receive input associated with electronic messages and provide reminders output to the client device 205.

Although the example client device 205 is shown as a single integrated component, one or more of the modules and applications included in the client device 205 may be implemented separately from the device 205 but in communication with the device 205. For example, the data store 220 may be implemented on a centralized server that communicates and exchanges data with the client device 205. In this example, the communication provider 290 may communicate with the client device 205 and perform operations described throughout the disclosure as being performed by the client device 205 or may perform operations that assist in the client device 205 in performing described operations.

FIGS. 3, 5, 16, 18, 21, 30, 34, 36, 38, and 40 illustrate example processes. The operations of the example processes are described generally as being performed by the system 200. The operations may be performed exclusively by the client device 205, may be performed exclusively by the communications provider 290, or may be performed by a combination of the client device 205 and the communications provider 290. In some implementations, operations of the example processes may be performed by one or more processors included in one or more electronic devices.

Figure 3:
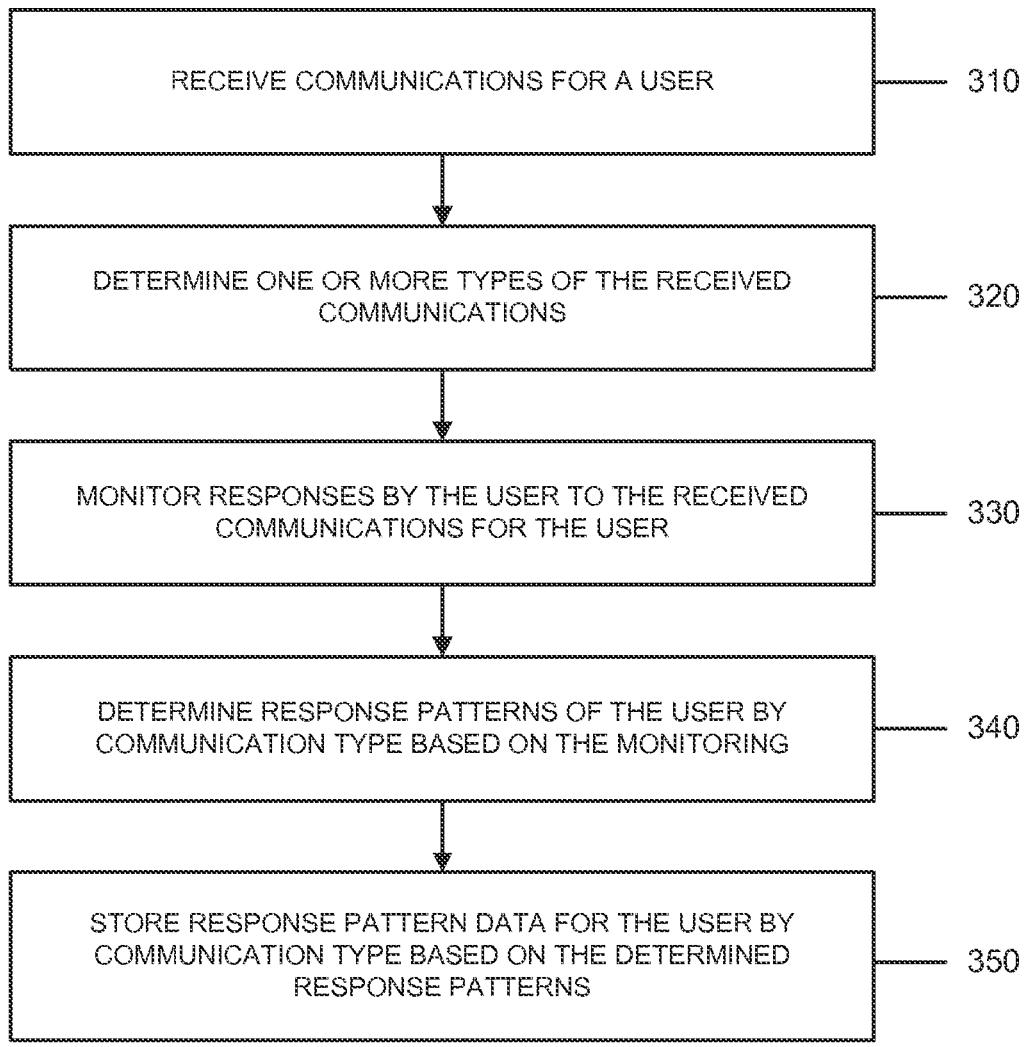
FIGS. 3, 5, 16, 18, 21, 30, 34, 36, 38, and 40 are flowcharts of example processes.

FIG. 3 illustrates an example of a process 300 for storing response pattern data. The system 200 receives communications for a user (310). For instance, the system 200 receives electronic communications addressed to the user and initiated by multiple, different senders. The received electronic communications may include multiple, different types of communications received over multiple, different communication mediums. The received electronic communications may be electronic mail messages, text or SMS messages, telephone calls, instant messages, or any other types of electronic messages.

The system 200 determines one or more types of the received communications (320). For example, the system 200 analyzes aspects of the received communications to determine one or more types of the received communications. In this example, the system 200 may analyze the received communications to extract sender identity from the received communications and, in some implementations, determine a group to which a sender of a communication belongs. The system 200 also may analyze content included in the received communications to determine whether a received communication includes content of a particular type (e.g., a communication that is labeled as "Urgent" or a communication that includes a request). The system 200 further may determine a medium over which the communications were received (e.g., determine whether a communication is an email message, a text or SMS message, an instant message, a voice telephone call, etc.).

In addition, the system 200 may determine whether a received communication is associated with a priority designation and, if so, the type of priority designation (e.g., whether a received communication is a high priority communication or a low priority communication). The system 200 may determine a position in an address line of the user for a received communication. For instance, the system 200 may determine whether a received communication was directly addressed to the user or whether the received communication was merely copied to the user.

In some implementations, the system 200 may determine a location of a received communication in a string of communications. In these implementations, the system 200 may determine whether the received communication is an original communication in a string (e.g., the first communication of the string) or whether the received communication is a reply communication in a string (e.g., a second or later communication in a string). Further, the system 200 may determine and track specific location in the string for the received communication (e.g., first, second, third, fourth, fifth, etc.). The system 200 may track whether or not the received communication was forwarded to the user and/or what point in the string the user was added to the communication string.

In some examples, the system 200 may determine whether a received communication has other recipients and, if so, attributes of the other recipients. In these examples, the system 200 may determine a number of other recipients and whether the other recipients are included with the user in an email list or group or added by the sender individually. The system 200 may determine which one or more recipients received the communication and whether one or more particular recipients received the communication (e.g., the user's assistant, etc.).

The system 200 may determine the device on which the user received or perceived the communication. The system 200 further may determine a size of the received communication. The size of the received communication may be determined in terms of data size (e.g., bytes) associated with the received communication and may include only content of the communication or content and attachments to the communication. The size of the received communication may be determined in terms of the number of words or length of an audio and/or video message.

In addition to the referenced types of communications, the system 200 may track any type of communication a user may receive. For instance, the system 200 may track user response to communications that are confidential or communications for which the sender address is masked or hidden.

In some implementations, the system 200 stores, in electronic storage, data tracking received communications and the determined one or more types of the received communications. In these implementations, the system 200 may maintain a communication log that tracks data identifying received communications. Each time a communication is received, the system 200 may add a new entry in the communication log indicating the date/time of receipt, the subject of the received communication, an identifier for the received communication, and/or other information identifying the received communication. In addition, the system 200 may associate the determined one or more types of the received communication with the entry in the communication log. Accordingly, over time in these implementations, the system 200 generates a detailed communication log that tracks communications received for the user and determined types of the received communications.

The system 200 monitors responses by the user to the received communications for the user (330). For example, the system 200 detects user responses to communications and, when the system 200 detects a response to a communication, the system 200 identifies the communication to which the user has responded. In this example, after the system 200 identifies the communication to which the user has responded, the system 200 tracks and stores, in electronic storage, data indicating parameters of the response. For instance, the system 200 may store identifying information for the communication in association with an indication that the user has responded to the communication. In addition, the system 200 may determine and store more detailed information related to the response, such as date/time of the response, how long the user took to respond to the communication, etc. The system 200 may maintain a response log that tracks data for detected user responses to communications. The system 200 also may update the communication log discussed above to include data indicative of the response. Table 1 below shows an example communication log entry:

TABLE 1

| Message Identifier | Receipt Time | Sender | Medium | Priority | Other Types | Response | Response Time |
|---|---|---|---|---|---|---|---|
| ID Number | Date/Time of Receipt | Sender Identity | Email/ IM/ Text/ SMS | High or Low | ... | Yes/ No | Date/Time of Response |

The system 200 determines response patterns of the user by communication type based on the monitoring (340). For example, the system 200 analyzes tracked data for the received communications, the determined one or more types of the communications, and the monitored responses to the received communications and identifies response patterns for particular communication types or combinations of communication types. In this example, the system 200 may analyze data included in a communication log (e.g., as shown in Table 1) and/or a response log maintained by the system 200 over a period of time. The analyzed communication and/or response log includes comprehensive data related to past communications received by the user and how the user has responded to the past communications.

In some implementations, the system 200 determines a response pattern for a particular type of communication received by the user in the past. In these implementations, the system 200 identifies and accesses data tracking receipt, for the user, of communications having the particular type. The system 200 also identifies and accesses data tracking responses, by the user, to the received communications having the particular type. Using the tracked receipt data and the tracked response data, the system 200 identifies patterns of the user's past response behavior for communications having the particular type. For example, the system 200 may determine a total number of communications of the particular type that the user has received and a number of communications of the particular type to which the user has responded. In this example, the system 200 may divide the number of communications of the particular type to which the user has responded by the total number of communications of the particular type that the user has received and compute a percentage of communications of the particular type to which the user has responded (e.g., a response rate).

In some examples, the system 200 determines response timing patterns of the user for communications of the particular type using the tracked receipt data and the tracked response data. For instance, the system 200 may identify each instance in the tracked response data where the user responded to a communication of the particular type in the past. For each identified instance, the system 200 may, using the tracked receipt data and the tracked response data, determine a receipt time of the communication and a response time for the communication. Using the receipt time and the response time, the system 200 may compute a difference between the response time and the receipt time and, thereby, determine how long it took the user to respond to the communication. After determining how long it took the user to respond to each of the communications associated with the particular type, the system 200 may determine an average response time of the user for communications having the particular type by summing the determined differences and dividing the summation result by the total number of communications having the particular type to which the user responded.

In some implementations, the system 200 determines time of day/day of week/date response timing patterns of the user for communications of the particular type using the tracked receipt data and the tracked response data. For instance, the system 200 may identify each instance in the tracked response data where the user responded to a communication of the particular type in the past. For each identified instance, the system 200 may, using the tracked response data, determine a time of day and a day of the week when the user responded to the communication. Using the determined time of day and day of the week, the system 200 may identify time of day and day of week response patterns of the user for communications of the particular type. For example, the system 200 may determine that 90% of the user's past responses to communications of the particular type have occurred between the hours of 10 PM to 11 PM. In this example, the system 200 determines that the user typically responds to communications of the particular type between the hours of 10 PM to 11 PM. In another example, the system 200 may determine that 42% of the user's past responses to communications of the particular type have occurred on Saturday and that 38% of the user's past responses to communications of the particular type have occurred on Sunday. In this example, system 200 determines that the user typically responds to communications of the particular type over the weekend (e.g., on Saturday or Sunday). Other types of time of day/day of week/date response timing patterns may be determined.

The system 200 may update the response pattern data periodically or each time the user responds to a new communication. In some examples, the system 200 keeps running totals of communication information (e.g., total number of received communication having the particular type) and updates the response pattern data each time a new communication is received and/or each time a response communication is sent. For instance, the system 200 may maintain a running average response time for communications of a particular type.

The system 200 stores, in electronic storage, response pattern data for the user by communication type based on the determined response patterns (350). For instance, the system 200 may store the determined response pattern data in a table or log that the system 200 may access and use in setting reminders to future communications. The response pattern data may include a set of rules that indicate whether or not reminders should be set for particular types of communications.

FIG. 4 illustrates an example data structure 400 that stores response pattern data. The example data structure 400 may represent stored response pattern data as discussed above with respect to numeral 350. The example data structure 400 includes a type column 410 that stores a determined type of a communication, a response rate column 420 that stores a percentage of messages of the particular type to which the user has responded in the past, a response time column 430 that stores an average response time of messages of the particular type to which the user has responded in the past, and a date/time column 440 that stores a determined time of day and/or day of week pattern of past responses by the user to communications of the particular type.

The example data structure 400 includes a row 450 that stores response pattern data for a particular sender, a row 452 that stores response pattern data for a particular group of senders, and a row 454 that stores response pattern data for particular content in a communication. The example data structure 400 also includes a row 456 that stores response pattern data for a particular medium of communication, a row 458 that stores response pattern data for a particular priority designation of communications, and a row 460 that stores response pattern data for a particular location in an address line. The example data structure 400 further includes a row 462 that stores response pattern data for a particular position in a message string, a row 464 that stores response pattern data for particular other recipients of a communication, a row 466 that stores response pattern data for a particular device the user is using to perceive a communication, and a row 468 that stores response pattern data for a particular size of a communication. Although the example data structure 400 is shown as having ten rows and four columns for ease of explanation, the example data structure 400 may include many more rows and many more columns.

Figure 5:
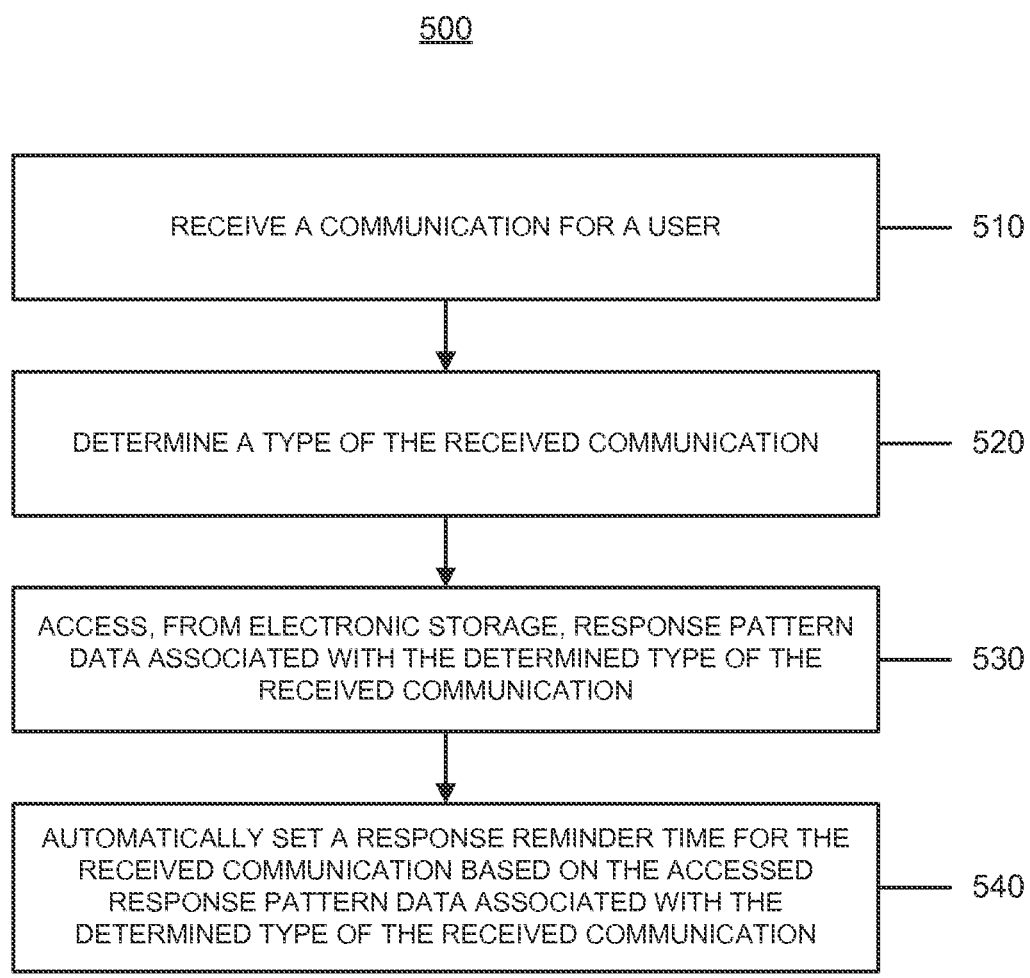

FIG. 5 illustrates an example of a process 500 for automatically setting a response reminder time for a received communication. The system 200 receives a communication for a user (510). For instance, the system 200 receives an electronic communication addressed to the user and initiated by a particular sender. The received electronic communication may be associated with multiple, different types. The received electronic communication may be an electronic mail message, a text or SMS message, a telephone call, an instant message, or any other type of electronic message.

The system 200 determines a type of the received communication (520). For example, the system 200 analyzes aspects of the received communication to determine one or more types of the received communication. The system 200 may determine the one or more types of the received communication using techniques similar to those discussed above with respect to reference numeral 320.

The system 200 accesses, from electronic storage, response pattern data associated with the determined type of the received communication (530). For example, the system 200 accesses response pattern data stored in operations described above with respect to reference numeral 350. In this example, the system 200 may access the response pattern data 400 shown in FIG. 4 or data that is similar to the response pattern data 400 shown in FIG. 4. The system 200 may identify a portion of the response pattern data that is associated with the determined type of the received communication and access only the identified portion of the response pattern data or extract the identified portion of the response pattern data from a larger amount (e.g., all) of the response pattern data that is accessed.

The system 200 automatically, without human intervention, sets a response reminder time for the received communication based on the accessed response pattern data associated with the determined type of the received communication (540). In some implementations, the system 200 determines an anticipated or typical response time for the determined type of the received communication based on the user's past response patterns. For example, the system 200 determines the anticipated or typical response time using an average response time (e.g., an average time between the user receiving or perceiving a communication to a time when the user responds to the communication) for past communications of the particular type to which the user has responded. In this example, the system 200 accesses or determines the average response time for past communications of the particular type based on the response pattern data. The system 200 then sets the response reminder time by determining a time of receipt or perception of the received communication, adding the average response time to the determined time of receipt or perception, and automatically setting the response reminder time as a result of adding the average response time to the determined time of receipt or perception.

In another example, the system 200 determines the anticipated or typical response time using a time of day and/or day of week pattern of past responses by the user to communications of the particular type. In this example, if the system 200 determines that the user typically responds to communications of the particular type between the hours of 10 PM to 11 PM on Monday through Thursday, the system 200 determines an anticipated or typical response time that corresponds to this response pattern. For instance, when the communication is received on a Wednesday at 2 PM, the system 200 may automatically set the response reminder time for Wednesday at 10 PM. When the communication is received on a Saturday at 10 AM, the system 200 may automatically set the response reminder time for Monday at 10 PM.

In some examples, the system 200 may set the response reminder before a determined anticipated or typical response time to provide a reminder to user at a time when the user still has time to generate and send a response by the determined anticipated or typical response time. In these examples, the system 200 may automatically set the response reminder time for fifteen minutes or one hour prior to the determined anticipated or typical response time and periodically provide reminders to the user after the automatically set response reminder time.

FIGS. 6-15 illustrate examples of setting a response reminder time based on accessed response pattern data associated with a determined type of a received communication. In addition, FIG. 16 illustrates a process 1600 for determining a response reminder time for a received communication based on response pattern data. The response reminder time determined using the process 1600 may be the automatically set response reminder time.

Figure 6:
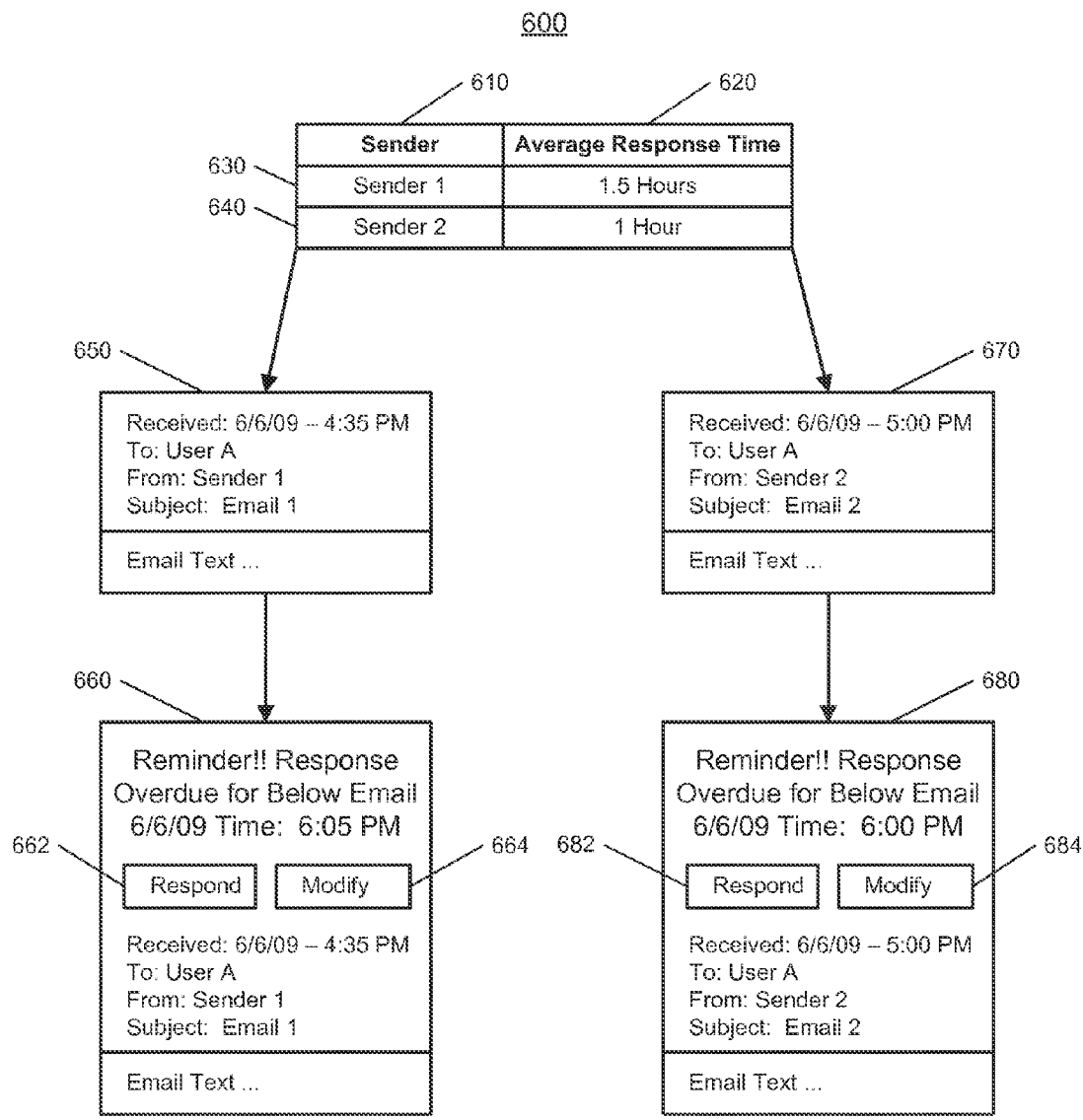

FIG. 6 illustrates an example 600 of setting a reminder based on a sender of a communication. As shown, the example 600 includes tracked response pattern data that has a sender column 610 and an average response time column 620. The sender column 610 includes data identifying senders of communications to which a user has responded in the past. The average response time column 620 includes data indicating an average response time of the user for past communications received from the corresponding sender in the sender column 610. In the example 600, the tracked response pattern data includes a first row 630 indicating that the user responds to communications sent from Sender 1 on average in one and a half hours. The tracked response pattern data also includes a second row 640 indicating that the user responds to communications sent from Sender 2 on average in one hour. Although the tracked response pattern data includes two rows for ease of explanation, the tracked response pattern data may include more rows and data corresponding to many different senders.

In one example, the system 200 receives a first communication 650 sent by Sender 1. In this example, because the first communication 650 was received on Jun. 6, 2009 at 4:35 PM and the user responds to communications sent from Sender 1 on average in one and a half hours, the system 200 provides a reminder 660 related to the first communication 650 to the user on Jun. 6, 2009 at 6:05 PM. The reminder 660 includes a reminder portion that indicates that a response to the communication is overdue, a communication portion that provides details related to the first communication to which the reminder corresponds, a respond interface control 662, and a modify interface control 664. The respond interface control 662 enables the user to respond to the first communication 650 (e.g., by displaying a response communication interface, such as a response email composition interface that results when a user selects a respond control) when the user selects the respond interface control 662 (e.g., using a mouse to select the respond interface control 662). The modify interface control 664 enables the user to modify the reminder 660 (e.g., by displaying a modify reminder interface) when the user selects the modify interface control 664 (e.g., using a mouse to select the modify interface control 664). For instance, the user may use a modify reminder interface to extend the reminder time associated with the reminder 660 (e.g., snooze the reminder 660) or to cancel the reminder 660. Other examples may provide a different combination (e.g., a subset) of the information provided in the reminder 660 or other information that effectuates a reminder to the user.

In another example, the system 200 receives a second communication 670 sent by Sender 2. In this example, because the second communication 670 was received on Jun. 6, 2009 at 5:00 PM and the user responds to communications sent from Sender 2 on average in one hour, the system 200 provides a reminder 680 related to the second communication 670 to the user on Jun. 6, 2009 at 6:00 PM. Although the first communication 650 was received prior to the second communication 670, the reminder 680 is provided to the user prior to the reminder 660 because the user typically responds to communications sent by Sender 2 faster than communications sent by Sender 1. The reminder 680 includes a reminder portion that indicates that a response to the communication is overdue, a communication portion that provides details related to the second communication to which the reminder corresponds, a respond interface control 682, and a modify interface control 684.

The respond interface control 682 is similar to the respond interface control 662 and the modify interface control 684 is similar to the modify interface control 664.

Figure 7:
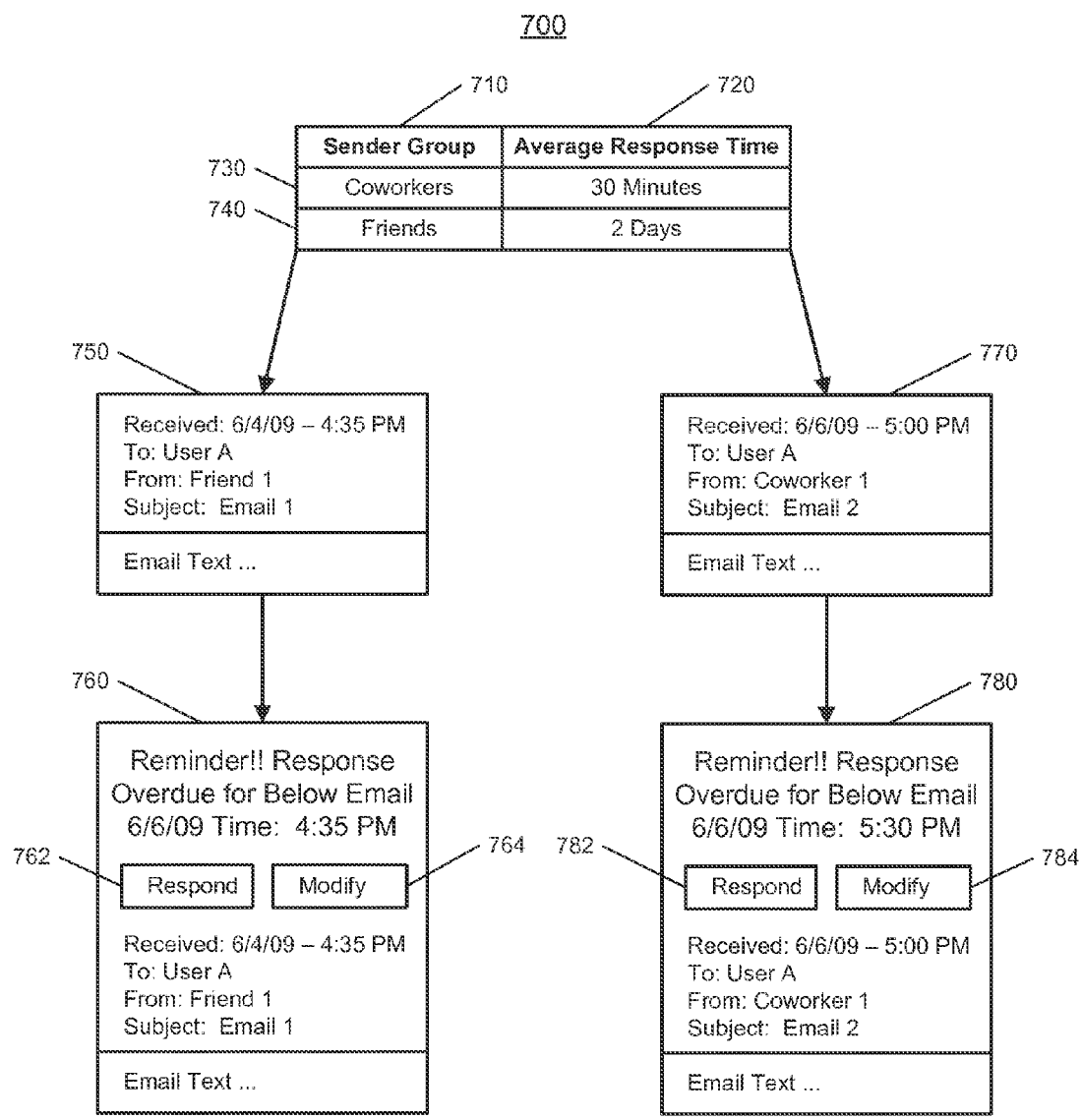

FIG. 7 illustrates an example 700 of setting a reminder based on a sender group associated with a sender of a communication. As shown, the example 700 includes tracked response pattern data that has a sender group column 710 and an average response time column 720. The sender group column 710 includes data identifying sender groups associated with senders of communications to which a user has responded in the past. The average response time column 720 includes data indicating an average response time of the user for past communications received from the corresponding sender group in the sender column 710. In the example 700, the tracked response pattern data includes a first row 730 indicating that the user responds to communications sent from a Coworkers Group on average in 30 minutes. The tracked response pattern data also includes a second row 740 indicating that the user responds to communications sent from a Friends Group on average in two days. Although the tracked response pattern data includes two rows for ease of explanation, the tracked response pattern data may include more rows and data corresponding to many different sender groups.

In one example, the system 200 receives a first communication 750 sent by a sender in the Friends Group. In this example, because the first communication 750 was received on Jun. 4, 2009 at 4:35 PM and the user responds to communications sent from senders in the Friends Group on average in two days, the system 200 provides a reminder 760 related to the first communication 750 to the user on Jun. 6, 2009 at 4:35 PM. The reminder 760 includes a reminder portion that indicates that a response to the communication is overdue, a communication portion that provides details related to the first communication to which the reminder corresponds, a respond interface control 762, and a modify interface control 764. The respond interface control 762 enables the user to respond to the first communication 750 (e.g., by displaying a response communication interface, such as a response email composition interface that results when a user selects a respond control) when, the user selects the respond interface control 762 (e.g., using a mouse to select the respond interface control 762). The modify interface control 764 enables the user to modify the reminder 760 (e.g., by displaying a modify reminder interface) when the user selects the modify interface control 764 (e.g., using a mouse to select the modify interface control 764). For instance, the user may use a modify reminder interface to extend the reminder time associated with the reminder 760 (e.g., snooze the reminder 760) or to cancel the reminder 760. Other examples may provide a different combination (e.g., a subset) of the information provided in the reminder 760 or other information that effectuates a reminder to the user.

In another example, the system 200 receives a second communication 770 sent by a sender in the Coworkers Group. In this example, because the second communication 770 was received on Jun. 6, 2009 at 5:00 PM and the user responds to communications sent from senders in the Coworkers Group on average in 30 minutes, the system 200 provides a reminder 780 related to the second communication 770 to the user on Jun. 6, 2009 at 5:30 PM. The reminder 780 includes a reminder portion that indicates that a response to the communication is overdue, a communication portion that provides details related to the second communication to which the reminder corresponds, a respond interface control 782, and a modify interface control 784. The respond interface control 782 is similar to the respond interface control 762 and the modify interface control 784 is similar to the modify interface control 764.

Figure 8:
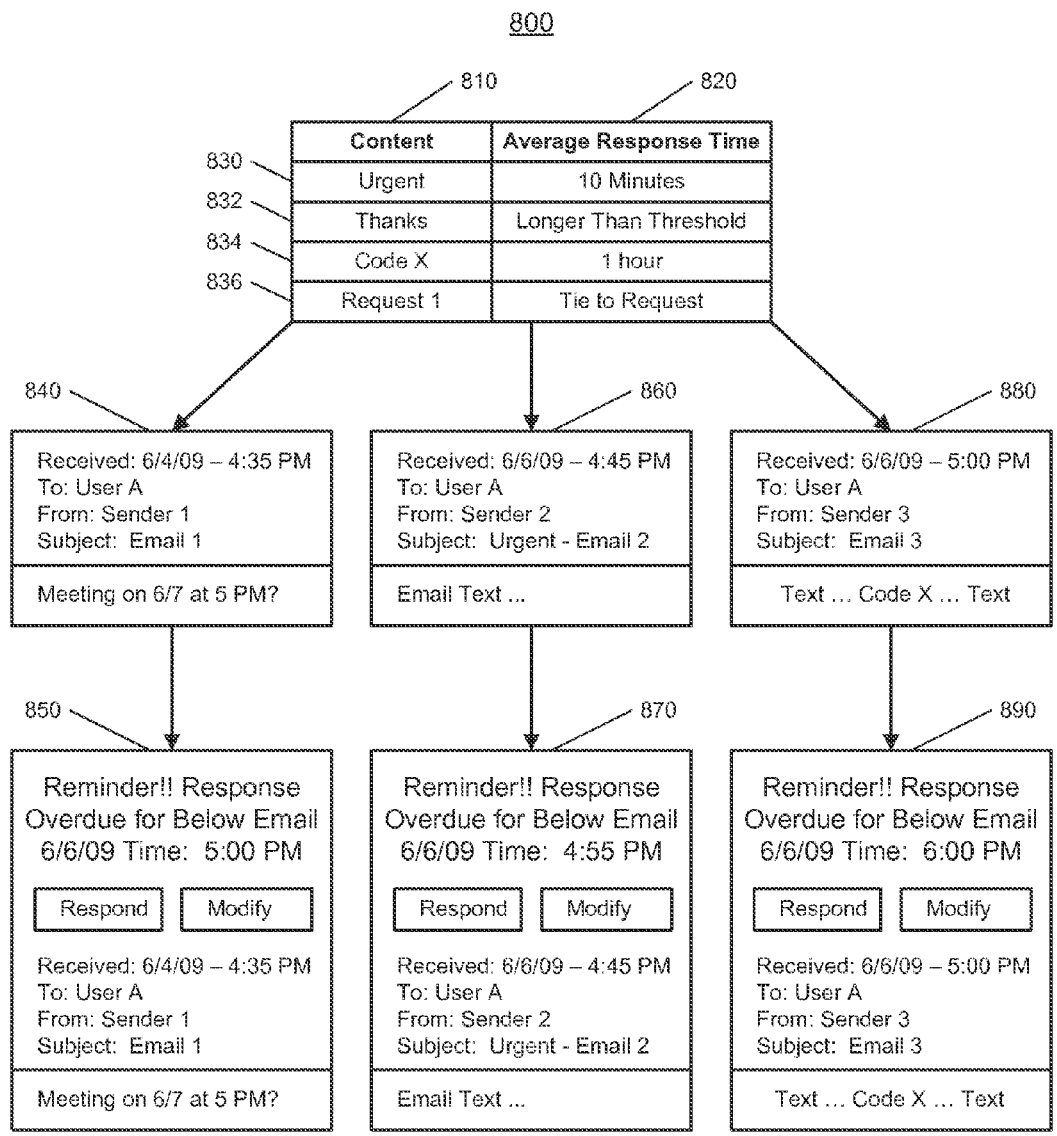

FIG. 8 illustrates an example 800 of setting a reminder based on content of a communication. As shown, the example 800 includes tracked response pattern data that has a content column 810 and an average response time column 820. The content column 810 includes data identifying content of communications to which a user has responded in the past. The content may include frequently identified words or phrases included in communications to which the user responds. The content also may be defined by the user as words or phrases the user wishes to track. The average response time column 820 includes data indicating an average response time of the user for past communications having the corresponding content in the content column 810.

In the example 800, the tracked response pattern data includes a first row 830 indicating that the user responds to communications having the content "Urgent" on average in 10 minutes. The tracked response pattern data also includes a second row 832 indicating that the user responds to communications having the content "Thanks" on average longer than a threshold. For instance, the user may not frequently respond to messages that only have the text "Thanks" and, therefore, the average response time of the user for messages including the text "Thanks" is relatively long. Because the average response time is so long (e.g., greater than a threshold, such as one month), the system 200 determines not to set reminders for communications having the text "Thanks."

The system 200 also may consider the volume or frequency of messages that have the particular content (e.g., "Thanks") when determining whether to provide reminders for messages having the particular content. For example, if the user receives messages having particular content (e.g., "Thanks") at a high volume or very frequently and takes a relatively long time to respond to those messages, the system 200 may determine not to set reminders for messages having the particular content (e.g., "Thanks") because the computational burden may be large relative to the benefit provided to the user. In fact, the user may prefer not to receive reminders in this situation because the number of reminders would be large and often applicable to communications the user received a long time ago. However, if the user receives messages having particular content (e.g., "Thanks") at a low volume or infrequently and takes a relatively long time to respond to those messages, the system 200 may determine to set reminders for messages having the particular content (e.g., "Thanks") because the computational burden and burden on the user may be relatively low. When the system 200 identifies these types of situations, the system 200 may request input from the user to select how the user wishes to handle reminders for the situation.

In addition, the tracked response pattern data includes a third row 834 indicating that the user responds to communications having the content "Code X" on average in one hour. The tracked response pattern data includes a fourth row 836 indicating that the user responds to communications having the content "Request 1" based on the actual content included in the request. For example, when the system 200 determines that content of a communication includes a request and a time by which the communication requests action, the system 200 sets a reminder for the communication that is tied to the time included in the request. In this example, the system 200 may analyze content included in electronic communications and identify requests, such as "Please respond by . . . " or "The deadline is . . . ." After identifying such a request, the system 200 attempts to identify a time associated with the request by scanning content adjacent or near the identified request. When the system 200 successfully identifies a time, the system 200 sets a reminder that is tied to the request. For instance, when the system 200 identifies the request "Please respond by 4 PM today," the system 200 may set a reminder based on the 4 PM requested response time and provide a reminder at 3 PM today to enable the user to meet the requested response deadline. Although the tracked response pattern data includes four rows for ease of explanation, the tracked response pattern data may include more rows and data corresponding to many different types of content and locations of content (e.g., subject of email message, body of email message, etc.).

In one example, the system 200 receives a first communication 840 including a request "Meeting on 6/7 at 5 PM?" In this example, the system 200 analyzes the content of the first communication 840 and identifies the request and time associated with the request. Because the first communication 840 requests a meeting on Jun. 7, 2009 at 5 PM, the system 200 provides a reminder 850 related to the first communication 840 to the user on Jun. 6, 2009 at 5:00 PM. Providing the reminder 850 one day prior to the requested meeting may allow ample time for the user to respond and accept the meeting if desired. The system 200 may set the reminder time based on type of request (e.g., a reminder for a request for a meeting may be set further in advance than a reminder for a request for a response), the time period between receipt of the communication and the request time (e.g., a reminder may be set at a midpoint between time of receipt of communication and time associated with request), and/or input of the user as to when reminders should be provided.

The reminder 850 includes a reminder portion that indicates that a response to the communication is overdue, a communication portion that provides details related to the first communication to which the reminder corresponds, a respond interface control, and a modify interface control.

In another example, the system 200 receives a second communication 860 that includes the content "Urgent" in the subject line. In this example, the system 200 analyzes the content of the subject line of the second communication 860, identifies the content "Urgent" in the subject line, and matches the content "Urgent" to the tracked response pattern data. Because the second communication 860 was received on Jun. 6, 2009 at 4:45 PM and the user responds to communications having the content "Urgent" on average in 10 minutes, the system 200 provides a reminder 870 related to the second communication 860 to the user on Jun. 6, 2009 at 4:55 PM. The reminder 870 includes a reminder portion that indicates that a response to the communication is overdue, a communication portion that provides details related to the second communication to which the reminder corresponds, a respond interface control, and a modify interface control.

In yet another example, the system 200 receives a third communication 880 that includes the content "Code X" in the body of the message. In this example, the system 200 analyzes the content of the body of the third communication 880, identifies the content "Code X" in the body of the message, and matches the content "Code X" to the tracked response pattern data. Because the third communication 880 was received on Jun. 6, 2009 at 5:00 PM and the user responds to communications having the content "Code X" on average in one hour, the system 200 provides a reminder 890 related to the third communication 880 to the user on Jun. 6, 2009 at 6:00 PM. The reminder 890 includes a reminder portion that indicates that a response to the communication is overdue, a communication portion that provides details related to the second communication to which the reminder corresponds, a respond interface control, and a modify interface control.

Figure 9:
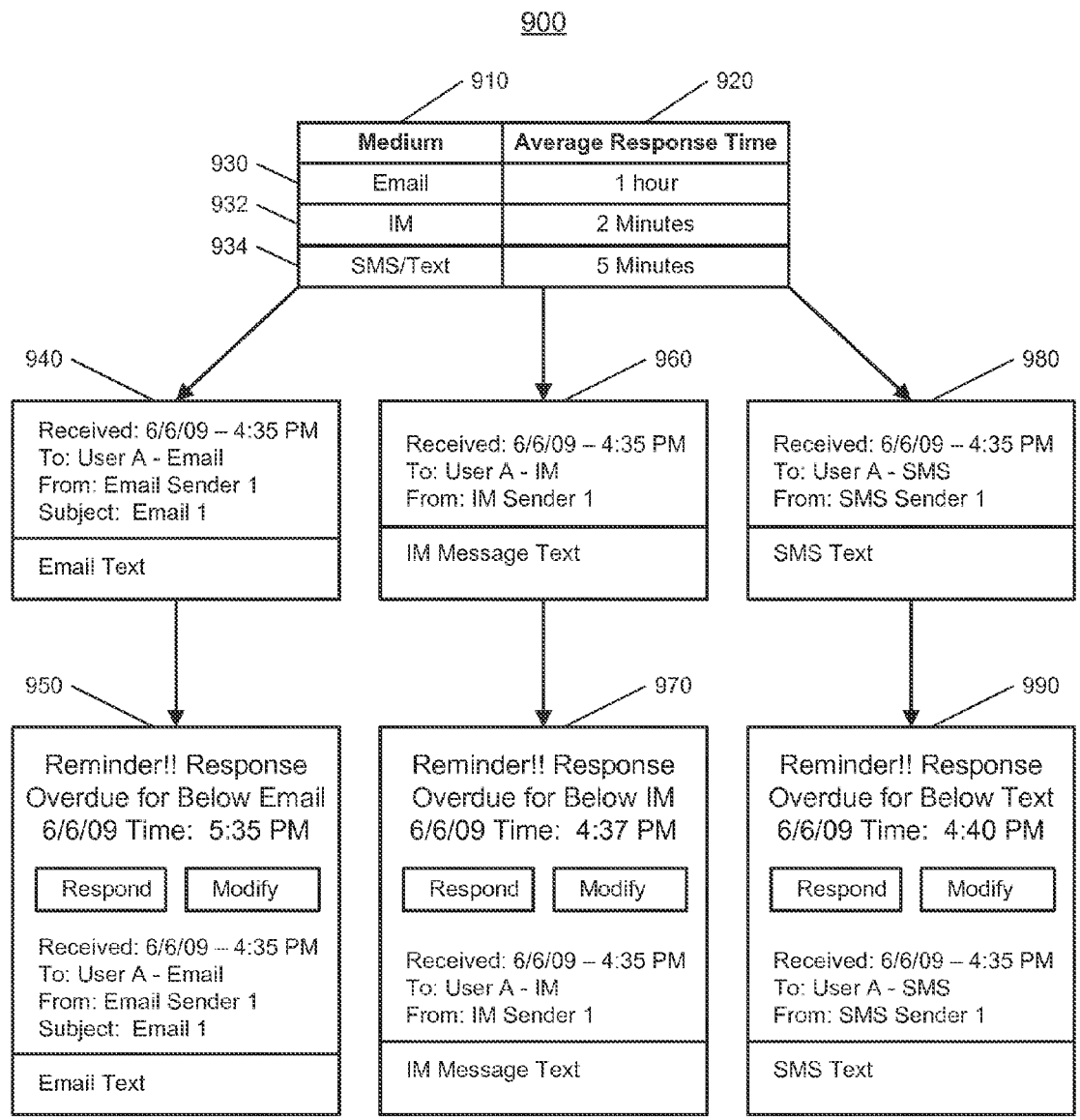

FIG. 9 illustrates an example 900 of setting a reminder based on a communication medium. As shown, the example 900 includes tracked response pattern data that has a medium column 910 and an average response time column 920. The medium column 910 includes data identifying a medium of communications to which a user has responded in the past. The medium may include email, instant message, telephone, text or SMS message, etc. The average response time column 920 includes data indicating an average response time of the user for past communications having the corresponding medium in the medium column 910.

In the example 900, the tracked response pattern data includes a first row 930 indicating that the user responds to email communications on average in one hour. The tracked response pattern data also includes a second row 932 indicating that the user responds to instant message communications on average in two minutes. In addition, the tracked response pattern data includes a third row 934 indicating that the user responds to SMS/text communications on average in five minutes. Although the tracked response pattern data includes three rows for ease of explanation, the tracked response pattern data may include more rows and data corresponding to additional types of communications (e.g., telephone calls, etc.).

In one example, the system 200 receives a first communication 940 over the email medium. In this example, the system 200 determines that the first communication 940 is an email communication, identifies the row 930 in the tracked response pattern data corresponding to email communications, and accesses the average response time data from the row 930 in the tracked response pattern data. Because the first communication 940 was received on Jun. 6, 2009 at 4:35 PM and the user responds to email communications on average in one hour, the system 200 provides a reminder 950 related to the first communication 940 to the user on Jun. 6, 2009 at 5:35 PM. The reminder 950 includes a reminder portion that indicates that a response to the communication is overdue, a communication portion that provides details related to the first communication to which the reminder corresponds, a respond interface control, and a modify interface control.

In another example, the system 200 receives a second communication 960 over the instant message medium. In this example, the system 200 determines that the second communication 960 is an instant message communication, identifies the row 932 in the tracked response pattern data corresponding to instant message communications, and accesses the average response time data from the row 932 in the tracked response pattern data. Because the second communication 960 was received on Jun. 6, 2009 at 4:35 PM and the user responds to instant message communications on average in two minutes, the system 200 provides a reminder 970 related to the second communication 960 to the user on Jun. 6, 2009 at 4:37 PM. The reminder 970 includes a reminder portion that indicates that a response to the communication is overdue, a communication portion that provides details related to the second communication to which the reminder corresponds, a respond interface control, and a modify interface control.

In yet another example, the system 200 receives a third communication 980 over the text or SMS medium. In this example, the system 200 determines that the third communication 980 is a text or SMS communication, identifies the row 934 in the tracked response pattern data corresponding to text or SMS communications, and accesses the average response time data from the row 934 in the tracked response pattern data. Because the third communication 980 was received on Jun. 6, 2009 at 4:35 PM and the user responds to text or SMS communications on average in five minutes, the system 200 provides a reminder 990 related to the third communication 980 to the user on Jun. 6, 2009 at 4:40 PM. The reminder 990 includes a reminder portion that indicates that a response to the communication is overdue, a communication portion that provides details related to the third communication to which the reminder corresponds, a respond interface control, and a modify interface control.

Figure 10:
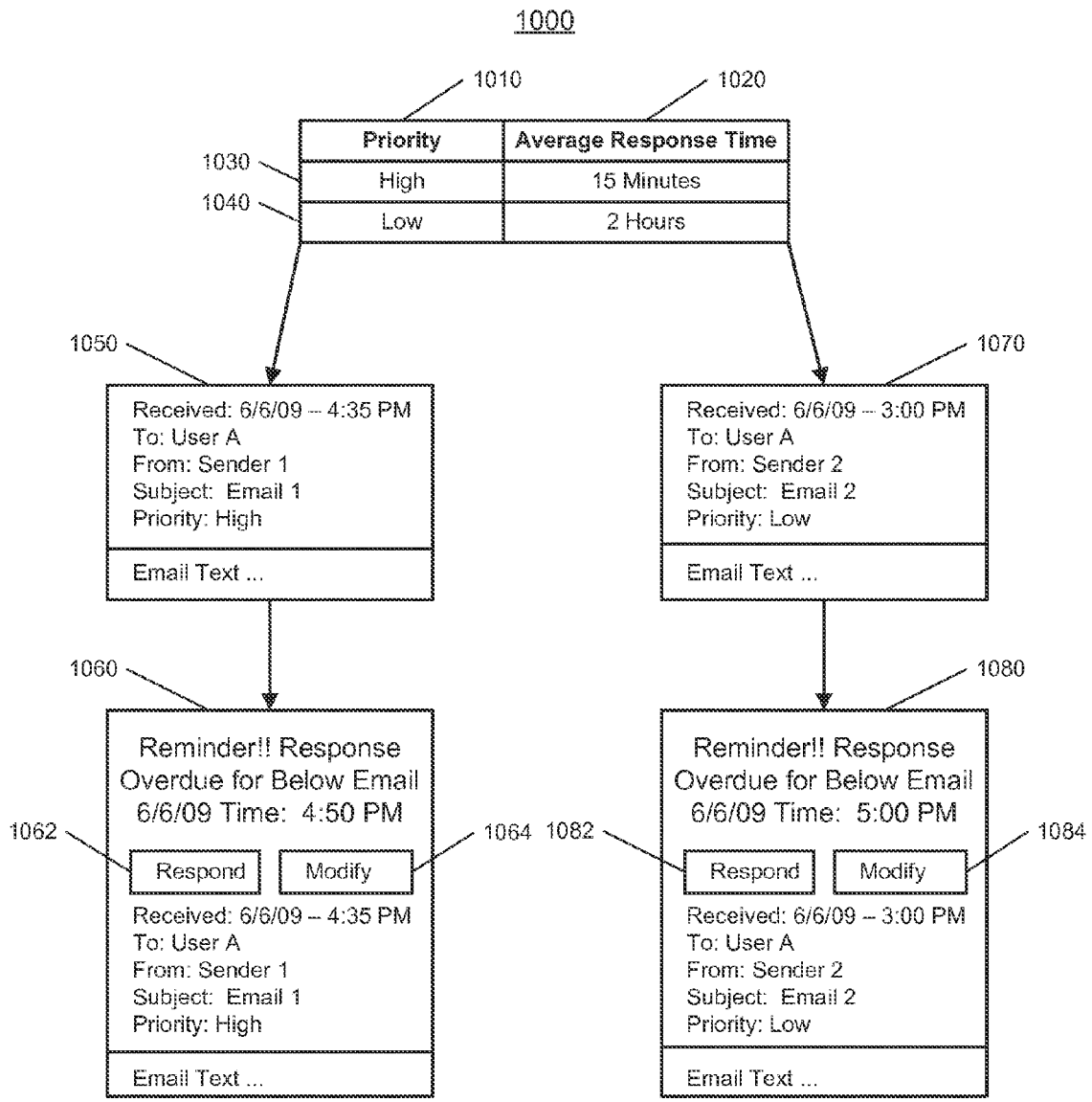

FIG. 10 illustrates an example 1000 of setting a reminder based on a priority designation of a communication. As shown, the example 1000 includes tracked response pattern data that has a priority designation column 1010 and an average response time column 1020. The priority designation column 1010 includes data identifying a priority designation of communications to which a user has responded in the past. The average response time column 1020 includes data indicating an average response time of the user for past communications received having the corresponding priority designation in the priority designation column 1010. In the example 1000, the tracked response pattern data includes a first row 1030 indicating that the user responds to communications having a priority designation of High on average in 15 minutes. The tracked response pattern data also includes a second row 1040 indicating that the user responds to communications having a priority designation of Low on average in two hours. Although the tracked response pattern data includes two rows for ease of explanation, the tracked response pattern data may include more rows and data corresponding to many different priority designations.

In one example, the system 200 receives a first communication 1050 having a priority designation of High. In this example, because the first communication 1050 has a priority designation of High, was received on Jun. 6, 2009 at 4:35 PM, and the user responds to communications having a priority designation of High on average in 15 minutes, the system 200 provides a reminder 1060 related to the first communication 1050 to the user on Jun. 6, 2009 at 4:50 PM. The reminder 1060 includes a reminder portion that indicates that a response to the communication is overdue, a communication portion that provides details related to the first communication to which the reminder corresponds, a respond interface control 1062, and a modify interface control 1064. The respond interface control 1062 enables the user to respond to the first communication 1050 (e.g., by displaying a response communication interface, such as a response email composition interface that results when a user selects a respond control) when the user selects the respond interface control 1062 (e.g., using a mouse to select the respond interface control 1062). The modify interface control 1064 enables the user to modify the reminder 1060 (e.g., by displaying a modify reminder interface) when the user selects the modify interface control 1064 (e.g., using a mouse to select the modify interface control 1064). For instance, the user may use a modify reminder interface to extend the reminder time associated with the reminder 1060 (e.g., snooze the reminder 1060) or to cancel the reminder 1060. Other examples may provide a different combination (e.g., a subset) of the information provided in the reminder 1060 or other information that effectuates a reminder to the user.

In another example, the system 200 receives a second communication 1070 having a priority designation of Low. In this example, because the second communication 1070 has a priority designation of Low, was received on Jun. 6, 2009 at 3:00 PM, and the user responds to communications having a priority designation of Low on average in two hours, the system 200 provides a reminder 1080 related to the second communication 1070 to the user on Jun. 6, 2009 at 5:00 PM. The reminder 1080 includes a reminder portion that indicates that a response to the communication is overdue, a communication portion that provides details related to the second communication to which the reminder corresponds, a respond interface control 1082, and a modify interface control 1084. The respond interface control 1082 is similar to the respond interface control 1062 and the modify interface control 1084 is similar to the modify interface control 1064.

Figure 11:
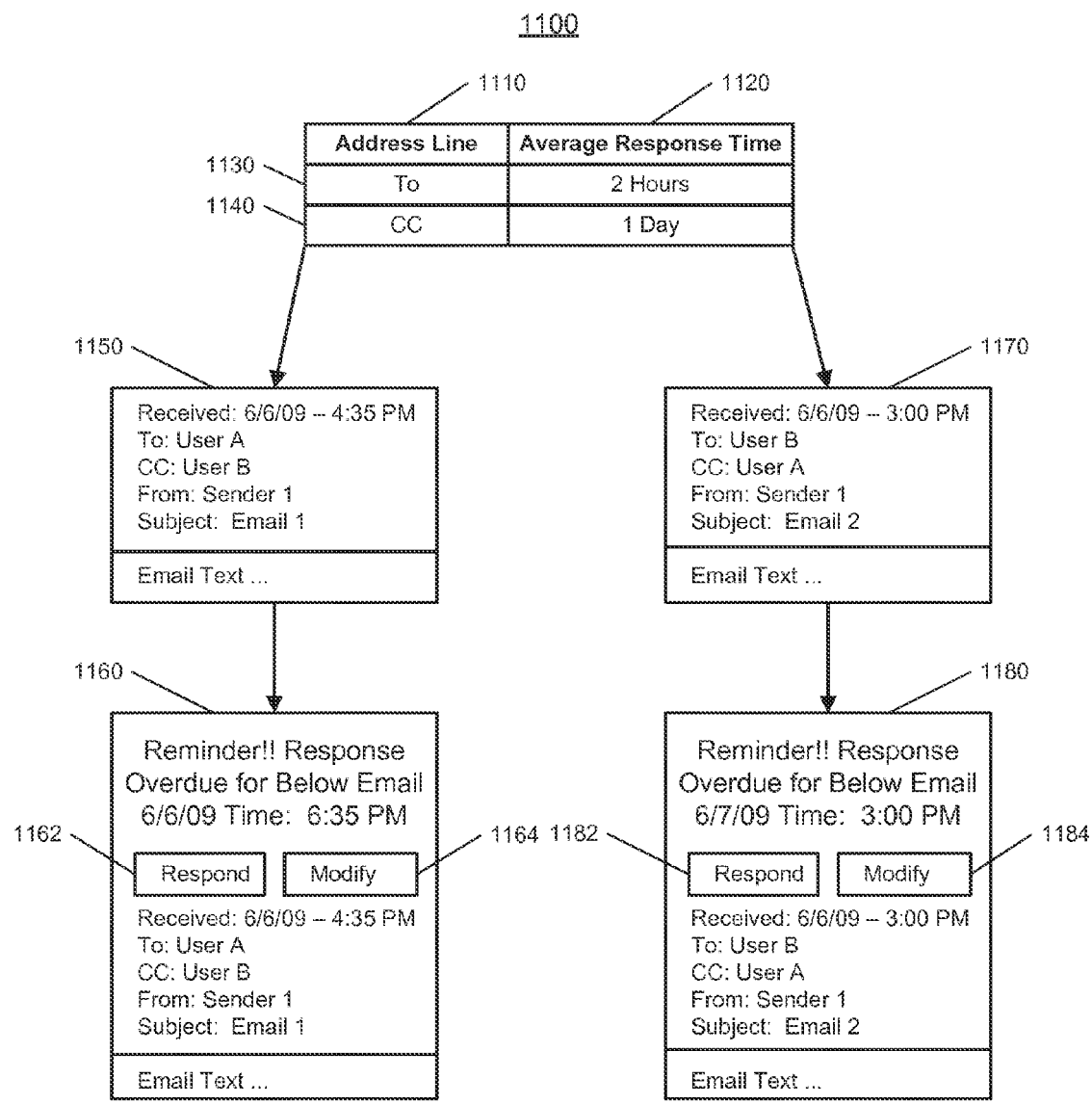

FIG. 11 illustrates an example 1100 of setting a reminder based on an address line of a communication. As shown, the example 1100 includes tracked response pattern data that has an address line column 1110 and an average response time column 1120. The address line column 1110 includes data identifying a location in an address line of communications to which a user has responded in the past. For instance, the location in the address line may indicate whether the communication directly sent to the user (e.g., the TO portion of an address line) or whether the user was only copied on the communication (e.g., the CC portion of an address line). The average response time column 1120 includes data indicating an average response time of the user for past communications received having the corresponding address line in the address line column 1110. In the example 1100, the tracked response pattern data includes a first row 1130 indicating that the user responds to communications directly addressed to the user (e.g., the user is listed in the TO field of the address) on average in two hours. The tracked response pattern data also includes a second row 1140 indicating that the user responds to communications on which the user was copied (e.g., the user is listed in the CC field of the address) on average in one day. Although the tracked response pattern data includes two rows for ease of explanation, the tracked response pattern data may include more rows and data corresponding to different address line options.

In one example, the system 200 receives a first communication 1150 directly addressed to the user (e.g., the user is listed in the TO field of the address). In this example, because the first communication 1150 was directly addressed to the user, was received on Jun. 6, 2009 at 4:35 PM, and the user responds to direct address communications on average in two hours, the system 200 provides a reminder 1160 related to the first communication 1150 to the user on Jun. 6, 2009 at 6:35 PM. The reminder 1160 includes a reminder portion that indicates that a response to the communication is overdue, a communication portion that provides details related to the first communication to which the reminder corresponds, a respond interface control 1162, and a modify interface control 1164. The respond interface control 1162 enables the user to respond to the first communication 1150 (e.g., by displaying a response communication interface, such as a response email composition interface that results when a user selects a respond control) when the user selects the respond interface control 1162 (e.g., using a mouse to select the respond interface control 1162). The modify interface control 1164 enables the user to modify the reminder 1160 (e.g., by displaying a modify reminder interface) when the user selects the modify interface control 1164 (e.g., using a mouse to select the modify interface control 1164). For instance, the user may use a modify reminder interface to extend the reminder time associated with the reminder 1160 (e.g., snooze the reminder 1160) or to cancel the reminder 1160. Other examples may provide a different combination (e.g., a subset) of the information provided in the reminder 1160 or other information that effectuates a reminder to the user.

In another example, the system 200 receives a second communication 1170 on which the user was copied (e.g., the user is listed in the CC field of the address). In this example, because the second communication 1170 was only copied to the user, was received on Jun. 6, 2009 at 3:00 PM, and the user responds to copied communications on average in one day, the system 200 provides a reminder 1180 related to the second communication 1170 to the user on Jun. 7, 2009 at 3:00 PM. The reminder 1180 includes a reminder portion that indicates that a response to the communication is overdue, a communication portion that provides details related to the second communication to which the reminder corresponds, a respond interface control 1182, and a modify interface control 1184. The respond interface control 1182 is similar to the respond interface control 1162 and the modify interface control 1184 is similar to the modify interface control 1164.

Figure 12:
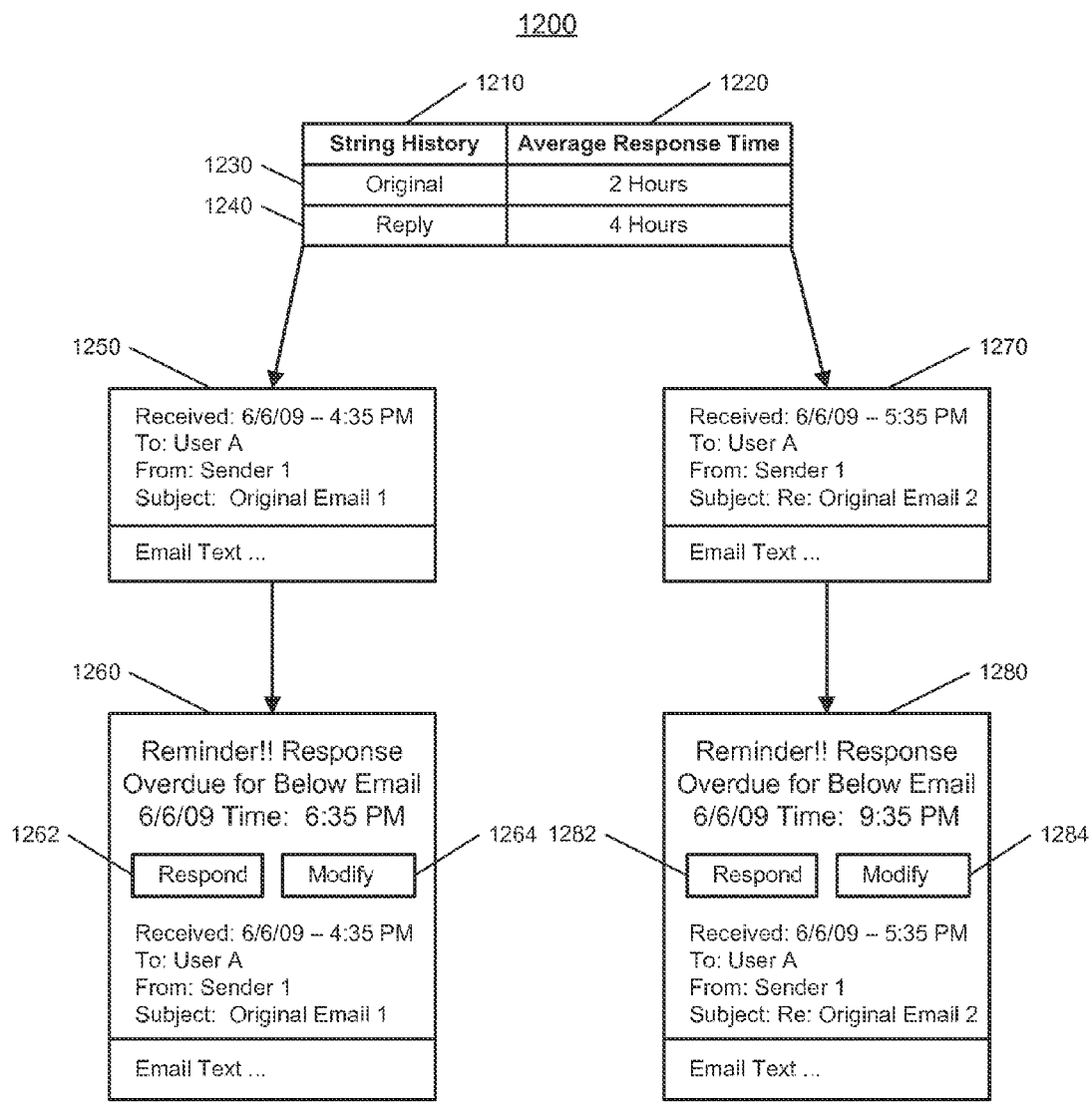

FIG. 12 illustrates an example 1200 of setting a reminder based on a string history of a communication. As shown, the example 1200 includes tracked response pattern data that has a string history column 1210 and an average response time column 1220. The string history column 1210 includes data identifying a location in a string of communications to which a user has responded in the past. For instance, the location in the string may indicate whether the communication was an original communication sent to the user (e.g., the first communication in a string of communications) or whether the communication was a reply to a communication sent by the user (e.g., the second or later communication in a string of communications). The average response time column 1220 includes data indicating an average response time of the user for past communications received having the corresponding string history in the string history column 1210. In the example 1200, the tracked response pattern data includes a first row 1230 indicating that the user responds to original communications sent to the user on average in two hours. The tracked response pattern data also includes a second row 1240 indicating that the user responds to reply communications on average in four hours. Although the tracked response pattern data includes two rows for case of explanation, the tracked response pattern data may include more rows and data corresponding to different string history options (e.g., communications forwarded to the user, a reply to a communication not sent by the user, different numbers of communications in the string, etc.).

In one example, the system 200 receives a first communication 1250 that is an original communication sent to the user. In this example, because the first communication 1250 was an original communication, was received on Jun. 6, 2009 at 4:35 PM, and the user responds to original communications on average in two hours, the system 200 provides a reminder 1260 related to the first communication 1250 to the user on Jun. 6, 2009 at 6:35 PM. The reminder 1260 includes a reminder portion that indicates that a response to the communication is overdue, a communication portion that provides details related to the first communication to which the reminder corresponds, a respond interface control 1262, and a modify interface control 1264. The respond interface control 1262 enables the user to respond to the first communication 1250 (e.g., by displaying a response communication interface, such as a response email composition interface that results when a user selects a respond control) when the user selects the respond interface control 1262 (e.g., using a mouse to select the respond interface control 1262). The modify interface control 1264 enables the user to modify the reminder 1260 (e.g., by displaying a modify reminder interface) when the user selects the modify interface control 1264 (e.g., using a mouse to select the modify interface control 1264). For instance, the user may use a modify reminder interface to extend the reminder time associated with the reminder 1260 (e.g., snooze the reminder 1260) or to cancel the reminder 1260. Other examples may provide a different combination (e.g., a subset) of the information provided in the reminder 1260 or other information that effectuates a reminder to the user.

In another example, the system 200 receives a second communication 1270 that is a reply to a communication sent by the user. In this example, because the second communication 1270 is a reply communication, was received on Jun. 6, 2009 at 5:35 PM, and the user responds to reply communications on average in four hours, the system 200 provides a reminder 1280 related to the second communication 1270 to the user on Jun. 6, 2009 at 9:35 PM. The reminder 1280 includes a reminder portion that indicates that a response to the communication is overdue, a communication portion that provides details related to the second communication to which the reminder corresponds, a respond interface control 1282, and a modify interface control 1284. The respond interface control 1282 is similar to the respond interface control 1262 and the modify interface control 1284 is similar to the modify interface control 1264.

Figure 13:
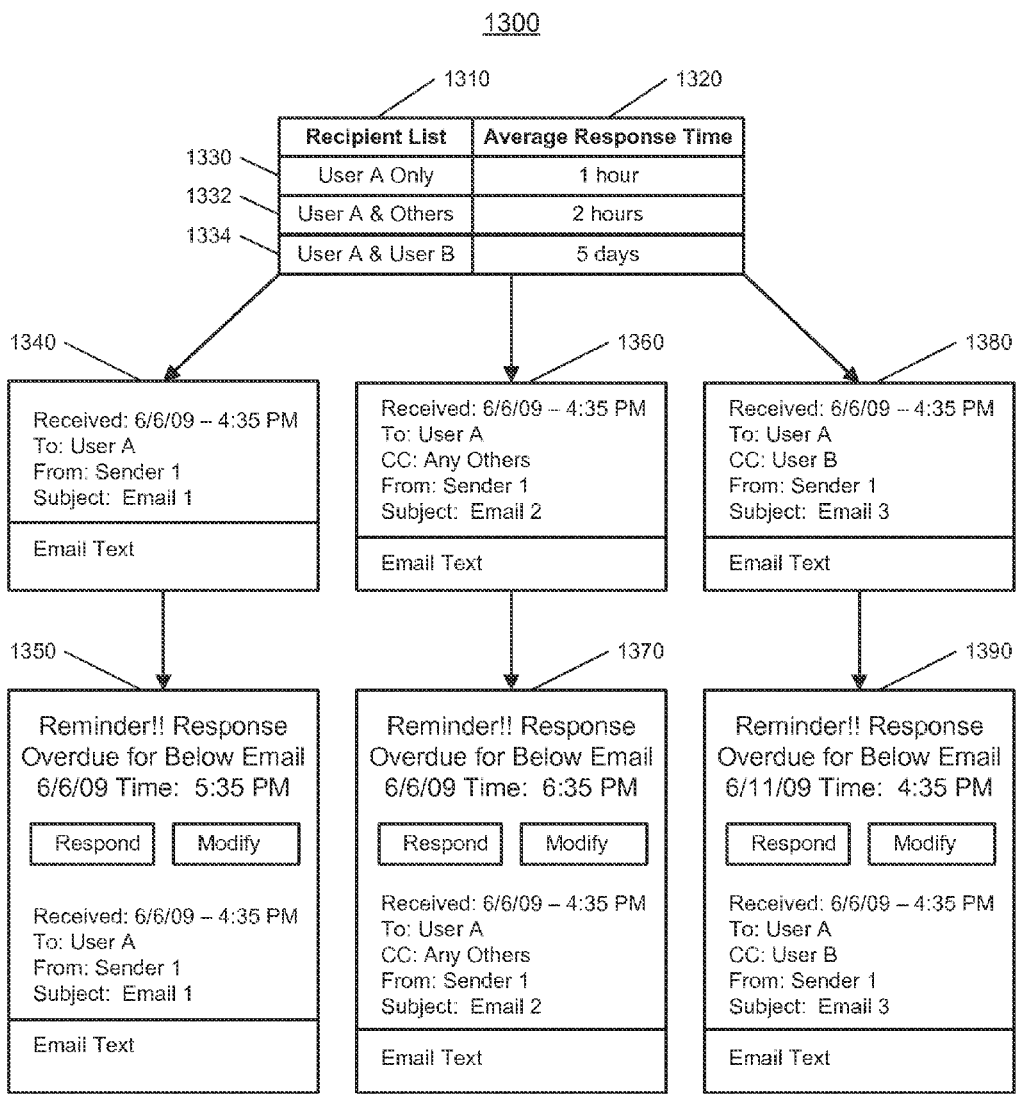

FIG. 13 illustrates an example 1300 of setting a reminder based on an arrangement within a recipient list. As shown, the example 1300 includes tracked response pattern data that has a recipient list column 1310 and an average response time column 1320. The recipient list column 1310 includes data identifying recipient list arrangement for communications to which a user has responded in the past. The recipient list arrangement may include sent to the user only, sent to the user and at least one other user, sent to the user and another particular user, etc. The average response time column 1320 includes data indicating an average response time of the user for past communications having the corresponding recipient list arrangement in the recipient list column 1310.

In the example 1300, the tracked response pattern data includes a first row 1330 indicating that the user responds to communications sent only to User A on average in one hour. The tracked response pattern data also includes a second row 1332 indicating that the user responds to communications sent to User A and one or more other users on average in two hours. In addition, the tracked response pattern data includes a third row 1334 indicating that the user responds to communications sent to User A and User B on average in five days. Although the tracked response pattern data includes three rows for ease of explanation, the tracked response pattern data may include more rows and data corresponding to additional recipient list arrangements of communications.

In one example, the system 200 receives a first communication 1340 sent only to User A. In this example, the system 200 determines that the first communication 1340 is sent only to User A, identifies the row 1330 in the tracked response pattern data corresponding to communications sent only to User A, and accesses the average response time data from the row 1330 in the tracked response pattern data. Because the first communication 1340 was received on Jun. 6, 2009 at 4:35 PM and the user responds to communications sent only to User A on average in one hour, the system 200 provides a reminder 1350 related to the first communication 1340 to the user on Jun. 6, 2009 at 5:35 PM, The reminder 1350 includes a reminder portion that indicates that a response to the communication is overdue, a communication portion that provides details related to the first communication to which the reminder corresponds, a respond interface control, and a modify interface control.

In another example, the system 200 receives a second communication 1360 that is sent to User A and others. In this example, the system 200 determines that the second communication 1360 is sent to User A and others, identifies the row 1332 in the tracked response pattern data corresponding to communications sent to User A and others, and accesses the average response time data from the row 1332 in the tracked response pattern data. Because the second communication 1360 was received on Jun. 6, 2009 at 4:35 PM and the user responds to communications sent to User A and others on average in two hours, the system 200 provides a reminder 1370 related to the second communication 1360 to the user on Jun. 6, 2009 at 6:35 PM. The reminder 1370 includes a reminder portion that indicates that a response to the communication is overdue, a communication portion that provides details related to the second communication to which the reminder corresponds, a respond interface control, and a modify interface control.

In yet another example, the system 200 receives a third communication 1380 that is sent to User A and User B, In this example, the system 200 determines that the third communication 1380 is sent to User A and User B, identifies the row 1334 in the tracked response pattern data corresponding to communications sent to User A and User B, and accesses the average response time data from the row 1334 in the tracked response pattern data. Because the third communication 1380 was received on Jun. 6, 2009 at 4:35 PM and the user responds to communications sent to User A and User B on average in five days, the system 200 provides a reminder 1390 related to the third communication 1380 to the user on Jun. 11, 2009 at 4:35 PM. The reminder 1390 includes a reminder portion that indicates that a response to the communication is overdue, a communication portion that provides details related to the third communication to which the reminder corresponds, a respond interface control, and a modify interface control.

Figure 14:
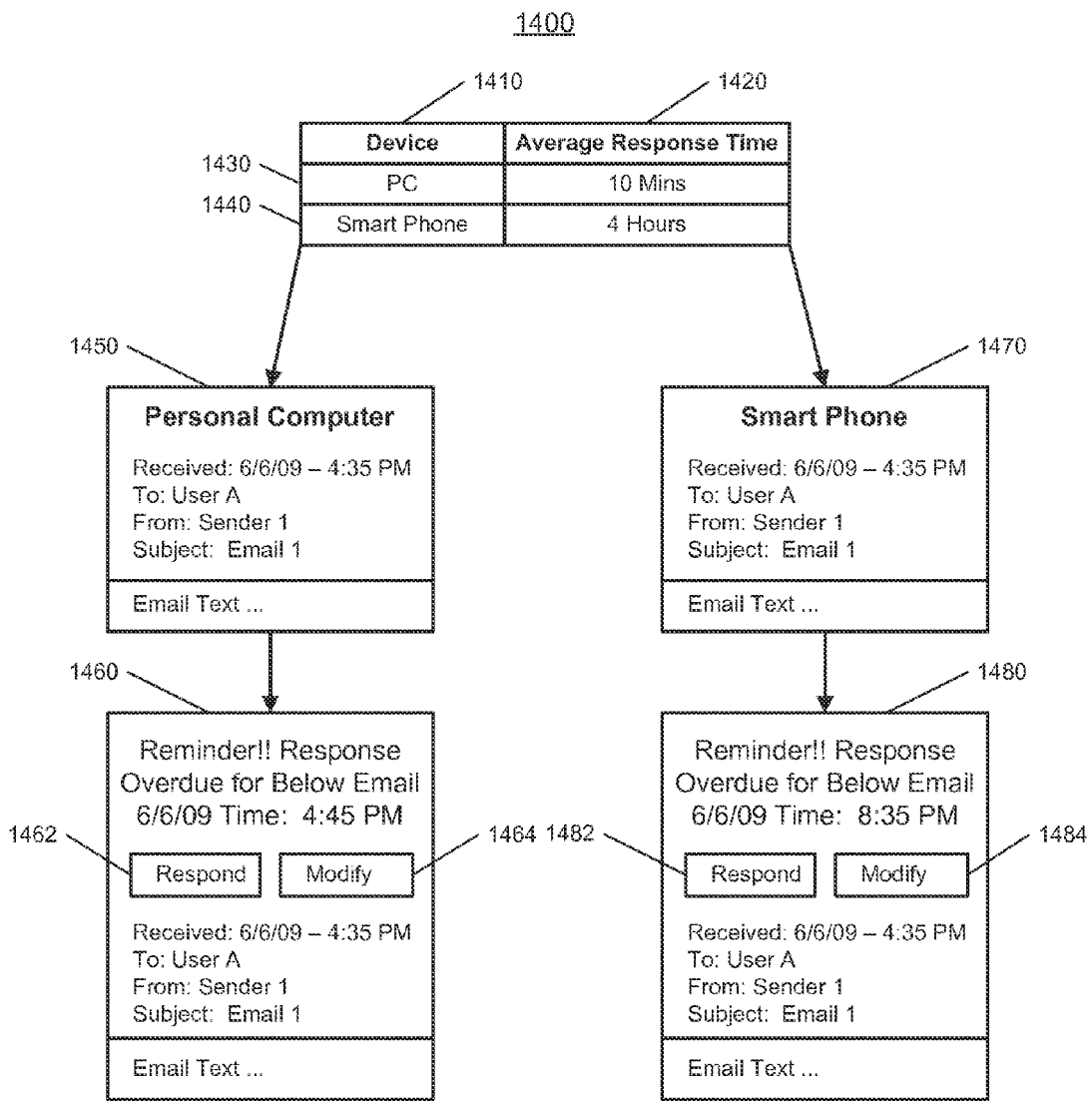

FIG. 14 illustrates an example 1400 of setting a reminder based on a device the user is using to receive or perceive a communication. As shown, the example 1400 includes tracked response pattern data that has a device column 1410 and an average response time column 1420. The device column 1410 includes data identifying a device a user has used in the past to receive or perceive communications. The average response time column 1420 includes data indicating an average response time of the user for past communications having the corresponding device in the device column 1410. In the example 1400, the tracked response pattern data includes a first row 1430 indicating that the user responds to communications received or perceived on a personal computer (PC) on average in ten minutes. The tracked response pattern data also includes a second row 1440 indicating that the user responds to communications received or perceived on a smart phone on average in four hours. Although the tracked response pattern data includes two rows for ease of explanation, the tracked response pattern data may include more rows and data corresponding to different device options.

In one example, the system 200 receives a first communication 1450 that is received or perceived on a PC. In this example, because the first communication 1450 was received or perceived on the PC, was received on Jun. 6, 2009 at 4:35 PM, and the user responds to communications on the PC on average in ten minutes, the system 200 provides a reminder 1460 related to the first communication 1450 to the user on Jun. 6, 2009 at 4:45 PM. The reminder 1460 includes a reminder portion that indicates that a response to the communication is overdue, a communication portion that provides details related to the first communication to which the reminder corresponds, a respond interface control 1462, and a modify interface control 1464. The respond interface control 1462 enables the user to respond to the first communication 1450 (e.g., by displaying a response communication interface, such as a response email composition interface that results when a user selects a respond control) when the user selects the respond interface control 1462 (e.g., using a mouse to select the respond interface control 1462). The modify interface control 1464 enables the user to modify the reminder 1460 (e.g., by displaying a modify reminder interface) when the user selects the modify interface control 1464 (e.g., using a mouse to select the modify interface control 1464). For instance, the user may use a modify reminder interface to extend the reminder time associated with the reminder 1460 (e.g., snooze the reminder 1460) or to cancel the reminder 1460. Other examples may provide a different combination (e.g., a subset) of the information provided in the reminder 1460 or other information that effectuates a reminder to the user.

In another example, the system 200 receives a second communication 1470 that is received or perceived on a smart phone. In this example, because the second communication 1470 was received or perceived on the smart phone, was received on Jun. 6, 2009 at 4:35 PM, and the user responds to communications on the smart phone on average in four hours, the system 200 provides a reminder 1480 related to the second communication 1470 to the user on Jun. 6, 2009 at 8:35 PM. The reminder 1480 includes a reminder portion that indicates that a response to the communication is overdue, a communication portion that provides details related to the second communication to which the reminder corresponds, a respond interface control 1482, and a modify interface control 1484. The respond interface control 1482 is similar to the respond interface control 1462 and the modify interface control 1484 is similar to the modify interface control 1464.

Figure 15:
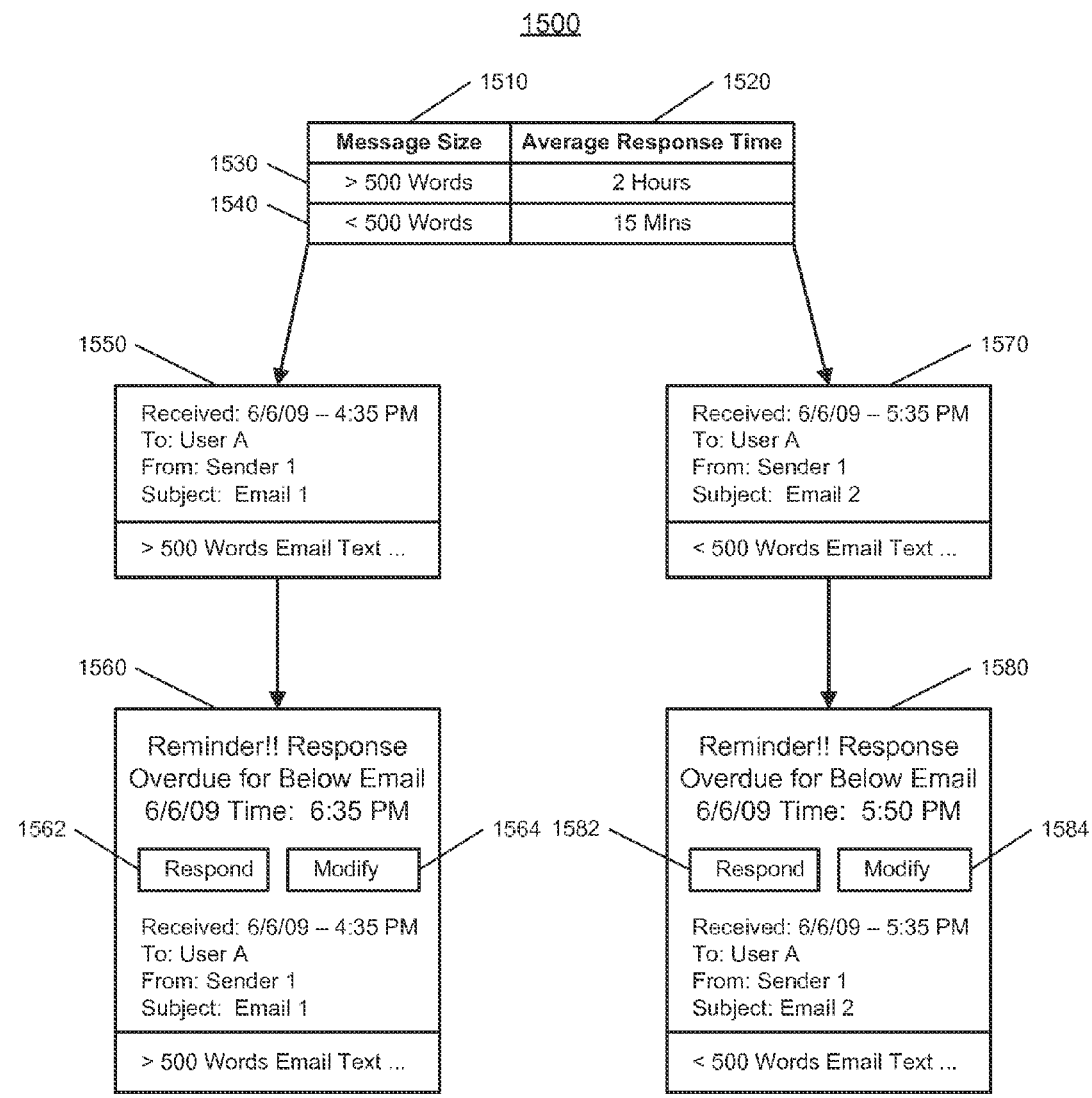
Figure 16:
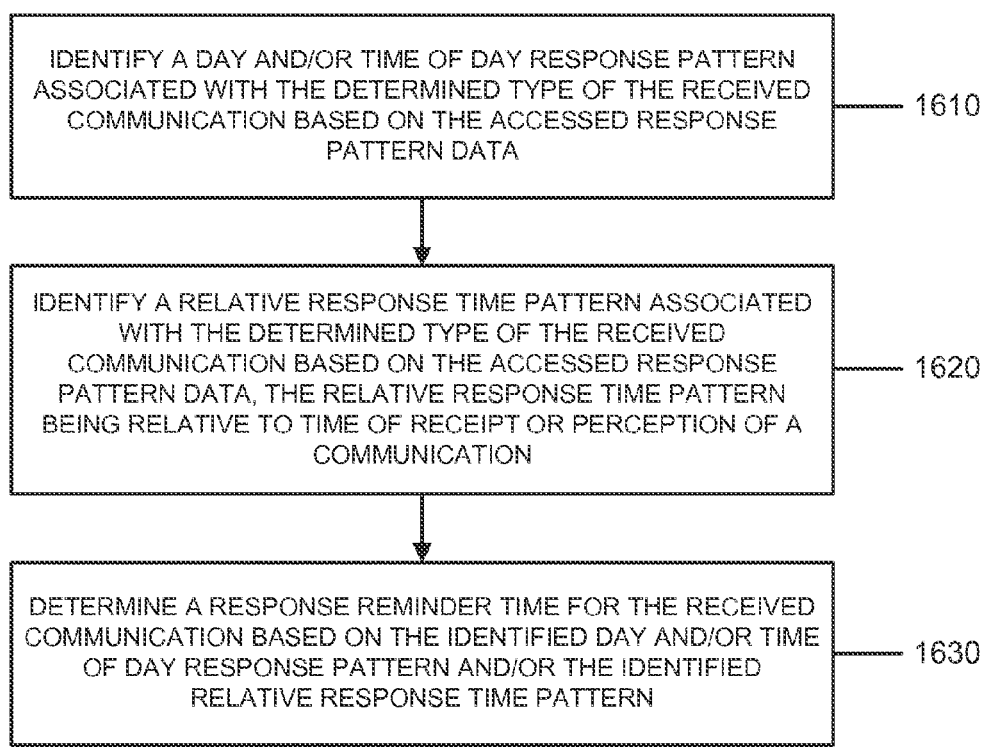
Figure 17:
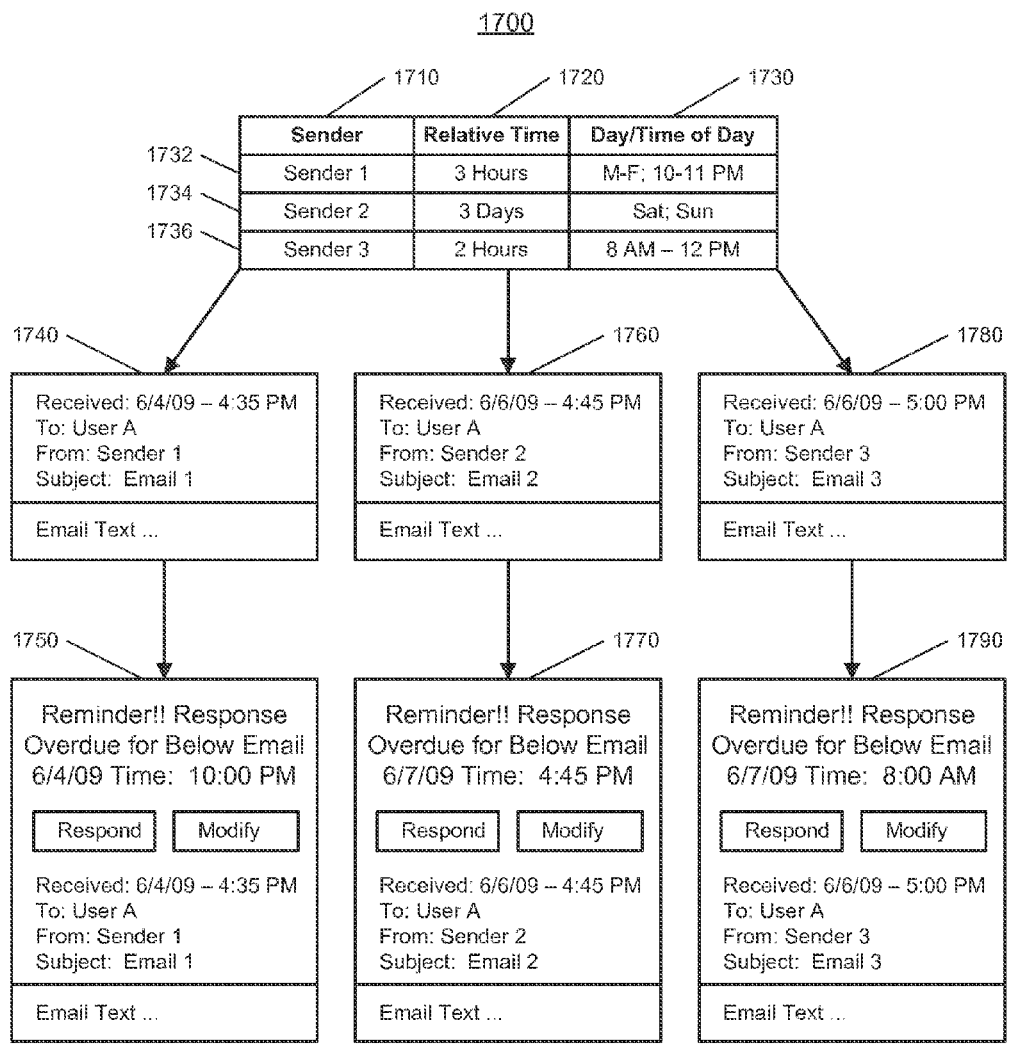

FIG. 15 illustrates an example 1500 of setting a reminder based on a size of a communication. As shown, the example 1500 includes tracked response pattern data that has a size column 1510 and an average response time column 1520. The size column 1510 includes data identifying a size of communications to which a user has responded in the past. The average response time column 1520 includes data indicating an average response time of the user for past communications having the corresponding size in the size column 1510. In the example 1500, the tracked response pattern data includes a first row 1530 indicating that the user responds to communications having a size of greater than 500 words on average in two hours. The tracked response pattern data also includes a second row 1540 indicating that the user responds to communications having a size of less than 500 words on average in 15 minutes. Although the tracked response pattern data includes two rows for ease of explanation, the tracked response pattern data may include more rows and data corresponding to many different size options.

In one example, the system 200 receives a first communication 1550 having more than 500 words of text. In this example, because the first communication 1550 has more than 500 words of text, was received on Jun. 6, 2009 at 4:35 PM, and the user responds to communications having more than 500 words of text on average in two hours, the system 200 provides a reminder 1560 related to the first communication 1550 to the user on Jun. 6, 2009 at 6:35 PM. The reminder 1560 includes a reminder portion that indicates that a response to the communication is overdue, a communication portion that provides details related to the first communication to which the reminder corresponds, a respond interface control 1562, and a modify interface control 1564. The respond interface control 1562 enables the user to respond to the first communication 1550 (e.g., by displaying a response communication interface, such as a response email composition interface that results when a user selects a respond control) when the user selects the respond interface control 1562 (e.g., using a mouse to select the respond interface control 1562). The modify interface control 1564 enables the user to modify the reminder 1560 (e.g., by displaying a modify reminder interface) when the user selects the modify interface control 1564 (e.g., using a mouse to select the modify interface control 1564). For instance, the user may use a modify reminder interface to extend the reminder time associated with the reminder 1560 (e.g., snooze the reminder 1560) or to cancel the reminder 1560. Other examples may provide a different combination (e.g., a subset) of the information provided in the reminder 1560 or other information that effectuates a reminder to the user.

In another example, the system 200 receives a second communication 1570 that has less than 500 words of text. In this example, because the second communication 1570 has less than 500 words of text, was received on Jun. 6, 2009 at 5:35 PM, and the user responds to communications having less than 500 words of text on average in 15 minutes, the system 200 provides a reminder 1580 related to the second communication 1570 to the user on Jun. 6, 2009 at 5:50 PM. The reminder 1580 includes a reminder portion that indicates that a response to the communication is overdue, a communication portion that provides details related to the second communication to which the reminder corresponds, a respond interface control 1582, and a modify interface control 1584. The respond interface control 1582 is similar to the respond interface control 1562 and the modify interface control 1584 is similar to the modify interface control 1564.

FIG. 16 illustrates an example of a process 1600 for determining a response reminder time for a received communication. The system 200 identifies a day and/or time of day response pattern associated with the determined type of the received communication based on the accessed response pattern data (1610). For instance, the system 200 accesses the day and/or time of day response pattern from stored response pattern data (e.g., from the data structure 400). The day and/or time of day response pattern may have been determined by monitoring responses to communications of the determined type and identifying a day and/or time of day the user typically (e.g., more than 50% of the time) has responded to the communications of the determined type in the past. The day and/or time of day may indicate a particular day of the week, a range of multiple days of the week, particular calendar dates or time periods (e.g., months), a particular time of day, and/or a particular range of times of the day. The time of day or time of day range may vary for different days of the week or different time periods.

The system 200 identifies a relative response time pattern associated with the determined type of the received communication based on the accessed response pattern data, the relative response time pattern being relative to time of receipt of a communication (1620). For instance, the system 200 accesses the relative response time pattern from stored response pattern data (e.g., from the data structure 400). The relative response time pattern may have been determined by monitoring responses to communications of the determined type and identifying a time relative to receipt or perception by which the user has typically (e.g., more than 50% of the time) responded to the communications of the determined type in the past. The relative response time pattern may be an average response time, a median response time, etc.

The system 200 determines a response reminder time for the received communication based on the identified day and/or time of day response pattern and/or the identified relative response time pattern (1630). For example, the system 200 accounts for both the identified day and/or time of day response pattern and/or the identified relative response time pattern. In this example, the system 200 may attempt to determine a response reminder time that corresponds to both the identified day and/or time of day response pattern and the identified relative response time pattern. The system 200 may determine the relative response reminder time and then compare the determined relative response reminder time to the day and/or time of day response pattern. When the relative response reminder time corresponds to the day and/or time of day response pattern, the system 200 sets the response reminder time for the received communication as the time matching both patterns. When the relative response reminder time does not correspond to the day and/or time of day response pattern, the system 200 evaluates other options for setting the response reminder time.

In some implementations, the system 200 determines a difference between a computed relative reminder time and the day and/or time of day response pattern and compares the difference to a threshold. When the comparison reveals that the difference is within the threshold, the system 200 determines to use the computed relative reminder time as the response reminder time or determines to adjust the computed relative reminder time to match the day and/or time of day response pattern. When the comparison reveals that the difference is outside of the threshold, the system 200 determines to compute, based on both the computed relative reminder time and the day and/or time of day response pattern, another reminder time that does not match the computed relative reminder time or the day and/or time of day response pattern.

For instance, the system 200 may determine a midpoint between the computed relative reminder time and the day and/or time of day response pattern and set the response reminder time as the determined midpoint. As one example, when the relative reminder time is 1 PM and the time of day range starts at 5 PM, the system 200 may set the response reminder time at the 3 PM midpoint between 1 PM and 5 PM. The system 200 may adjust the computed relative reminder time forward or backward in time to account for the day and/or time of day response pattern.

In the example 1700, the tracked response pattern data includes a first row 1732 indicating that the user responds to communications sent by Sender 1 on average in three hours and typically Monday through Friday between the hours of 10 PM to 11 PM. The tracked response pattern data also includes a second row 1734 indicating that the user responds to communications sent by Sender 2 on average in three days and typically on Saturday or Sunday. In addition, the tracked response pattern data includes a third row 1736 indicating that the user responds to communications sent by Sender 3 on average in two hours and typically between the hours of 8 AM to 12 PM. Although the tracked response pattern data includes three rows for ease of explanation, the tracked response pattern data may include more rows and data corresponding to additional senders of communications (or other types of communications described throughout).

In one example, the system 200 receives a first communication 1740 sent by Sender 1. In this example, the system 200 determines that the first communication 1740 is sent by Sender 1, identifies the row 1732 in the tracked response pattern data corresponding to communications sent by Sender 1, and accesses the relative response time and the time of day/day of week response pattern data from the row 1732 in the tracked response pattern data. The system 200 automatically, without human intervention, determines a response reminder time for the first communication 1740 based on a combination of the accessed relative response time and time of day/day of week response pattern data. Because the first communication 1740 was received on Jun. 4, 2009 at 4:35 PM and the user responds to communications sent by Sender 1 on average in three hours and typically Monday through Friday between the hours of 10 PM to 1 l PM, the system 200 provides a reminder 1750 related to the first communication 1740 to the user on Jun. 4, 2009 at 10:00 PM. The system 200 determines the Jun. 4, 2009 at 10:00 PM reminder time using a combination of the accessed relative response time and time of day/day of week response pattern data. For instance, the system 200 determines that a relative reminder time should be set as Jun. 4, 2009 at 6:35 PM based solely on the relative response time. The system 200 compares the relative reminder time (Jun. 4, 2009 at 6:35 PM) to the time of day/day of week response pattern data. When the relative reminder time matches the time of day/day of week response pattern data, the response reminder is set as the relative reminder time. When the relative reminder time does not match the time of day/day of week response pattern data, the response reminder is set as the relative reminder time adjusted based on the time of day/day of week response pattern data. For example, the system 200 adjusts the relative reminder time to correspond to the closest time included in the time of day/day of week response pattern. In this example, the system 200 determines that, although the relative reminder time falls within the day of week response pattern (e.g., Monday through Friday), the relative reminder time does not fall within the time of day response pattern (e.g., 10 PM to 11 PM). Accordingly, in this example, the system 200 adjusts the relative reminder time (Jun. 4, 2009 at 6:35 PM) to the closest time that corresponds to the time of day response pattern (Jun. 4, 2009 at 10:00 PM). The reminder 1750 includes a reminder portion that indicates that a response to the communication is overdue, a communication portion that provides details related to the first communication to which the reminder corresponds, a respond interface control, and a modify interface control.

In another example, the system 200 receives a second communication 1760 that is sent by Sender 2. In this example, the system 200 determines that the second communication 1760 is sent by Sender 2, identifies the row 1734 in the tracked response pattern data corresponding to communications sent by Sender 2, and accesses the relative response time and the time of day/day of week response pattern data from the row 1734 in the tracked response pattern data. The system 200 automatically, without human intervention, determines a response reminder time for the second communication 1760 based on a combination of the accessed relative response time and time of day/day of week response pattern data. Because the second communication 1760 was received on Jun. 6, 2009 at 4:45 PM and the user responds to communications sent by Sender 2 on average in three days and typically on Saturday or Sunday, the system 200 provides a reminder 1770 related to the second communication 1760 to the user on Jun. 7, 2009 at 4:45 PM. The system 200 determines the Jun. 7, 2009 at 4:45 PM reminder time using a combination of the accessed relative response time and time of day/day of week response pattern data. For instance, the system 200 determines that a relative reminder time should be set as Jun. 9, 2009 at 4:45 PM based solely on the relative response time. The system 200 compares the relative reminder time (Jun. 9, 2009 at 4:45 PM) to the time of day/day of week response pattern data. When the relative reminder time matches the time of day/day of week response pattern data, the response reminder is set as the relative reminder time. When the relative reminder time does not match the time of day/day of week response pattern data, the response reminder is set as the relative reminder time adjusted based on the time of day/day of week response pattern data. For example, the system 200 adjusts the relative reminder time to correspond to a time included in the time of day/day of week response pattern. In this example, the system 200 determines that the relative reminder time does not fall within the day of week response pattern because Jun. 9, 2009 is a Tuesday. Accordingly, in this example, the system 200 adjusts a day of the relative reminder time (Jun. 9, 2009 at 4:45 PM) to the closest day of week that corresponds to the day of week response pattern (Jun. 7, 2009 at 4:45 PM). Although earlier, the system 200 determines that the relative reminder day (Jun. 9, 2009) is closer to Sunday, Jun. 7, 2009 than the next closest option of Saturday, Jun. 13, 2009. The system 200 maintains a time of day of the relative reminder time because the row 1734 does not include time of day response pattern data. The reminder 1770 includes a reminder portion that indicates that a response to the communication is overdue, a communication portion that provides details related to the second communication to which the reminder corresponds, a respond interface control, and a modify interface control.

In yet another example, the system 200 receives a third communication 1780 that is sent by Sender 3, In this example, the system 200 determines that the third communication 1780 is sent by Sender 3, identifies the row 1736 in the tracked response pattern data corresponding to communications sent by Sender 3, and accesses the relative response time and the time of day/day of week response pattern data from the row 1736 in the tracked response pattern data. The system 200 automatically, without human intervention, determines a response reminder time for the third communication 1780 based on a combination of the accessed relative response time and time of day/day of week response pattern data. Because the third communication 1780 was received on Jun. 6, 2009 at 5:00 PM and the user responds to communications sent by Sender 3 on average in two hours and typically between the hours of 8 AM to 12 PM, the system 200 provides a reminder 1790 related to the third communication 1780 to the user on Jun. 7, 2009 at 8:00 AM. The system 200 determines the Jun. 7, 2009 at 8:00 AM reminder time using a combination of the accessed relative response time and time of day/day of week response pattern data. For instance, the system 200 determines that a relative reminder time should be set as Jun. 6, 2009 at 7:00 PM based solely on the relative response time. The system 200 compares the relative reminder time (Jun. 6, 2009 at 7:00 PM) to the time of day/day of week response pattern data. When the relative reminder time matches the time of day/day of week response pattern data, the response reminder is set as the relative reminder time. When the relative reminder time does not match the time of day/day of week response pattern data, the response reminder is set as the relative reminder time adjusted based on the time of day/day of week response pattern data. For example, the system 200 adjusts the relative reminder time to correspond to a time included in the time of day/day of week response pattern. In this example, the system 200 determines that the relative reminder time (7:00 PM) does not fall within the time of day response pattern (8 AM to 12 PM). Accordingly, in this example, the system 200 adjusts the relative reminder time (Jun. 6, 2009 at 7:00 PM) to the next time that corresponds to the time of day response pattern (Jun. 7, 2009 at 8:00 AM). Although the relative reminder time is closer to 12:00 PM on Jun. 6, 2009, the system 200 determines not to adjust the reminder to 12:00 PM on Jun. 6, 2009 because that time had passed when the third communication 1780 was received. Accordingly, the system 200 sets the reminder to the next time in the future that corresponds to the time of day response pattern. The reminder 1790 includes a reminder portion that indicates that a response to the communication is overdue, a communication portion that provides details related to the third communication to which the reminder corresponds, a respond interface control, and a modify interface control.

In some implementations, the system 200 may set, using a combination of the accessed relative response time and time of day/day of week response pattern data, the response reminder time to a time that does not correspond to the time of day/day of week response pattern data. In these implementations, the system 200 may determine a relative reminder time based on the relative response time response pattern data and also determine a time of day/day of week reminder time based on the time of day/day of week response pattern data. Instead of adjusting the relative reminder time to a time that corresponds to the time of day/day of week response pattern data, the system 200 may determine a response reminder time as an average of the relative reminder time and the time of day/day of week reminder time even if the average reminder time does not correspond to the relative response time response pattern data or the time of day/day of week response pattern data.

Figure 18:
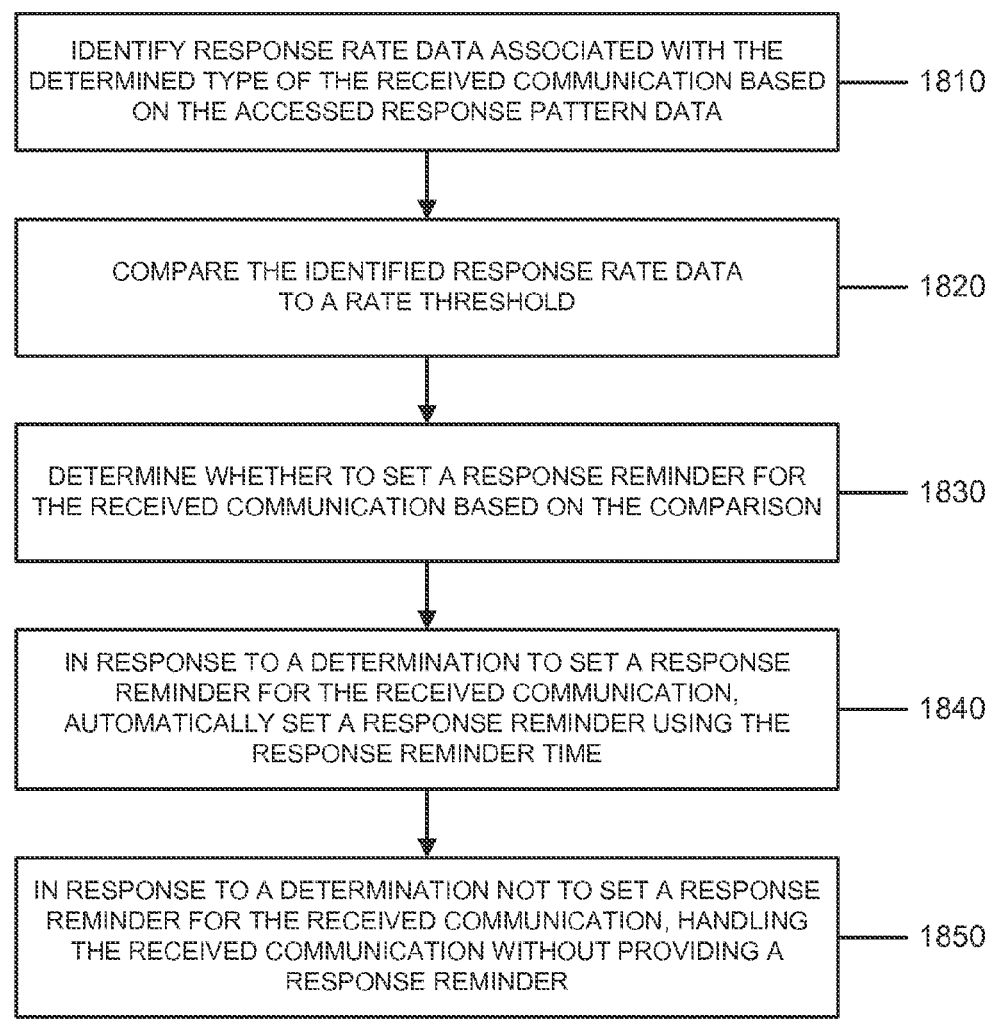

FIG. 18 illustrates an example of a process 1800 for determining whether to set a response reminder for a received communication based on response rate data. The system 200 identifies response rate data associated with a determined type of the received communication based on accessed response pattern data (1810). For instance, the system 200 accesses the response rate data from stored response pattern data (e.g., from the data structure 400). The response rate data may have been determined by monitoring receipt and responses to communications of the determined type and determining a percentage of communications of the determined type to which the user has responded. In some implementations, the system 200 may maintain, in the response pattern data, a running total of communications that user has received of the determined type and a running total of responses the user has sent to communications of the determined type. In these implementations, to identify the response rate data, the system 200 may access the running total of received communications and the running total of responses and compute a response rate based on the running total of received communications and the running total of responses (e.g., dividing the running total of responses by the running total of received communications).

The system 200 compares the identified response rate data to a rate threshold (1820). For instance, the system 200 accesses a rate threshold (e.g., 50%, 80%, etc.) from electronic storage and compares the identified or determined response rate data to the rate threshold. The system 200 may access a general rate threshold that applies to all communications or may access a specific rate threshold that applies to only communications of the determined type. The rate threshold may be defined based on user input.

In some implementations, the system 200 may define the rate threshold by tracking the user's reaction to set reminders in the past. In these implementations, the system 200 may determine whether the user cancelled a reminder or whether the user responded to a communication based on the reminder. The system 200 may track the circumstances and types of communications associated with reminders to which the user typically cancels and reminders to which the user typically responds. For instance, when the user typically responds (e.g., more than 50% of the time) to reminders associated with a particular type of communication, the system 200 may lower the response rate threshold associated with the particular type of communication.

In another example, a response rate threshold may be set at 60%. In this example, the system 200 may track the user's reaction to reminders set based on the 60% threshold in the past. The system 200 may track whether or not the user responded to the communication based on the reminder and the response rate for the type of communication for which the reminder was set. When the system 200 determines that the user typically responds (e.g., more than 50% of the time) to reminders for communications associated with a response rate of 75% or higher, but typically does not respond (e.g., less than 50% of the time) to reminders for communications associated with a response rate of lower than 75%, the system 200 may adjust the response rate threshold from 60% to 75%. In this regard, adjusting the response rate threshold automatically based on the user's reaction to past reminders may help the user avoid unwanted reminders and further focus the reminders on communications that are important to the user.

The system 200 determines whether to set a response reminder for the received communication based on the comparison (1830). For example, when the comparison reveals that the response rate exceeds the response rate threshold, the system 200 determines to set a response reminder for the communication. When the comparison reveals that the response rate is less than the response rate threshold, the system 200 determines not to set a response reminder for the communication.

In response to a determination to set a response reminder for the received communication, the system 200 automatically sets a response reminder using the response reminder time (1840). For instance, the system 200 automatically determines the response reminder time using one or more of the techniques described throughout this disclosure and sets a response reminder for the communication using the determined response reminder time. The system 200 may set the response reminder by storing reminder data in electronic storage that defines the response reminder. The reminder data may include an identification of the communication to which the reminder corresponds, a time when the reminder should be provided, and/or other information that should be included in the reminder (e.g., details of the communication to include with the reminder, such as sender, subject, time of receipt, etc.). The system 200 provides a reminder to the user based on the set reminder data.

In response to a determination not to set a response reminder for the received communication, the system 200 handles the received communication without providing a response reminder (1850). For instance, the system 200 does not store reminder data for the communication and does not automatically provide a response reminder for the communication.

Figure 19:
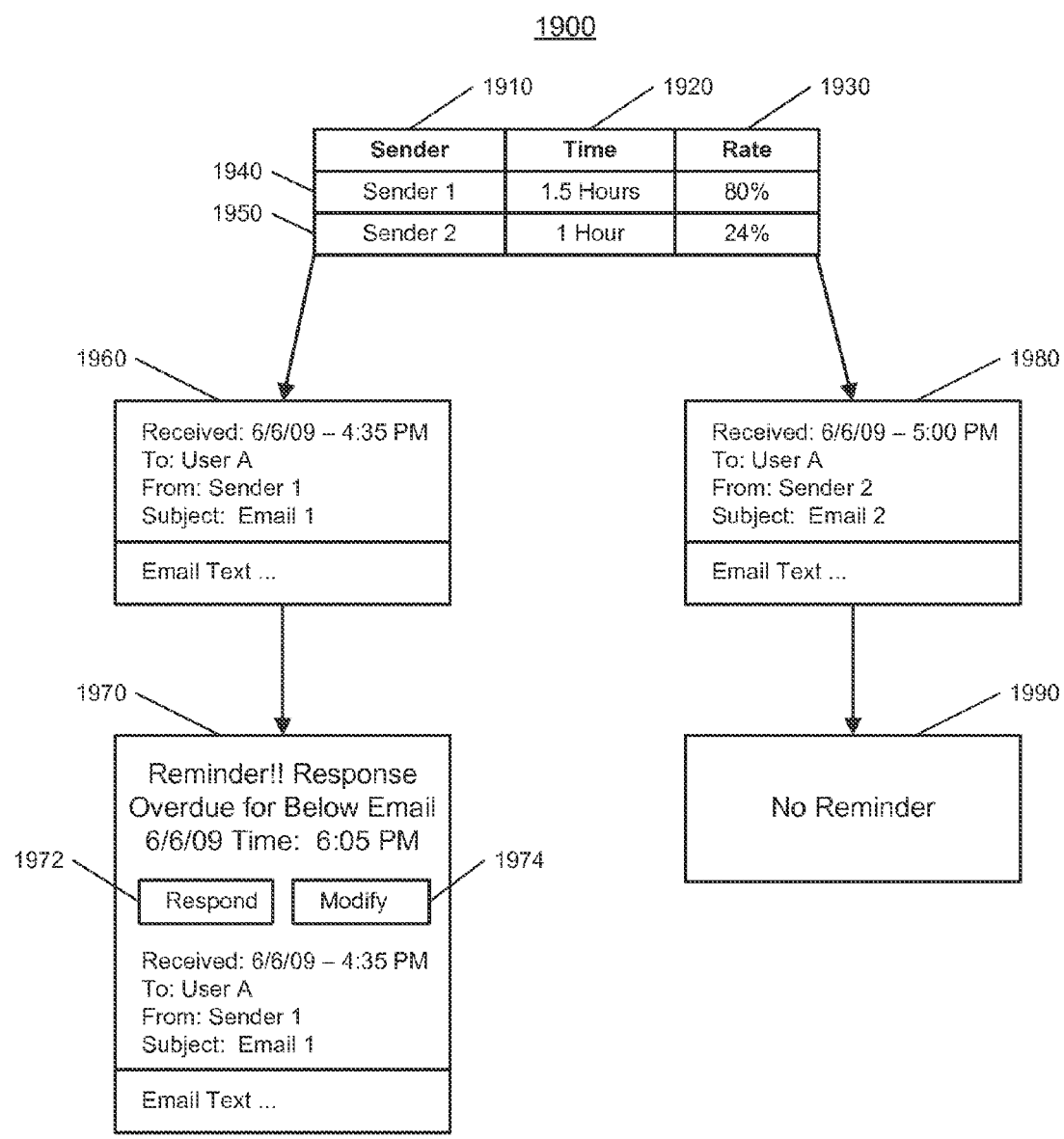

FIG. 19 illustrates an example 1900 of determining whether to set a reminder based on prior response rate data. As shown, the example 1900 includes tracked response pattern data that has a sender column 1910, an average response time column 1920, and an average response rate column 1930. The sender column 1910 includes data identifying senders of communications to which a user has responded in the past. The average response time column 1920 includes data indicating an average response time of the user for past communications received from the corresponding sender in the sender column 1910. The response rate column 1930 includes data indicating a response rate of the user for past communications received from the corresponding sender in the sender column 1910. For instance, the response rate may be a percentage of past communications received from the corresponding sender in the sender column 1910 to which the user responded.

In the example 1900, the tracked response pattern data includes a first row 1940 indicating that the user responds to communications sent from Sender 1 on average in one and a half hours and at a rate of 80%. The tracked response pattern data also includes a second row 1950 indicating that the user responds to communications sent from Sender 2 on average in one hour and at a rate of 24%. Although the tracked response pattern data includes two rows for ease of explanation, the tracked response pattern data may include more rows and data corresponding to many different senders.

In one example, the system 200 receives a first communication 1960 sent by Sender 1. In this example, the system 200 compares the response rate for communications sent by Sender 1 (i.e., 80%) to a threshold response rate (e.g., 25%). Because the comparison reveals that the response rate for communications sent by Sender 1 is greater than the threshold response rate, the system 200 determines to set a reminder for the first communication 1960.

In response to the determination to set a reminder for the first communication 1960, the system 200 accesses the average response time data in the row 1940 to use in setting a reminder time for the first communication 1960. Because the first communication 1960 was received on Jun. 6, 2009 at 4:35 PM and the user responds to communications sent from Sender 1 on average in one and a half hours, the system 200 provides a reminder 1970 related to the first communication 1960 to the user on Jun. 6, 2009 at 6:05 PM. The reminder 1970 includes a reminder portion that indicates that a response to the communication is overdue, a communication portion that provides details related to the first communication 1960 to which the reminder corresponds, a respond interface control 1972, and a modify interface control 1974. The respond interface control 1972 enables the user to respond to the first communication 1960 (e.g., by displaying a response communication interface, such as a response email composition interface that results when a user selects a respond control) when the user selects the respond interface control 1972 (e.g., using a mouse to select the respond interface control 1972). The modify interface control 1974 enables the user to modify the reminder 1970 (e.g., by displaying a modify reminder interface) when the user selects the modify interface control 1974 (e.g., using a mouse to select the modify interface control 1974). For instance, the user may use a modify reminder interface to extend the reminder time associated with the reminder 1970 (e.g., snooze the reminder 1970) or to cancel the reminder 1970. Other examples may provide a different combination (e.g., a subset) of the information provided in the reminder 1970 or other information that effectuates a reminder to the user.

In another example, the system 200 receives a second communication 1980 sent by Sender 2. In this example, the system 200 compares the response rate for communications sent by Sender 2 (i.e., 24%) to a threshold response rate (e.g., 25%). Because the comparison reveals that the response rate for communications sent by Sender 2 is less than the threshold response rate, the system 200 determines not to set a reminder for the second communication 1980. Accordingly, the system 200 does not provides a reminder 1990 for the second communication 1980 because the user has responded to past communications from Sender 2 at too low of a rate and, therefore, the system 200 determines that providing a reminder may be more distracting to the user than helpful.

Figure 20:

FIG. 20 illustrates an example of a communication inbox 2000. The inbox 2000 displays a list of representations of communications received by a recipient. The inbox 2000 includes a reminder column that has reminder information related to each communication represented in the inbox 2000.

The reminder column provides an indication of overdue communications for which a reminder has been set, the reminder time has passed, and a response has not been sent. For example, the entry in the reminder column for the communication 2040 indicates that a response to the communication 2040 is one hour overdue. In another example, the entry in the reminder column for the communication 2050 indicates that a response to the communication 2050 is one day overdue.

The reminder column also provides an indication of due communications for which a reminder has been set and a response is not yet due. For example, the entry in the reminder column for the communication 2010 indicates that a response to the communication 2010 is due on January 14. In another example, the entry in the reminder column for the communication 2030 indicates that a response to the communication 2030 is due at 3 PM.

The reminder column further provides an indication of communications for which a response has been sent. For example, the entry in the reminder column for the communication 2070 indicates that a response to the communication 2070 has been sent.

In addition, the reminder column provides an indication of communications for which a reminder has not been set. For example, the entry in the reminder column for the communication 2020 indicates that a reminder has not been set for the communication 2020. A user may set a reminder for the communication 2020 by selecting the set interface control displayed in the reminder column for the communication 2020. In another example, the entry in the reminder column for the communication 2060 indicates that a reminder has not been set for the communication 2060. A user may set a reminder for the communication 2060 by selecting the set interface control displayed in the reminder column for the communication 2060.

The inbox 2000 includes reminder sort interface control 2080. The reminder sort interface control 2080 sorts the inbox 2000 based on response reminders (e.g., data in the reminder column). As shown, the inbox 2000 is sorted based on attributes of the communications (e.g., sender name, time of receipt, etc.). When the reminder sort interface control 2080 is selected based on user input, the system 200 sorts the inbox 2000 based on reminder data included in the reminder column. This may result in a different order of communications from the sorting based on attributes of the communications. For example, when the reminder sort interface control 2080 is selected, the system 200 may arrange overdue communications first in the list in the inbox 2000 (e.g., ordered based on how long a response has been overdue), arrange due communications for which a reminder has been set, but a response has not been sent and the reminder time has not lapsed second in the list in the inbox 2000 (e.g., ordered based on when a response is due), arrange communications for which a reminder has not been set third in the list in the inbox 2000 (e.g., ordered based on time of receipt), and arrange communications for which a response has been sent fourth in the list in the inbox 2000.

Applying this example to the communication inbox 2000 that is ordered based on time of communication receipt, if a user where to select the reminder sort interface control 2080, the system 200 would reorder the communication inbox 2000. For instance, the system 200 may order the communication 2050 first, order the communication 2040 second, order the communication 2030 third, order the communication 2010 fourth, order the communication 2020 fifth, order the communication 2060 sixth, and order the communication 2070 seventh. This ordering may be quite different than ordering based on attributes of the received communications and may assist the user in responding to old or stale communications by displaying representations of communications having overdue reminders at the top of the list.

Figure 21:
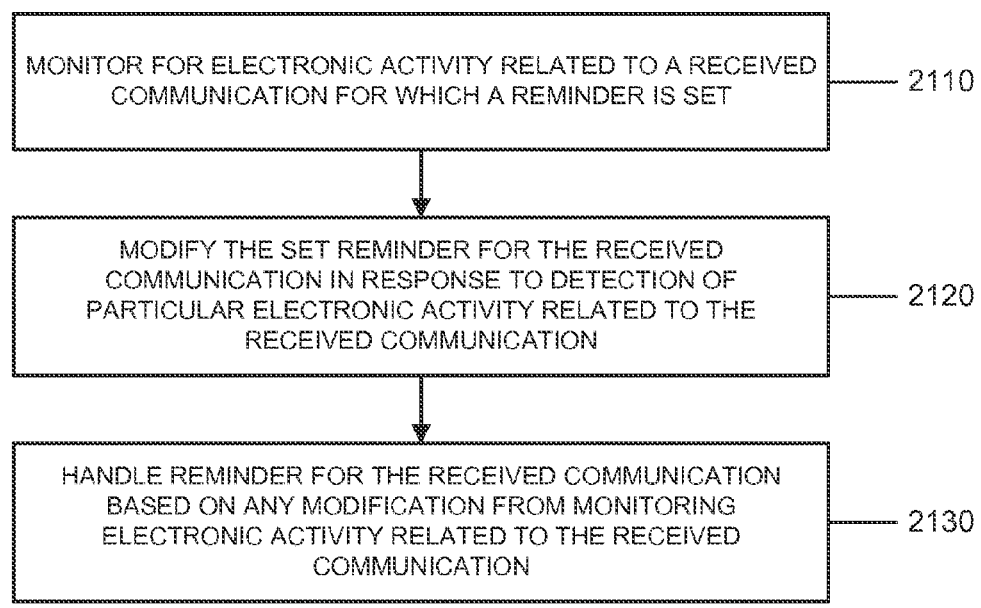

FIG. 21 illustrates an example of a process 2100 for handling a reminder for a received communication based on electronic activity related to the received communication. The system 200 monitors for electronic activity related to a received communication for which a reminder is set (2110). The electronic activity may be any type of electronic activity that is related to the received communication. For example, the system 200 monitors for the user sending a response to the received communication. In this example, the system 200 analyzes response communications initiated by the user and, based on the analysis, determines whether the communication to which the user is responding has a response reminder set. The analysis may involve comparing communication identification information (e.g., a message identifier) for the communication to which the user is responding with communication identification information associated with set response reminders.

The system 200 also may monitor for perception of the received communication by the user. For instance, the system 200 may monitor for whether and when the user has selected a communication to cause the communication to be displayed or otherwise output. The system 200 further may monitor for user input related to the reminder. For instance, the user input may be input to cancel the reminder or input to adjust the reminder time set for the reminder.

The system 200 may monitor for the user forwarding the received communication. For example, the system 200 analyzes communications forwarded by the user and, based on the analysis, determines whether the forwarded communication has a response reminder set. The analysis may involve comparing communication identification information (e.g., a message identifier) for the forwarded communication with communication identification information associated with set response reminders.

In some implementations, the system 200 monitors for communication management input/activity related to the received communication. In these implementations, the system 200 may monitor for deletion of the received communication from a communication system/inbox (e.g., user input received from the user to delete the received communication). The system 200 may monitor for storage or movement of the received communication in an interface for perceiving electronic communications. For instance, in the electronic mail context, the system 200 may monitor for input from the user moving (e.g., storing/archiving) the received communication from an inbox to another folder in the electronic mail interface. The system 200 may identify the folder to which the received communication was moved.

In some examples, the system 200 monitors for receipt of other communications related to the received communication. In these examples, the system 200 may monitor for further communications from the sender of the received communication. The system 200 also may monitor for responses, to the sender of the received communication, from another recipient of the received communication. The system 200 further may monitor for additional communications from another recipient of the received communication. In these examples, the system 200 may compare incoming communications to data related to the received communication and make a determination of whether the incoming communications are related to the received communication (e.g., from the same sender, from another recipient of the received communication, has the same subject line, is part of a message string that includes the received communication, etc.). When an incoming communication is related to the received communication, the system 200 determines attributes of the related incoming communication, such as sender, etc.

The system 200 modifies the set reminder for the received communication in response to detection of particular electronic activity related to the received communication (2120). For instance, the system 200 may compare the particular electronic activity related to the received communication to a set of rules that describe reminder modification for particular types of electronic activity and modify the set reminder based on the comparison to the set of rules. The set of rules may be defined by the communication system and/or user input received from the user. The system 200 may modify the set reminder for the received communication by deleting the reminder or changing the reminder time associated with the reminder (e.g., extend, reset, accelerate, shorten, or adjust the reminder time).

The system 200 also may analyze detected electronic activity and determine that the detected electronic activity does not result in modification of the reminder. For instance, the detected electronic activity may not be part of the set of rules and, therefore, no modification is made based on the detected electronic activity. In addition, the detected electronic activity may be part of the set of rules, but the set of rules may indicate that the reminder should remain unchanged for the detected electronic activity.

In some examples, when the system 200 detects that the user has sent a response to the received electronic communication, the system 200 deletes the set reminder for the received communication. In these examples, the system 200 deletes the set reminder for the received communication because the user has sent a response, thereby making the reminder unnecessary and, perhaps, confusing.

In some implementations, the system 200 may analyze a sent response to the received communication and determine whether or not to delete the response reminder based on the analysis of the sent response. In these implementations, the system 200 may analyze a length of the response and/or the content included in the response to determine whether the response was a full response to the communication or whether the response merely confirmed receipt and/or indicated that a full response would be forthcoming.

For instance, when the system 200 determines that a response communication is relatively short (e.g., less than 50 words), the system 200 determines that the response was not a full response and that the reminder associated with the received communication should not be deleted.

Alternatively, when the system 200 determines that a response communication is relatively long (e.g., greater than 50 words), the system 200 determines that the response was a full response and that the reminder associated with the received communication should be deleted.

In another example, the system 200 may analyze the response for content that suggests that the response is not a full response and that an additional response would be forthcoming. In this example, the system 200 may scan the text of the response communication to attempt to identify phrases that indicate that the response is not a full response, such as "I/we will get back to you" or "I/we will respond in due course." When a phrase that indicates that the response is not a full response is identified, the system 200 determines that the response is not a full response and maintains the set response reminder. The system 200 may consider a combination of factors (e.g., size, content, etc.) in determining whether the response is a full response.

In addition, the system 200 may track past response behavior of the user in determining whether the response is a full response. For instance, the system 200 may determine whether the user typically sends multiple responses to communications of a particular type. When the system 200 determines that the user typically sends multiple responses, the system 200 is more likely to determine that a first response is not a full response. The system 200 also may track instances where a user sends multiple responses to a communication and identify attributes of the first response for use in identifying future responses that are not full responses. For example, the system 200 may determine a size of the first response and identify phrases that typically occur in first responses sent by the user. In this example, the system 200 stores the size information and the identified phrases in electronic storage and constructs a profile of response communications that are not full responses by the user. Then, when the system 200 detects the user sending a response to the received communication, the system 200 accesses the profile, compares the response to the profile, and determines whether the response is a full response based on the comparison. When the system 200 determines that the response is not a full response, the system 200 may maintain the set reminder and display a message to the user indicating that the response reminder has been maintained for the received communication. The displayed message may enable the user to delete or modify the response reminder. In addition, when the system 200 maintains the set reminder because the system 200 determines that the user's response is not a full response, the system 200 may update the reminder data such that, when the reminder is provided to the user, the reminder indicates that the user responded to the received communication, but that the system determined that the response was not a full response. The system 200 further may provide data related to the response in the reminder or provide a link to the response in the reminder, so that the user can quickly determine whether the system 200 was correct or whether the first response was a full response and an additional response is not needed.

The system 200 also may modify the reminder based on detected perception of the received communication by the user. For instance, the system 200 may reset the reminder time to correspond to the user's perception of the received communication, rather than the system's receipt of the received communication. The system 200 further may modify the reminder based on detected user input related to the reminder. For instance, when the user input is input to cancel the reminder, the system 200 deletes the reminder. When the user input is input to adjust the reminder time set for the reminder, the system 200 adjusts the reminder time to match the user input.

The system 200 may modify the reminder based on detection of the user forwarding the received communication. For example, the system 200 may extend the reminder time based on the detected forwarding. In this example, the system 200 may extend the reminder a particular amount of time set by the user or set by the system 200. The particular amount of time may be determined based on past response patterns of the user when the user has forwarded a communication for which a reminder has been set in the past. In other examples, the system 200 may delete the response reminder based on the detected forwarding when the forwarded communication requests another user to handle or respond to the received communication.

In some implementations, the system 200 modifies the reminder based on detected communication management input/activity related to the received communication. In these implementations, the system 200 may delete the reminder when the system 200 detects deletion of the received communication from a communication system/inbox or movement of the received communication out of an inbox and into a folder. The system 200 may consider the folder to which the received communication was moved in determining how to handle the reminder for the received communication. For instance, when the system 200 detects that the received communication has been moved to an archive folder, the system 200 deletes the reminder corresponding to the received communication. When the system 200 detects that the received communication has been moved to a follow up folder, the system 200 maintains the reminder corresponding to the received communication.

In some examples, the system 200 modifies the reminder based on detected receipt of other communications related to the received communication. In these examples, the system 200 may accelerate the reminder time when the system 200 detects receipt of another communication from the sender of the received communication because, in this case, the sender appears to be anxious for a response. The system 200 may accelerate the reminder a particular amount of time set by the user or set by the system 200. The particular amount of time may be determined based on past response patterns of the user when the user has received multiple communications from the same sender in the past.

The system 200 also may modify the reminder based on detected receipt of a response, to the sender of the received communication, from another recipient of the received communication. For instance, the system 200 may delete the reminder based on detection of the response, to the sender of the received communication, from another recipient of the received communication. The system 200 further may modify the reminder based on detected receipt of an additional communication from another recipient of the received communication. For example, the system 200 may accelerate or extend the reminder time when the system 200 detects receipt of the additional communication from another recipient of the received communication. The system 200 may accelerate or extend the reminder a particular amount of time set by the user or set by the system 200. The particular amount of time may be determined based on past response patterns of the user when the user has received an additional communication from another recipient of a received communication in the past.

The system 200 handles the reminder for the received communication based on any modification from monitoring electronic activity related to the received communication (2130). For instance, when the reminder is deleted from electronic storage, the system 200 does not provide a reminder related to the received communication. When the reminder time of the reminder has been modified, the system 200 provides a reminder related to the received communication based on the modified reminder time, rather than the originally-set reminder time.

Figure 22:
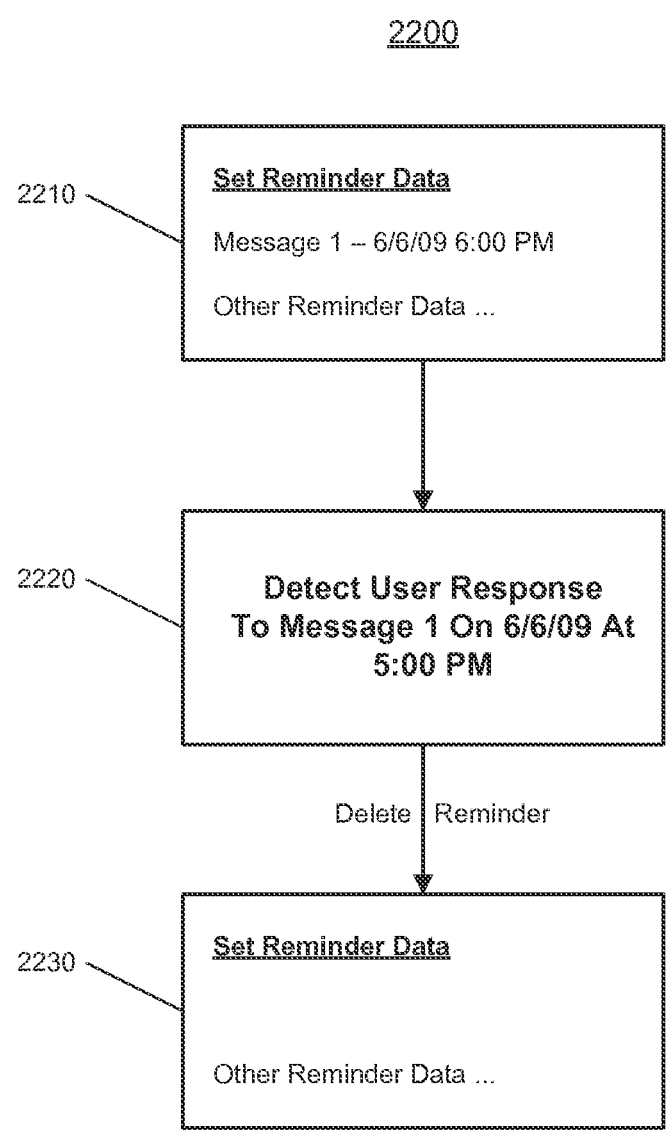

FIG. 22 illustrates an example 2200 of deleting a reminder for a received communication based on electronic activity related to the received communication. As shown, the example 2200 includes set reminder data 2210. The set reminder data 2210 includes data indicating that a response reminder for Message 1 has been set for Jun. 6, 2009 at 6:00 PM. Although the set reminder data 2210 includes a single response reminder for ease of explanation, the set reminder data 2210 may include more response reminders corresponding to many different messages.

In the example 2200, the system 200 detects electronic activity 2220 related to Message 1. The electronic activity 2220 is a detection that the user responded to Message 1 on Jun. 6, 2009 at 5:00 PM. Because the user responded to Message 1, the system 200 deletes the response reminder for Message I from the set reminder data 2230. Based on the deletion, no reminder is provided to the user on Jun. 6, 2009 at 6:00 PM for Message 1.

Figure 23:
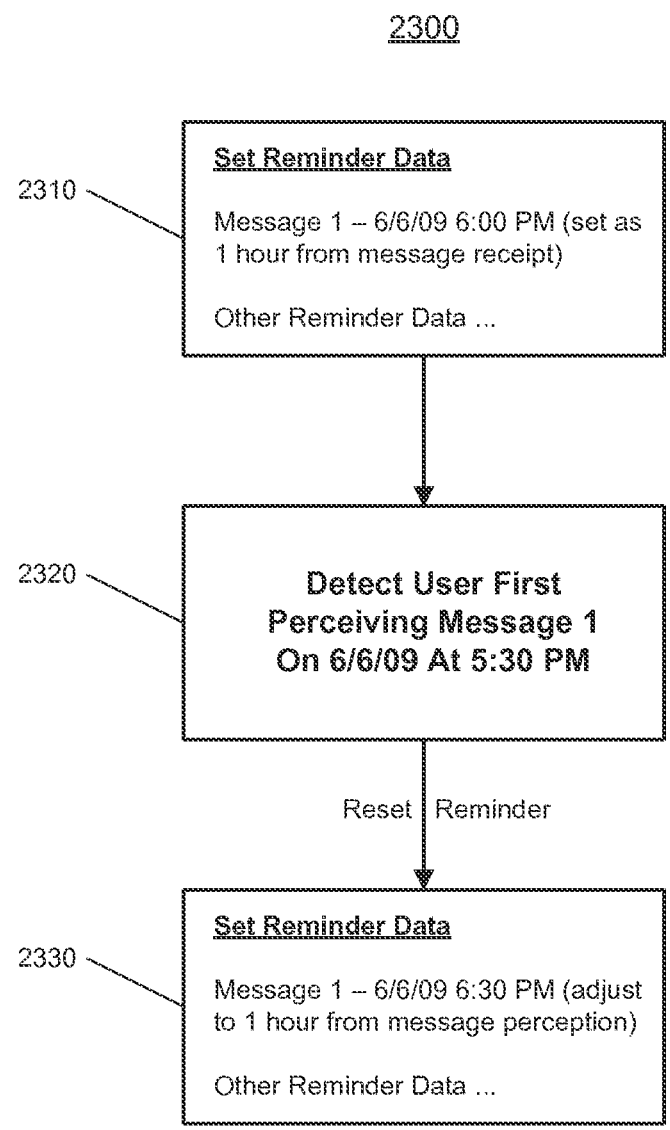

FIG. 23 illustrates an example 2300 of resetting a reminder time for a received communication based on electronic activity related to the received communication. As shown, the example 2300 includes set reminder data 2310. The set reminder data 2310 includes data indicating that a response reminder for Message I has been set for Jun. 6, 2009 at 6:00 PM. The response reminder for Message 1 was set for Jun. 6, 2009 at 6:00 PM because Message I was received at 5:00 PM and the user typically responds to messages having a type of Message 1 in one hour. Although the set reminder data 2310 includes a single response reminder for ease of explanation, the set reminder data 2310 may include more response reminders corresponding to many different messages.

In the example 2300, the system 200 detects electronic activity 2320 related to Message 1. The electronic activity 2320 is a detection that the user perceived (e.g., read) Message I on Jun. 6, 2009 at 5:30 PM. Because the user perceived Message 1 on Jun. 6, 2009 at 5:30 PM, the system 200 modifies the response reminder time for Message 1. For instance, based on the detected perception of Message 1, the system 200 adjusts or resets, in the set reminder data 2330, the reminder time of the response reminder for Message I to Jun. 6, 2009 at 6:30 PM, which is one hour from the detected perception of Message 1. Based on the adjustment, a reminder for Message 1 is provided to the user on Jun. 6, 2009 at 6:30 PM, rather than the originally set reminder time of Jun. 6, 2009 at 6:00 PM.

Figure 24:
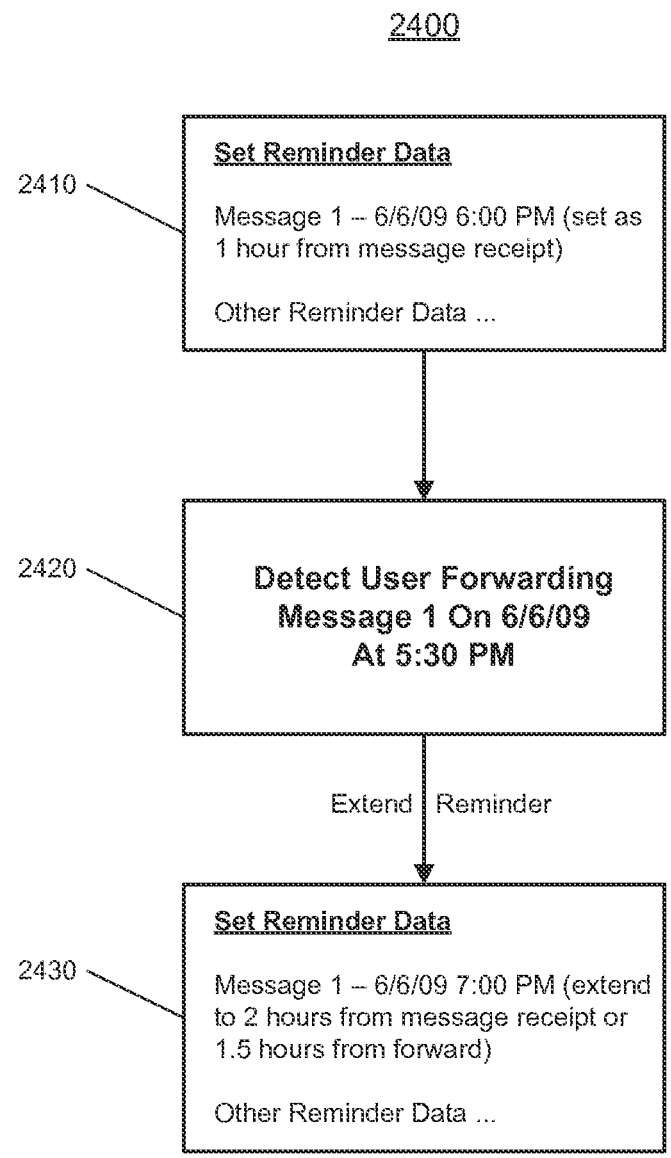

FIG. 24 illustrates an example 2400 of extending a reminder time for a received communication based on electronic activity related to the received communication. As shown, the example 2400 includes set reminder data 2410. The set reminder data 2410 includes data indicating that a response reminder for Message 1 has been set for Jun. 6, 2009 at 6:00 PM. The response reminder for Message 1 was set for Jun. 6, 2009 at 6:00 PM because Message 1 was received at 5:00 PM and the user typically responds to messages having a type of Message 1 in one hour. Although the set reminder data 2410 includes a single response reminder for ease of explanation, the set reminder data 2410 may include more response reminders corresponding to many different messages.

In the example 2400, the system 200 detects electronic activity 2420 related to Message 1. The electronic activity 2420 is a detection that the user forwarded (e.g., sent to another user with additional content) Message I on Jun. 6, 2009 at 5:30 PM. Because the user forwarded Message 1 on Jun. 6, 2009 at 5:30 PM, the system 200 modifies the response reminder time for Message 1 by extending the reminder time a particular amount of time from the receipt of Message I (e.g., two hours from receipt or one additional hour from receipt) or extending the reminder time a particular amount of time from the forwarding of Message I (e.g., one and a half hours from the forwarding). For instance, based on the detected forwarding of Message 1, the system 200 extends, in the set reminder data 2430, the reminder time of the response reminder for Message 1 to Jun. 6, 2009 at 7:00 PM. Based on the extension, a reminder for Message 1 is provided to the user on Jun. 6, 2009 at 7:00 PM, rather than the originally set reminder time of Jun. 6, 2009 at 6:00 PM. The system 200 may extend the reminder time based on the forwarding because the forwarding suggests that the user is working toward a response (e.g., asking a question to gather more information), but may need more time to prepare the response.

Figure 25:
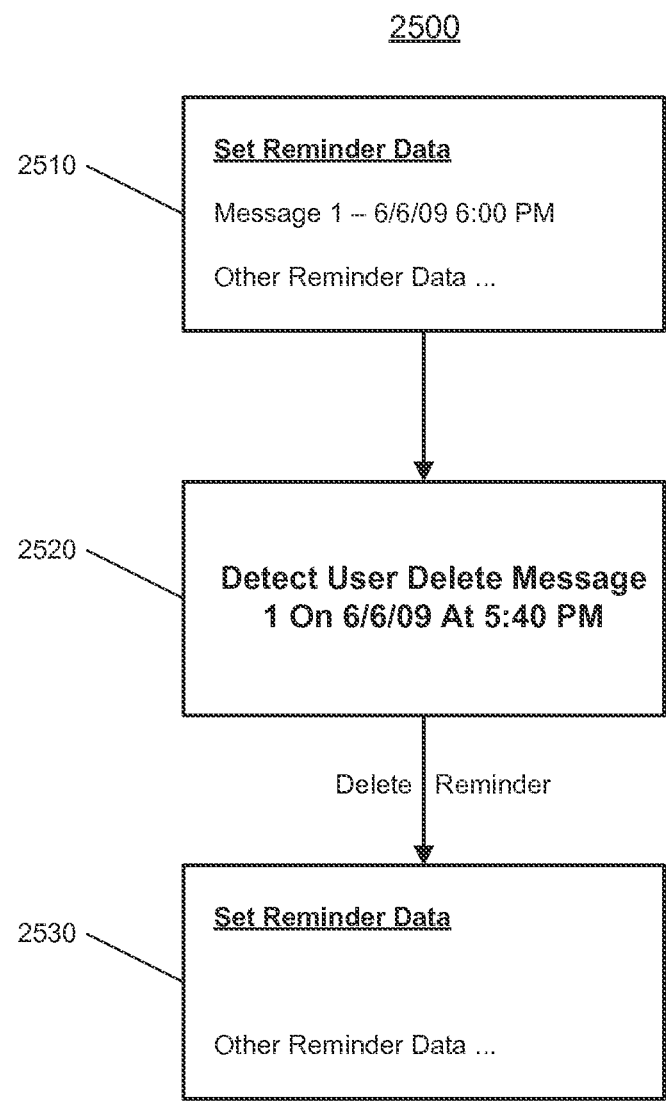

FIG. 25 illustrates an example 2500 of deleting a reminder for a received communication based on electronic activity related to the received communication. As shown, the example 2500 includes set reminder data 2510. The set reminder data 2510 includes data indicating that a response reminder for Message I has been set for Jun. 6, 2009 at 6:00 PM. Although the set reminder data 2510 includes a single response reminder for case of explanation, the set reminder data 2510 may include more response reminders corresponding to many different messages.

In the example 2500, the system 200 detects electronic activity 2520 related to Message 1. The electronic activity 2520 is a detection that the user deleted Message I on Jun. 6, 2009 at 5:40 PM. Because the user deleted Message 1, the system 200 deletes the response reminder for Message I from the set reminder data 2530. Based on the deletion, no reminder is provided to the user on Jun. 6, 2009 at 6:00 PM for Message 1.

Figure 26:
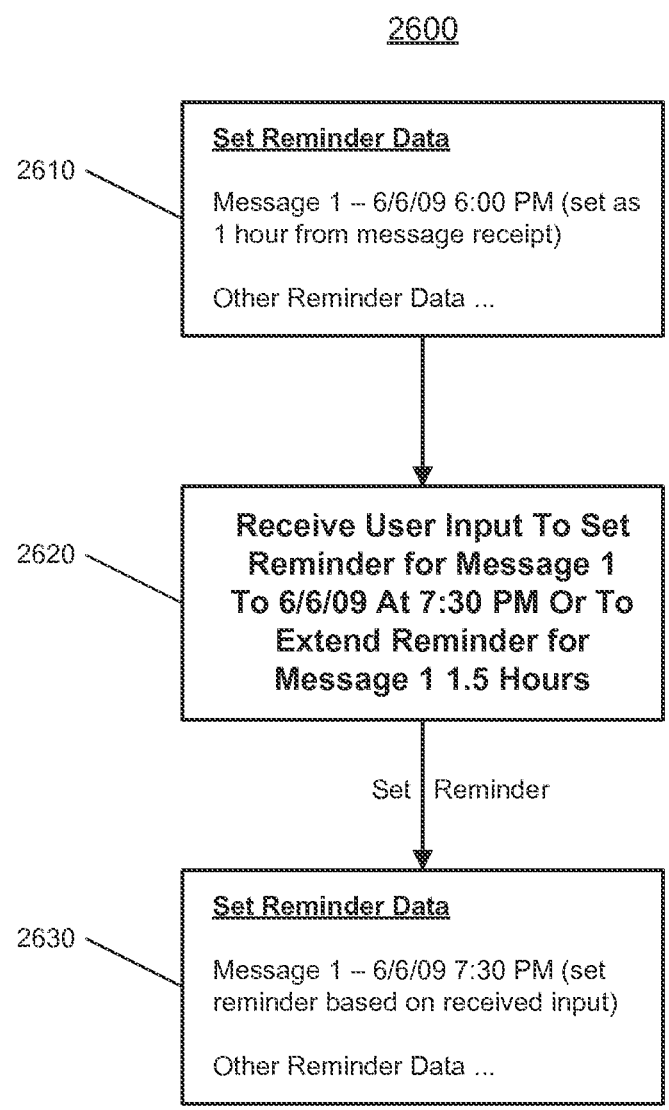

FIG. 26 illustrates an example 2600 of adjusting a reminder time for a received communication based on electronic activity related to the received communication. As shown, the example 2600 includes set reminder data 2610. The set reminder data 2610 includes data indicating that a response reminder for Message 1 has been set for Jun. 6, 2009 at 6:00 PM. The response reminder for Message 1 was set for Jun. 6, 2009 at 6:00 PM because Message I was received at 5:00 PM and the user typically responds to messages having a type of Message 1 in one hour. Although the set reminder data 2610 includes a single response reminder for ease of explanation, the set reminder data 2610 may include more response reminders corresponding to many different messages.

In the example 2600, the system 200 detects electronic activity 2620 related to Message 1. The electronic activity 2620 is input received from the user to set the response reminder time for Message 1 to a particular time or to extend the response reminder time for Message I for a particular amount of time. Based on the user input, the system 200 modifies the response reminder time for Message 1. For instance, based on the received user input related to Message 1, the system 200 sets, in the set reminder data 2630, the reminder time of the response reminder for Message I to Jun. 6, 2009 at 7:30 PM. The system 200 sets the reminder time to 7:30 PM because the received user input was to set the reminder time to 7:30 PM or to extend the reminder time for one and a half hours from the originally set reminder time. Based on the modification resulting from the user input, a reminder for Message 1 is provided to the user on Jun. 6, 2009 at 7:30 PM, rather than the originally set reminder time of Jun. 6, 2009 at 6:00 PM.

Figure 27:
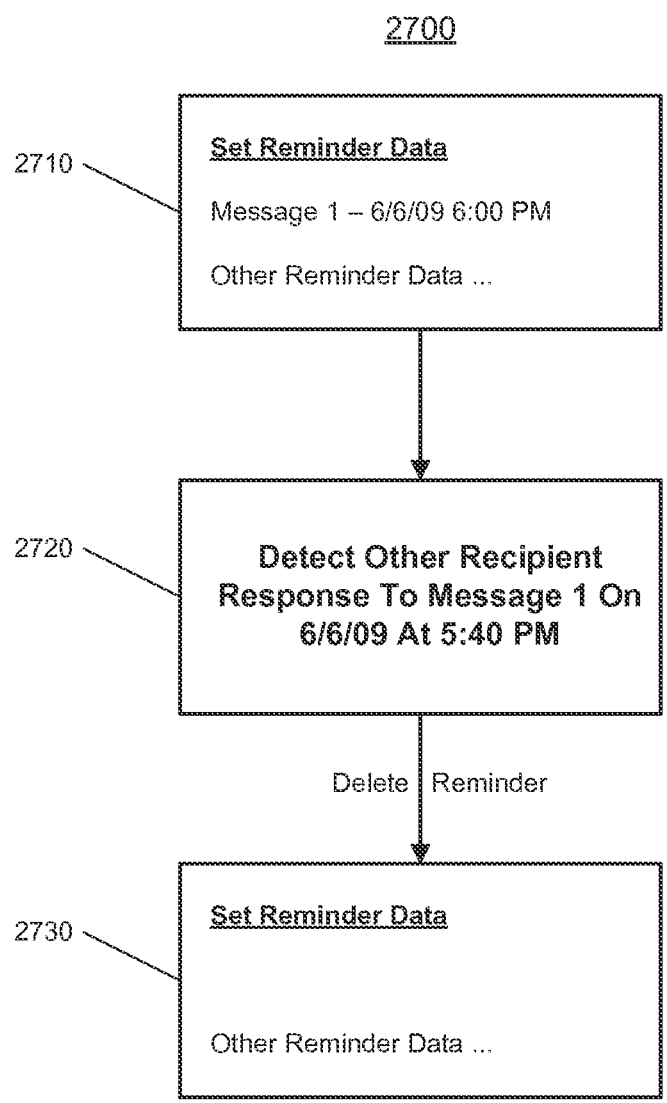

FIG. 27 illustrates an example 2700 of modifying a reminder for a received communication based on electronic activity related to the received communication. As shown, the example 2700 includes set reminder data 2710. The set reminder data 2710 includes data indicating that a response reminder for Message 1 has been set for Jun. 6, 2009 at 6:00 PM. The response reminder for Message 1 was set for Jun. 6, 2009 at 6:00 PM because Message 1 was received at 5:00 PM and the user typically responds to messages having a type of Message I in one hour. Although the set reminder data 2710 includes a single response reminder for ease of explanation, the set reminder data 2710 may include more response reminders corresponding to many different messages.

In the example 2700, the system 200 detects electronic activity 2720 related to Message 1. The electronic activity 2720 is a detection that another recipient responded to Message 1 on Jun. 6, 2009 at 5:40 PM. Because another recipient responded to Message I on Jun. 6, 2009 at 5:40 PM, the system 200 modifies the response reminder for Message 1. For instance, based on the detected response from another recipient of Message 1, the system 200 deletes, in the set reminder data 2730, the response reminder for Message I because the other recipient's response likely answers the sender's question and alleviates the need for the user to respond to Message 1. Based on the deletion, no reminder is provided to the user on Jun. 6, 2009 at 6:00 PM for Message 1.

Figure 28:
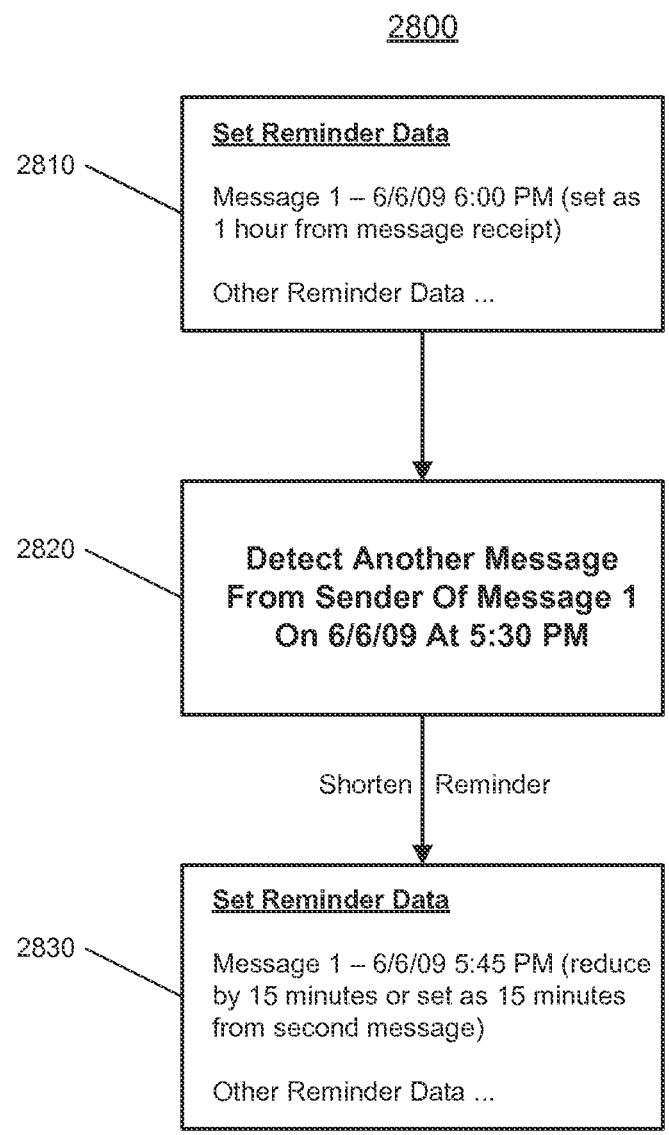

FIG. 28 illustrates an example 2800 of shortening a reminder time for a received communication based on electronic activity related to the received communication. As shown, the example 2800 includes set reminder data 2810. The set reminder data 2810 includes data indicating that a response reminder for Message 1 has been set for Jun. 6, 2009 at 6:00 PM. The response reminder for Message I was set for Jun. 6, 2009 at 6:00 PM because Message 1 was received at 5:00 PM and the user typically responds to messages having a type of Message 1 in one hour. Although the set reminder data 2810 includes a single response reminder for ease of explanation, the set reminder data 2810 may include more response reminders corresponding to many different messages.

In the example 2800, the system 200 detects electronic activity 2820 related to Message 1. The electronic activity 2820 is a detection that another message was received from the sender of Message 1 on Jun. 6, 2009 at 5:30 PM. Because another message was received from the sender of Message I on Jun. 6, 2009 at 5:30 PM, the system 200 modifies the response reminder time for Message I by shortening the reminder time a particular amount of time from the originally set reminder time (e.g., fifteen minutes from the originally set reminder time) or shortening the reminder time a particular amount of time from the receipt of the other message (e.g., fifteen minutes from the receipt of the other message). For instance, based on the detected receipt of another message from the sender of Message 1, the system 200 shortens or reduces, in the set reminder data 2830, the reminder time of the response reminder for Message 1 to Jun. 6, 2009 at 5:45 PM. Based on the reduction, a reminder for Message I is provided to the user on Jun. 6, 2009 at 5:45 PM, rather than the originally set reminder time of Jun. 6, 2009 at 6:00 PM.

Figure 29:
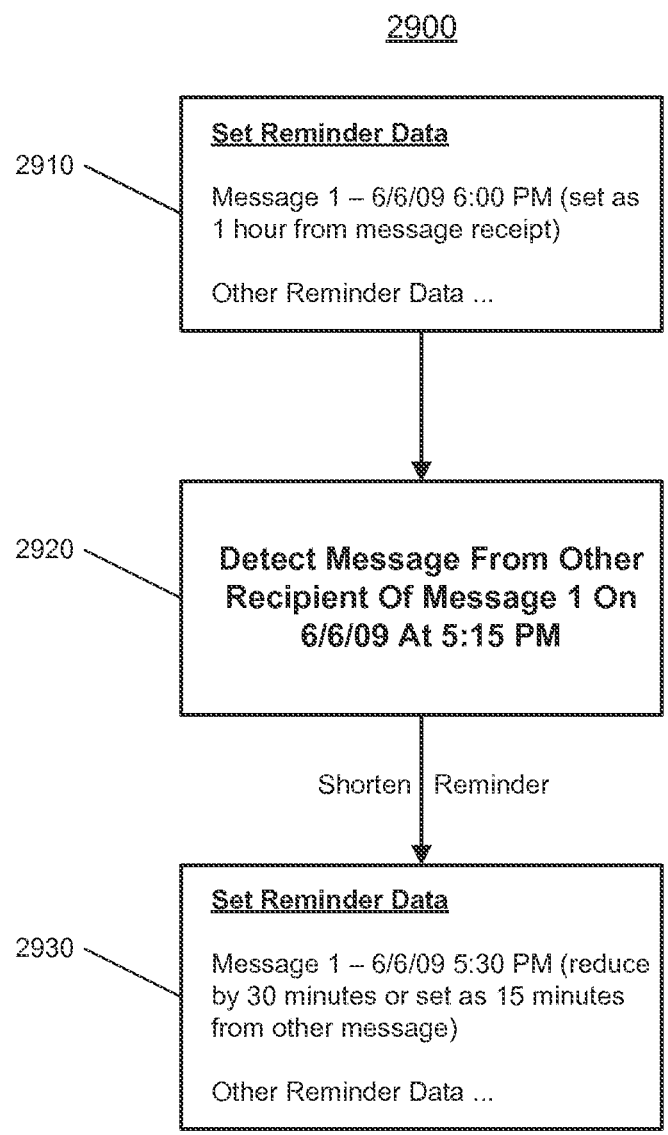

FIG. 29 illustrates an example 2900 of shortening a reminder time for a received communication based on electronic activity related to the received communication. As shown, the example 2900 includes set reminder data 2910. The set reminder data 2910 includes data indicating that a response reminder for Message I has been set for Jun. 6, 2009 at 6:00 PM. The response reminder for Message 1 was set for Jun. 6, 2009 at 6:00 PM because Message 1 was received at 5:00 PM and the user typically responds to messages having a type of Message 1 in one hour. Although the set reminder data 2910 includes a single response reminder for ease of explanation, the set reminder data 2910 may include more response reminders corresponding to many different messages.

In the example 2900, the system 200 detects electronic activity 2920 related to Message 1. The electronic activity 2920 is a detection that another message was received from another recipient of Message 1 on Jun. 6, 2009 at 5:15 PM. In this example, the other message is not a response to the sender of Message 1, does not include the sender of Message 1 in the recipient list for the other message, and is related to Message 1 (e.g., a forward of Message 1). Because another message was received from another recipient of Message I on Jun. 6, 2009 at 5:15 PM, the system 200 modifies the response reminder time for Message 1 by shortening the reminder time a particular amount of time from the originally set reminder time (e.g., thirty minutes from the originally set reminder time) or shortening the reminder time a particular amount of time from the receipt of the other message (e.g., fifteen minutes from the receipt of the other message). For instance, based on the detected receipt of another message from another recipient of Message 1, the system 200 shortens or reduces, in the set reminder data 2930, the reminder time of the response reminder for Message 1 to Jun. 6, 2009 at 5:30 PM. Based on the reduction, a reminder for Message 1 is provided to the user on Jun. 6, 2009 at 5:30 PM, rather than the originally set reminder time of Jun. 6, 2009 at 6:00 PM.

Figure 30:
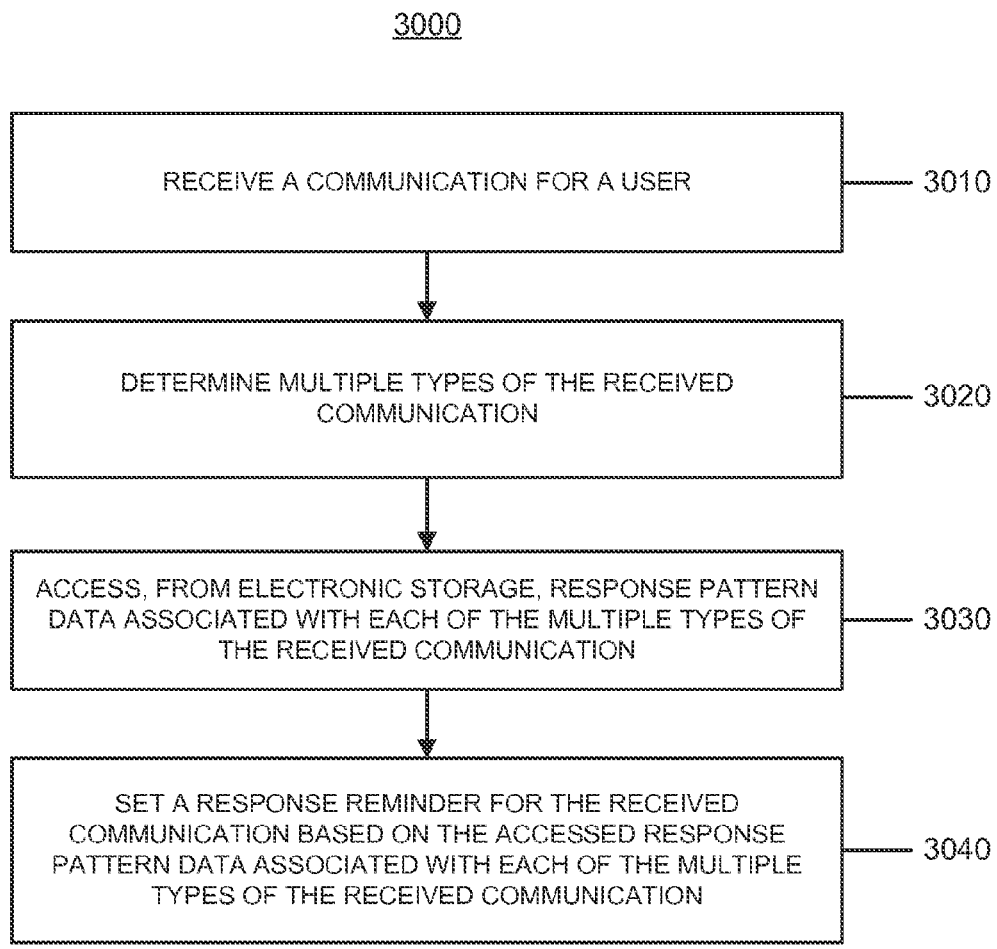

FIG. 30 illustrates an example of a process 3000 for automatically setting a response reminder time for a received communication based on multiple types of the received communication. The system 200 receives a communication for a user (3010). For example, the system 200 receives a communication for a user using techniques similar to those discussed above with respect to reference numeral 510.

The system 200 determines multiple types of the received communication (3020). For example, the system 200 determines a type of the received communication using techniques similar to those discussed above with respect to reference numeral 520. In this example, the system 200 determines that the received communication matches multiple tracked types.

The system 200 accesses, from electronic storage, response pattern data associated with each of the multiple types of the received communication (3030). For instance, the system 200 accesses response pattern data associated with a determined type of the received communication using techniques similar to those discussed above with respect to reference numeral 530. In some examples, the system 200 may access, for each of the multiple types, individual response pattern data that tracks past responses to each of the multiple types (e.g., accessing first response pattern data corresponding to a first type, accessing second response pattern data corresponding to a second type, etc.). In other examples, the system 200 may track response patterns for communications having multiple types and the system 200 may access response pattern data for past communications that match all of the multiple types. In these examples, when a received communication corresponds to first and second types, the system 200 may access response pattern data for the user's past response behavior for communications of the first and second types. For instance, the system 200 may store response pattern data that indicates that the user responds to communications from Sender 1 having the content "Urgent" on average in five minutes, that the user responds to communications from Sender I having the content "Code X" on average in thirty minutes, that the user responds to communications from Sender 2 having the content "Urgent" on average in sixty minutes, and that the user responds to communications from Sender 2 having the content "Code Y" on average in four days. When the user receives a communication from Sender 1 having the content "Code X," the system 200 accesses the thirty minute average response time data that corresponds to communications matching the multiple types.

The system 200 automatically sets a response reminder time for the received communication based on the accessed response pattern data associated with each of the multiple types of the received communication (3040). The system 200 automatically sets a response reminder time for the received communication based on the accessed response pattern data associated with the determined type of the received communication using techniques similar to those discussed above with respect to reference numeral 540. For example, when the system 200 tracks response patterns for communications having multiple types, the system 200 may set the reminder time using a relative response time for communications having the multiple types and/or a day of week/time of day response pattern for communications having the multiple types as discussed above with respect to FIG. 16.

In some implementations, the system 200 tracks types of communications individually such that the system 200 accesses individual response pattern data for each of the multiple types. In these implementations, the accessed individual response pattern data may include a relative response time for each of the multiple types of the received communication and a day of week/time of day response pattern for each of the multiple types of the received communication. Because the received communication corresponds to multiple relative response times and multiple day of week/time of day response patterns, the system 200 accounts for the multiple relative response times and multiple day of week/time of day response patterns in determining a response reminder time.

For example, when the accessed response pattern data includes multiple relative response times, the system 200 may compute a combined relative response time that accounts for each of the multiple relative response times. In this example, the system 200 computes the combined relative response time by, for example, computing an average of the multiple relative response times or by determining a median of the multiple relative response times.

When the accessed response pattern data includes multiple day of week/time of day response patterns, the system 200 may determine a combined day of week/time of day response pattern that accounts for each of the multiple day of week/time of day response patterns. In this example, the system 200 may compare each of the multiple day of week/time of day response patterns to one another and identify portions that overlap. The system 200 may use the identified overlapping portions as a combined day of week/time of day response pattern. In instances in which no overlapping portions exist, the system 200 may determine not to use the day of week/time of day response patterns or may determine a combined day of week/time of day response pattern by computing an average day of week/time of day response pattern or by selecting a subset of the multiple day of week/time of day response patterns. The system 200 also may determine a combined day of week/time of day response pattern by aggregating all of the multiple day of week/time of day response patterns together.

In some examples, the response pattern data may have weights associated with different types of communications and the weights may be used in combining the response patterns for the multiple types. For instance, the system 200 may use the weights in computing a weighted average of relative response times (e.g., sender type may have a weight of two and content type may have a weight of one such that the sender type contributes to the weighted average twice as much as the content type). The system 200 also may use the weights in selecting a subset of the response patterns to use in setting the reminder time. For example, in instances in which no overlapping portions exist for multiple day of week/time of day response patterns, the system 200 may select the day of week/time of day response pattern having the highest weight to use in setting the reminder time.

In some implementations, the system 200 compares relative response times to day of week/time of day response patterns in determining how to use the multiple response patterns. For instance, the system 200 may use only those relative response times that match the corresponding day of week/time of day response pattern. In addition, the system 200 may use a relative response time of a first type and a day of week/time of day response pattern from a second type in setting the reminder time.

The system 200 also may determine whether or not to set a reminder for the received communication based on a response rate for communications having the multiple types. When the system 200 tracks response patterns for communications having multiple types, the system 200 may determine whether to set a reminder using a response rate for communications having the multiple types as discussed above with respect to FIG. 18. When the system 200 tracks each of the multiple types individually, the system 200 may compute an average or median response rate based on the multiple response rates associated with the multiple types of communications and use the computed response rate in determining whether to set a response reminder for the received communication.

Figure 31:
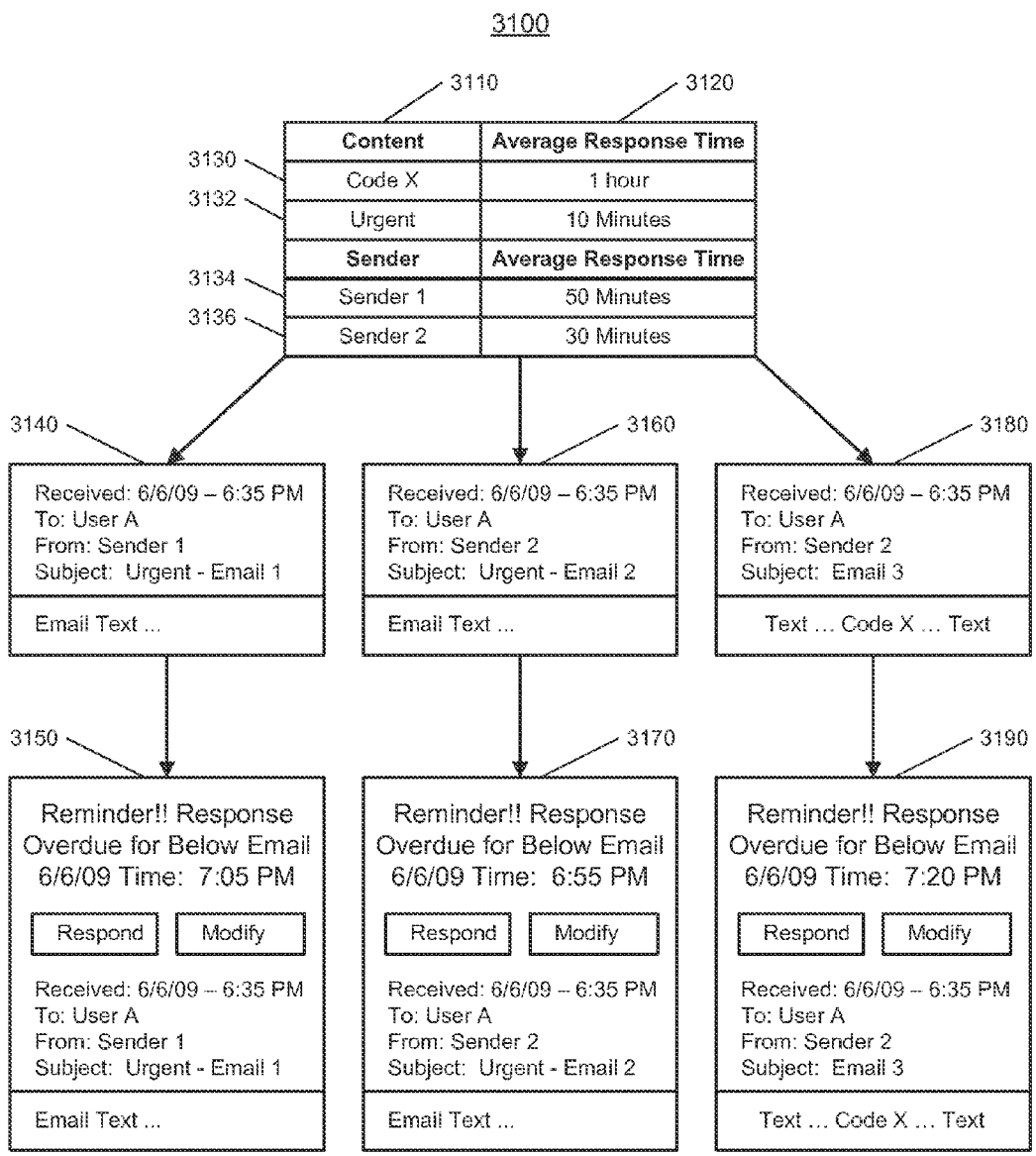

FIG. 31 illustrates an example 3100 of setting a reminder based on a sender and content of a communication. As shown, the example 3100 includes tracked response pattern data that has a type column 3110 and an average response time column 3120. The type column 3110 includes data identifying a type (e.g., sender or content) of communications to which a user has responded in the past. The average response time column 3120 includes data indicating an average response time of the user for past communications having the corresponding type in the type column 3110.

In the example 3100, the tracked response pattern data includes a first row 3130 indicating that the user responds to communications having the content "Code X" on average in one hour. The tracked response pattern data also includes a second row 3132 indicating that the user responds to communications having the content "Urgent" on average in ten minutes. The tracked response pattern data further includes a third row 3134 indicating that the user responds to communications sent by Sender 1 on average in fifty minutes. In addition, the tracked response pattern data includes a fourth row 3136 indicating that the user responds to communications sent by Sender 2 on average in thirty minutes.

In one example, the system 200 receives a first communication 3140 sent by Sender 1 and having the content "Urgent." In this example, the system 200 determines that the first communication 3140 is sent by Sender 1 and has the content "Urgent", identifies the rows 3132 and 3134 in the tracked response pattern data corresponding to communications having the content "Urgent" and communications sent by Sender 1, respectively, and accesses the average response time data from each of the rows 3132 and 3134 in the tracked response pattern data. Because the first communication 3140 was received on Jun. 6, 2009 at 6:35 PM and the user responds to communications having the content "Urgent" on average in ten minutes and communications sent by Sender 1 on average in fifty minutes, the system 200 provides a reminder 3150 related to the first communication 3140 to the user on Jun. 6, 2009 at 7:05 PM. For instance, the system 200 determines to account for both the detected content type and the detected sender type in setting a reminder and determines the response reminder time by computing an average of the average response time data for communications having the content "Urgent" (10 minutes) and the average response time data for communications sent by Sender 1 (50 minutes). The system 200 then adds the computed average (30 minutes) to the time of receipt (6:35 PM) and sets a time for the reminder 3150 as a result of the addition (7:05 PM). The reminder 3150 includes a reminder portion that indicates that a response to the communication is overdue, a communication portion that provides details related to the first communication to which the reminder corresponds, a respond interface control, and a modify interface control.

In another example, the system 200 receives a second communication 3160 sent by Sender 2 and having the content "Urgent." In this example, the system 200 determines that the second communication 3160 is sent by Sender 2 and has the content "Urgent", identifies the rows 3132 and 3136 in the tracked response pattern data corresponding to communications having the content "Urgent" and communications sent by Sender 2, respectively, and accesses the average response time data from each of the rows 3132 and 3136 in the tracked response pattern data. Because the second communication 3160 was received on Jun. 6, 2009 at 6:35 PM and the user responds to communications having the content "Urgent" on average in ten minutes and communications sent by Sender 2 on average in thirty minutes, the system 200 provides a reminder 3170 related to the second communication 3160 to the user on Jun. 6, 2009 at 6:55 PM. For instance, the system 200 determines to account for both the detected content type and the detected sender type in setting a reminder and determines the response reminder time by computing an average of the average response time data for communications having the content "Urgent" (10 minutes) and the average response time data for communications sent by Sender 2 (30 minutes). The system 200 then adds the computed average (20 minutes) to the time of receipt (6:35 PM) and sets a time for the reminder 3170 as a result of the addition (6:55 PM). The reminder 3170 includes a reminder portion that indicates that a response to the communication is overdue, a communication portion that provides details related to the second communication to which the reminder corresponds, a respond interface control, and a modify interface control.

In yet another example, the system 200 receives a third communication 3180 sent by Sender 2 and having the content "Code X." In this example, the system 200 determines that the third communication 3180 is sent by Sender 2 and has the content "Code X", identifies the rows 3130 and 3136 in the tracked response pattern data corresponding to communications having the content "Code X" and communications sent by Sender 2, respectively, and accesses the average response time data from each of the rows 3130 and 3136 in the tracked response pattern data. Because the third communication 3180 was received on Jun. 6, 2009 at 6:35 PM and the user responds to communications having the content "Code X" on average in one hour and communications sent by Sender 2 on average in thirty minutes, the system 200 provides a reminder 3190 related to the third communication 3180 to the user on Jun. 6, 2009 at 7:20 PM. For instance, the system 200 determines to account for both the detected content type and the detected sender type in setting a reminder and determines the response reminder time by computing an average of the average response time data for communications having the content "Code X" (60 minutes) and the average response time data for communications sent by Sender 2 (30 minutes). The system 200 then adds the computed average (45 minutes) to the time of receipt (6:35 PM) and sets a time for the reminder 3190 as a result of the addition (7:20 PM). The reminder 3190 includes a reminder portion that indicates that a response to the communication is overdue, a communication portion that provides details related to the third communication to which the reminder corresponds, a respond interface control, and a modify interface control.

Figure 32:
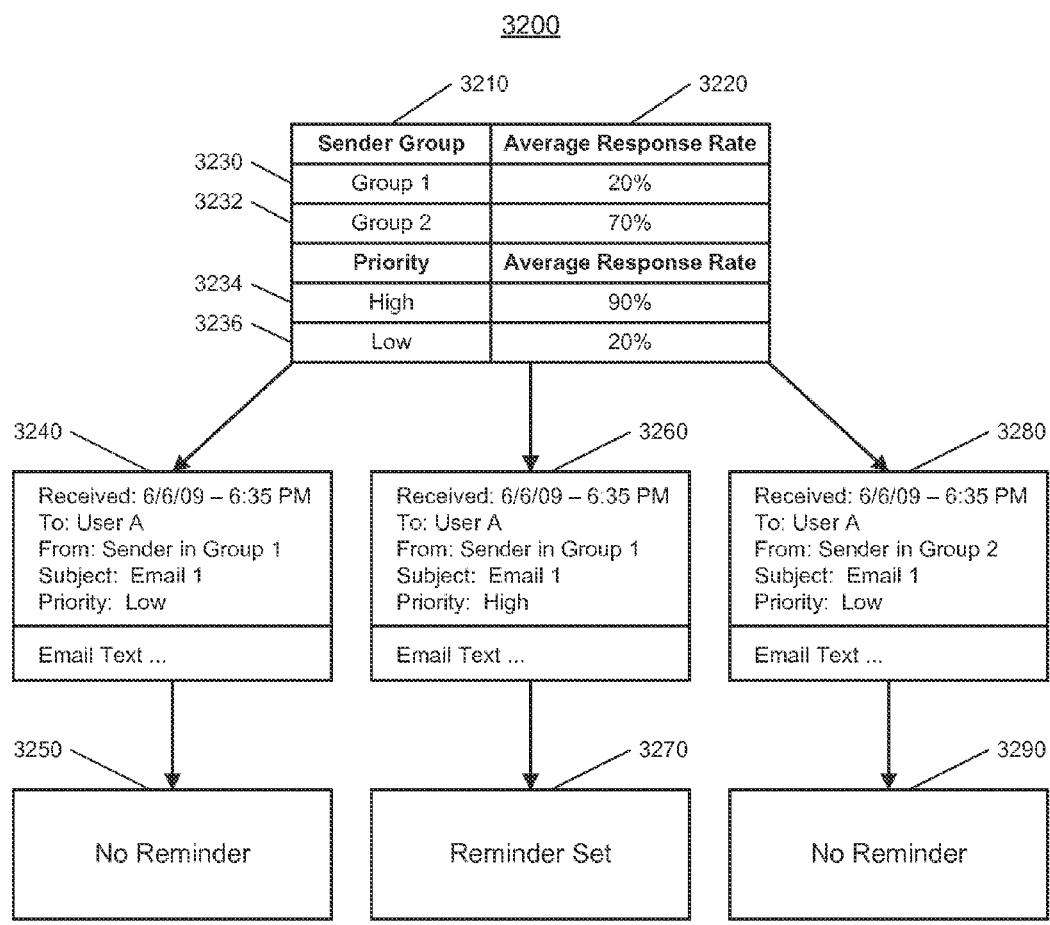

FIG. 32 illustrates an example 3200 of determining whether to set a reminder based on a sender group and priority designation of a communication. As shown, the example 3200 includes tracked response pattern data that has a type column 3210 and an average response rate column 3220. The type column 3210 includes data identifying a type (e.g., sender group or priority designation) of communications to which a user has responded in the past. The average response rate column 3220 includes data indicating an average response rate of the user for past communications having the corresponding type in the type column 3210.

In the example 3200, the tracked response pattern data includes a first row 3230 indicating that the user responds to communications from senders in Group 1 on average 20% of the time. The tracked response pattern data also includes a second row 3232 indicating that the user responds to communications from senders in Group 2 on average 70% of the time. The tracked response pattern data further includes a third row 3234 indicating that the user responds to communications having a priority designation of high on average 90% of the time. In addition, the tracked response pattern data includes a fourth row 3236 indicating that the user responds to communications having a priority designation of low on average 20% of the time.

In one example, the system 200 receives a first communication 3240 sent by a sender in Group 1 and having a priority designation of "Low." In this example, the system 200 determines that the first communication 3240 is sent by a sender in Group 1 and has the priority designation of "Low," identifies the rows 3230 and 3236 in the tracked response pattern data corresponding to communications sent by a sender in Group 1 and communications having a priority designation of "Low," respectively, and accesses the average response rate data from each of the rows 3230 and 3236 in the tracked response pattern data. Because the user responds to communications sent by a sender in Group 1 on average 20% of the time and communications having a priority designation of "Low" on average 20% of the time, the system 200 determines not to set a reminder 3250 for the first communication 3240. For instance, the system 200 determines to account for both the detected sender group and the detected priority designation in determining whether to set a reminder and computes an average of the average response rate data for communications sent by a sender in Group 1 (20%) and the average response rate data for communications having a priority designation of "Low" (20%). The system 200 then compares the computed average (20%) to a rate threshold (e.g., 50%) and determines whether to set a reminder based on the comparison. In this case, the system 200 determines not to set a reminder 3250 for the first communication 3240 because the comparison reveals that the computed average (20%) is less than the rate threshold (e.g., 50%).

In another example, the system 200 receives a second communication 3260 sent by a sender in Group 1 and having a priority designation of "High." In this example, the system 200 determines that the second communication 3260 is sent by a sender in Group 1 and has the priority designation of "High," identifies the rows 3230 and 3234 in the tracked response pattern data corresponding to communications sent by a sender in Group 1 and communications having a priority designation of "High," respectively, and accesses the average response rate data from each of the rows 3230 and 3234 in the tracked response pattern data. Because the user responds to communications sent by a sender in Group 1 on average 20% of the time and communications having a priority designation of "High" on average 90% of the time, the system 200 determines to set a reminder 3270 for the second communication 3260. For instance, the system 200 determines to account for both the detected sender group and the detected priority designation in determining whether to set a reminder and computes an average of the average response rate data for communications sent by a sender in Group 1 (20%) and the average response rate data for communications having a priority designation of "high" (90%). The system 200 then compares the computed average (55%) to a rate threshold (e.g., 50%) and determines whether to set a reminder based on the comparison. In this case, the system 200 determines to set a reminder 3250 for the second communication 3260 because the comparison reveals that the computed average (55%) is greater than the rate threshold (e.g., 50%), even though the response rate for Senders in Group I does not exceed the rate threshold.

In yet another example, the system 200 receives a third communication 3280 sent by a sender in Group 2 and having a priority designation of "Low," identifies the rows 3232 and 3236 in the tracked response pattern data corresponding to communications sent by a sender in Group 2 and communications having a priority designation of "Low," respectively, and accesses the average response rate data from each of the rows 3232 and 3236 in the tracked response pattern data. Because the user responds to communications sent by a sender in Group 2 on average 70% of the time and communications having a priority designation of "Low" on average 20% of the time, the system 200 determines not to set a reminder 3290 for the third communication 3280. For instance, the system 200 determines to account for both the detected sender group and the detected priority designation in determining whether to set a reminder and computes an average of the average response rate data for communications sent by a sender in Group 2 (70%) and the average response rate data for communications having a priority designation of "Low" (20%). The system 200 then compares the computed average (45%) to a rate threshold (e.g., 50%) and determines whether to set a reminder based on the comparison. In this case, the system 200 determines not to set a reminder 3290 for the third communication 3280 because the comparison reveals that the computed average (45%) is less than the rate threshold (e.g., 50%), even though one of the response rates exceeds the rate threshold.

Figure 33:
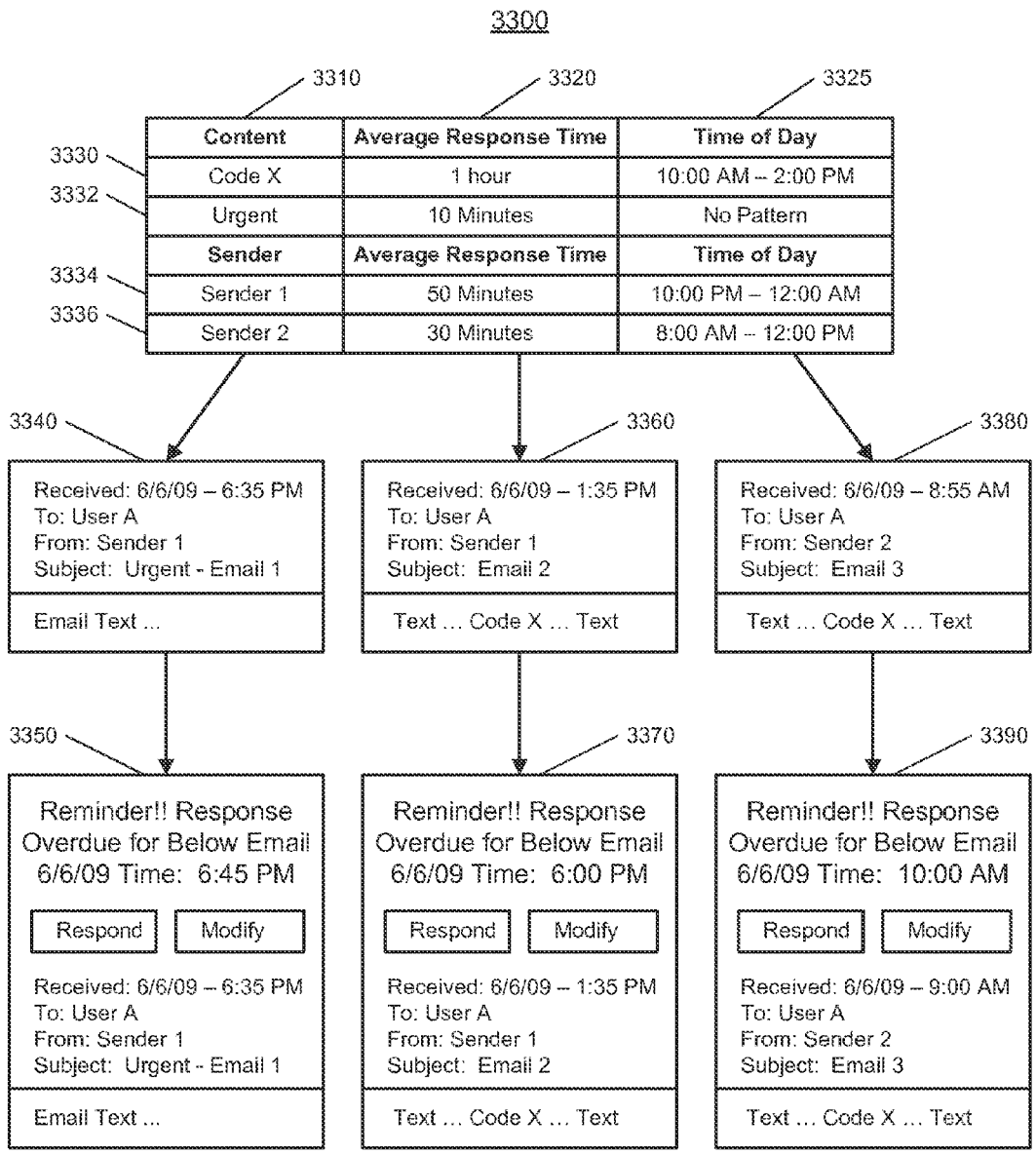

FIG. 33 illustrates an example 3300 of setting a reminder based on a sender and content of a communication. As shown, the example 3300 includes tracked response pattern data that has a type column 3310, an average response time column 3320, and a time of day pattern column 3325. The type column 3310 includes data identifying a type (e.g., sender or content) of communications to which a user has responded in the past. The average response time column 3320 includes data indicating an average response time of the user for past communications having the corresponding type in the type column 3310. The time of day pattern column 3325 includes data indicating a time of day range during which the user has typically responded (e.g., more than a threshold amount of time) to past communications having the corresponding type in the type column 3310.

In the example 3300, the tracked response pattern data includes a first row 3330 indicating that the user responds to communications having the content "Code X" on average in one hour during 10:00 AM to 2:00 PM. The tracked response pattern data also includes a second row 3332 indicating that the user responds to communications having the content "Urgent" on average in ten minutes with no time of day response pattern (e.g., the user responds relatively evenly through the day to communications having the content "Urgent"). The tracked response pattern data further includes a third row 3334 indicating that the user responds to communications sent by Sender 1 on average in fifty minutes during 10:00 PM to 12:00 AM. In addition, the tracked response pattern data includes a fourth row 3336 indicating that the user responds to communications sent by Sender 2 on average in thirty minutes during 8:00 AM to 12:00 PM.

In one example, the system 200 receives a first communication 3340 sent by Sender 1 and having the content "Urgent." In this example, the system 200 determines that the first communication 3340 is sent by Sender 1 and has the content "Urgent", identifies the rows 3332 and 3334 in the tracked response pattern data corresponding to communications having the content "Urgent" and communications sent by Sender 1, respectively, and accesses the average response time data and the time of day pattern from each of the rows 3332 and 3334 in the tracked response pattern data. Because the first communication 3340 was received on Jun. 6, 2009 at 6:35 PM and the user responds to communications having the content "Urgent" on average in ten minutes throughout the day and communications sent by Sender 1 on average in fifty minutes during 10:00 PM to 12:00 AM, the system 200 provides a reminder 3350 related to the first communication 3340 to the user on Jun. 6, 2009 at 6:45 PM. For instance, the system 200 computes a reminder time separately for each of the content pattern (6:45 PM) and the sender pattern (7:25 PM), compares the computed content reminder time to the content time of day pattern (no pattern), and compares the computed sender reminder time to the sender time of day pattern (10:00 PM to 12:00 AM). Based on the comparisons, the system 200 determines that the computed content reminder time corresponds to the content time of day pattern and that the computed sender reminder time does not correspond to the sender time of day pattern. Based on the determination that the computed content reminder time corresponds to the content time of day pattern and that the computed sender reminder time does not correspond to the sender time of day pattern, the system 200 determines to account for the detected content type, but not the detected sender type, in setting the reminder time. In this regard, the system 200 sets a time for the reminder 3350 as 6:45 PM. The reminder 3350 includes a reminder portion that indicates that a response to the communication is overdue, a communication portion that provides details related to the first communication to which the reminder corresponds, a respond interface control, and a modify interface control.

In another example, the system 200 receives a second communication 3360 sent by Sender 1 and having the content "Code X." In this example, the system 200 determines that the second communication 3360 is sent by Sender 1 and has the content "Code X", identifies the rows 3330 and 3334 in the tracked response pattern data corresponding to communications having the content "Code X" and communications sent by Sender 1, respectively, and accesses the average response time data and the time of day pattern from each of the rows 3330 and 3334 in the tracked response pattern data. Because the second communication 3360 was received on Jun. 6, 2009 at 1:35 PM and the user responds to communications having the content "Code X" on average in one hour during 10:00 AM to 2:00 PM and communications sent by Sender 1 on average in fifty minutes during 10:00 PM to 12:00 AM, the system 200 provides a reminder 3370 related to the second communication 3360 to the user on Jun. 6, 2009 at 6:00 PM. For instance, the system 200 computes a reminder time separately for each of the content pattern (2:35 PM) and the sender pattern (2:25 PM), compares the computed content reminder time to the content time of day pattern (10:00 AM to 2:00 PM), and compares the computed sender reminder time to the sender time of day pattern (10:00 PM to 12:00 AM). Based on the comparisons, the system 200 determines that the computed content reminder time does not correspond to the content time of day pattern and that the computed sender reminder time does not correspond to the sender time of day pattern. Based on the determination that the computed content reminder time does not correspond to the content time of day pattern and that the computed sender reminder time does not correspond to the sender time of day pattern, the system 200 determines to account for the detected content type and the detected sender type in setting the reminder time. In this regard, the system 200 computes an average time of day pattern (2:00 PM) from the ending time of the content time of day pattern and a beginning of the sender time of day pattern (10:00 PM). Accordingly, the system 200 sets a time for the reminder 3370 as 6:00 PM. The reminder 3370 includes a reminder portion that indicates that a response to the communication is overdue, a communication portion that provides details related to the second communication to which the reminder corresponds, a respond interface control, and a modify interface control.

In yet another example, the system 200 receives a third communication 3380 sent by Sender 2 and having the content "Code X." In this example, the system 200 determines that the third communication 3380 is sent by Sender I and has the content "Code X", identifies the rows 3330 and 3336 in the tracked response pattern data corresponding to communications having the content "Code X" and communications sent by Sender 2, respectively, and accesses the average response time data and the time of day pattern from each of the rows 3330 and 3336 in the tracked response pattern data. Because the third communication 3380 was received on Jun. 6, 2009 at 8:55 AM and the user responds to communications having the content "Code X" on average in one hour during 10:00 AM to 2:00 PM and communications sent by Sender 2 on average in thirty minutes during 8:00 AM to 12:00 PM, the system 200 provides a reminder 3390 related to the third communication 3380 to the user on Jun. 6, 2009 at 10:00 AM. For instance, the system 200 computes an average reminder time (9:40 AM or 45 minutes from message receipt) based on the content average response time (one hour) and the sender average response time (thirty minutes), compares the average reminder time to the content time of day pattern (10:00 AM to 2:00 PM), and compares the average reminder time to the sender time of day pattern (8:00 AM to 12:00 PM). Based on the comparisons, the system 200 determines that the average reminder time does not correspond to the content time of day pattern and that the average reminder time corresponds to the sender time of day pattern, in addition, the system 200 determines that the average reminder time is within a threshold amount of time from the content time of day pattern (e.g., within thirty minutes from 10:00 AM) and that the content time of day pattern overlaps with the sender time of day pattern. Accordingly, although the average reminder time corresponds to the sender time of day pattern, the system 200 determines to set the reminder to coincide with the beginning of the content time of day pattern because the average reminder time is within a threshold amount of time from the content time of day pattern and the content time of day pattern and the sender time of day pattern overlap at that point. Accordingly, the system 200 sets a time for the reminder 3390 as 10:00 AM. The reminder 3390 includes a reminder portion that indicates that a response to the communication is overdue, a communication portion that provides details related to the third communication to which the reminder corresponds, a respond interface control, and a modify interface control.

Figure 34:
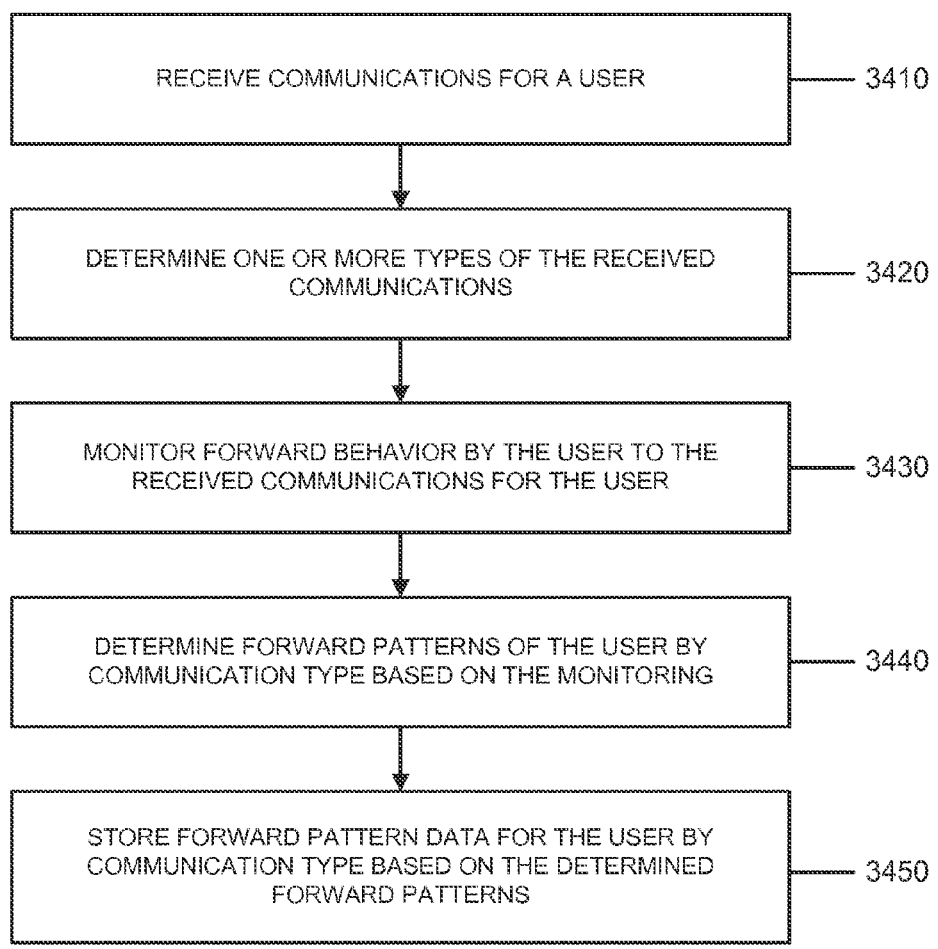

FIG. 34 illustrates an example of a process 3400 for storing forward pattern data. The process 3400 is similar to the process 300, except that the process 3400 deals with identifying patterns of a user's past history of forwarding communications, rather than identifying patterns of a user's past history of responding to communications. The system 200 receives communications for a user (3410). For example, the system 200 receives communications for a user using techniques similar to those discussed above with respect to reference numeral 310.

The system 200 determines one or more types of the received communications (3420). For instance, the system 200 determines one or more types of the received communications using techniques similar to those discussed above with respect to reference numeral 320.

The system 200 monitors forward behavior by the user to the received communications for the user (3430). For example, the system 200 monitors forward behavior by the user to the received communications for the user using techniques similar to monitoring response behavior discussed above with respect to reference numeral 330. In this example, instead of monitoring responses to communications by the user, the system 200 monitors for instances in which the user forwards communications to a user or a communications address that is different from the sender or the sender's communication address.

The system 200 determines forward patterns of the user by communication type based on the monitoring (3440). The system 200 determines forward patterns of the user by communication type based on the monitoring using techniques similar to determining response behavior patterns discussed above with respect to reference numeral 340. Instead of determining patterns by communication type for communications to which the user has responded, the system 200 determines patterns by communication type for communications the user has forwarded.

The system 200 stores, in electronic storage, forward pattern data for the user by communication type based on the determined forward patterns (3450). For instance, the system 200 stores, in electronic storage, forward pattern data for the user by communication type based on the determined forward patterns using techniques similar to those discussed above with respect to reference numeral 350.

FIG. 35 illustrates an example data structure 3500 that stores forward pattern data. The data structure 3500 is similar to the data structure 400 described above with respect to FIG. 4, except the data structure 3500 tracks forward time (e.g., relative forward time, such as average forward time), forward rate, and a time of day/day of week forward pattern, rather than tracking response time, response rate, and a time of day/day of week response pattern.

Figure 36:
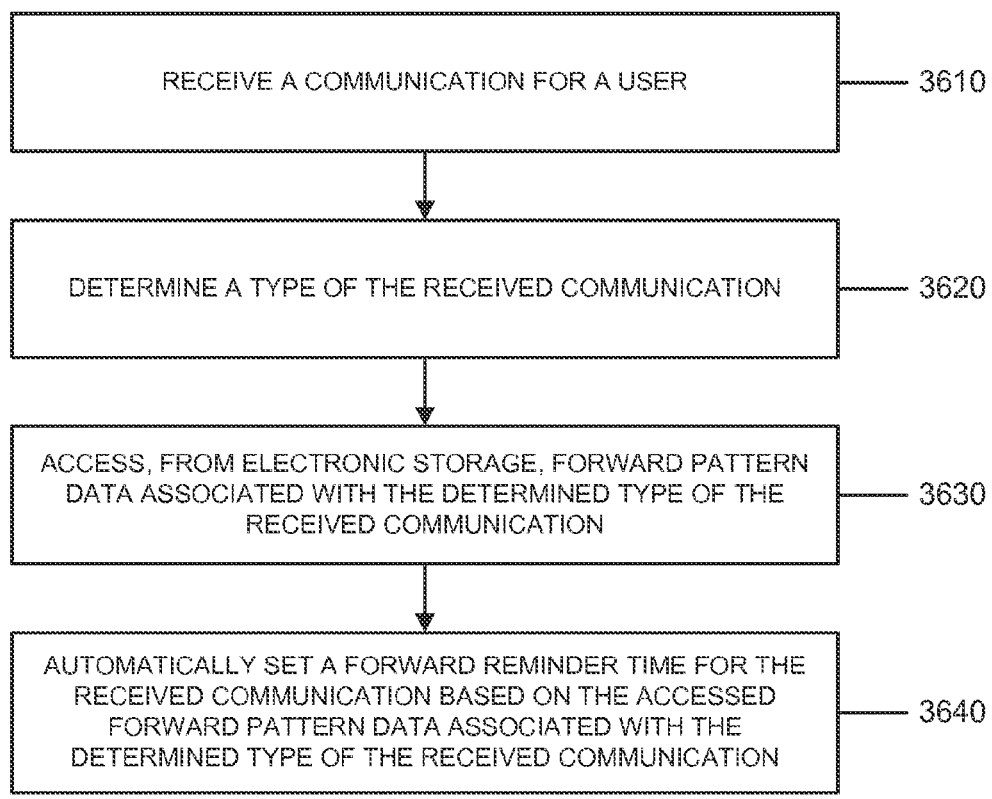

FIG. 36 illustrates an example of a process 3600 for automatically setting a forward reminder time for a received communication. The process 3600 is similar to the process 500, except that the process 3600 deals with setting a reminder to forward a communication based on a user's past history of forwarding communications, rather than setting a reminder to respond to a communication based on a user's past history of responding to communications. The system 200 receives a communication for a user (3610). For example, the system 200 receives a communication for a user using techniques similar to those discussed above with respect to reference numeral 510.

The system 200 determines a type of the received communication (3620). For instance, the system 200 determines a type of the received communication using techniques similar to those discussed above with respect to reference numeral 520.

The system 200 accesses, from electronic storage, forward pattern data associated with the determined type of the received communication (3630). For instance, the system 200 accesses forward pattern data associated with the determined type of the received communication using techniques similar to those discussed above with respect to reference numeral 530.

The system 200 automatically sets a forward reminder time for the received communication based on the accessed forward pattern data associated with the determined type of the received communication (3640). The system 200 automatically sets a forward reminder time for the received communication based on the accessed forward pattern data associated with the determined type of the received communication using techniques similar to those discussed above with respect to reference numeral 540.

Figure 37:
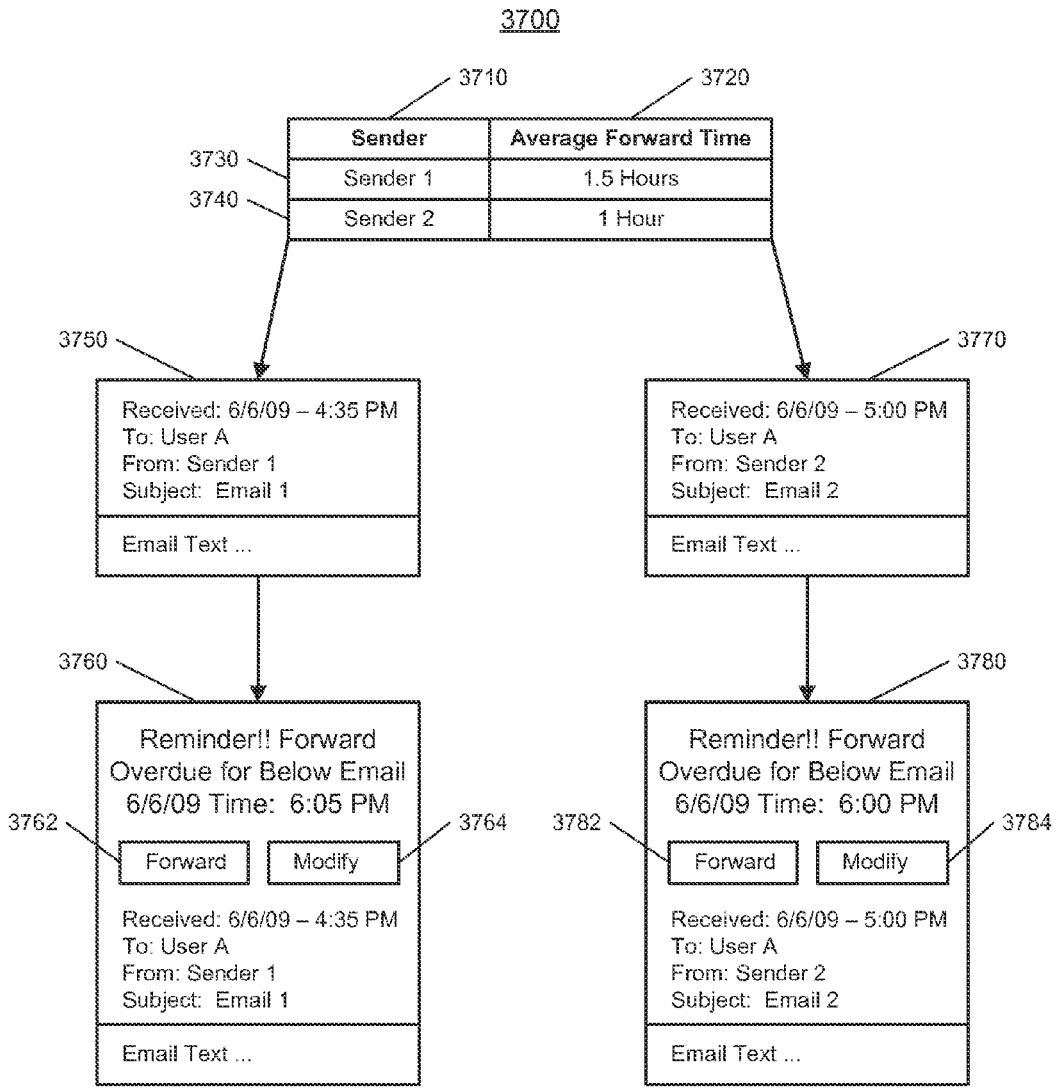

FIG. 37 illustrates an example 3700 of setting a forward reminder based on a sender of a communication. As shown, the example 3700 includes tracked forward pattern data that has a sender column 3710 and an average forward time column 3720. The sender column 3710 includes data identifying senders of communications to which a user has forwarded in the past. The average forward time column 3720 includes data indicating an average forward time of the user for past communications received from the corresponding sender in the sender column 3710. In the example 3700, the tracked forward pattern data includes a first row 3730 indicating that the user forwards communications sent from Sender I on average in one and a half hours. The tracked forward pattern data also includes a second row 3740 indicating that the user forwards communications sent from Sender 2 on average in one hour. Although the tracked forward pattern data includes two rows for ease of explanation, the tracked forward pattern data may include more rows and data corresponding to many different senders.

In one example, the system 200 receives a first communication 3750 sent by Sender 1. In this example, because the first communication 3750 was received on Jun. 6, 2009 at 4:35 PM and the user forwards communications sent from Sender I on average in one and a half hours, the system 200 provides a forward reminder 3760 related to the first communication 3750 to the user on Jun. 6, 2009 at 6:05 PM. The reminder 3760 includes a reminder portion that indicates that a forwarding action related to the communication is overdue, a communication portion that provides details related to the first communication to which the reminder corresponds, a forward interface control 3762, and a modify interface control 3764. The forward interface control 3762 enables the user to forward the first communication 3750 (e.g., by displaying a forward communication interface, such as a forward email composition interface that results when a user selects a forward control) when the user selects the forward interface control 3762 (e.g., using a mouse to select the forward interface control 3762). The modify interface control 3764 enables the user to modify the reminder 3760 (e.g., by displaying a modify reminder interface) when the user selects the modify interface control 3764 (e.g., using a mouse to select the modify interface control 3764). For instance, the user may use a modify reminder interface to extend the reminder time associated with the reminder 3760 (e.g., snooze the reminder 3760) or to cancel the reminder 3760. Other examples may provide a different combination (e.g., a subset) of the information provided in the reminder 3760 or other information that effectuates a reminder to the user.

In another example, the system 200 receives a second communication 3770 sent by Sender 2. In this example, because the second communication 3770 was received on Jun. 6, 2009 at 5:00 PM and the user forwards communications sent from Sender 2 on average in one hour, the system 200 provides a forward reminder 3780 related to the second communication 3770 to the user on Jun. 6, 2009 at 6:00 PM. Although the first communication 3750 was received prior to the second communication 3770, the reminder 3780 is provided to the user prior to the reminder 3760 because the user typically forwards communications sent by Sender 2 faster than communications sent by Sender 1. The reminder 3780 includes a reminder portion that indicates that a forwarding action related to the communication is overdue, a communication portion that provides details related to the second communication to which the reminder corresponds, a forward interface control 3782, and a modify interface control 3784. The forward interface control 3782 is similar to the respond interface control 3762 and the modify interface control 3784 is similar to the modify interface control 3764.

Any of the techniques or interfaces described throughout this disclosure as being applicable to responses to communications and reminders for responding to communications may be applied to forwarding actions for communication reminders for forwarding communications. For instance, techniques similar to those described with respect to process 1600, process 1800, process 2100, process 3000 may be applied in the context of forwarding communications.

Figure 38:
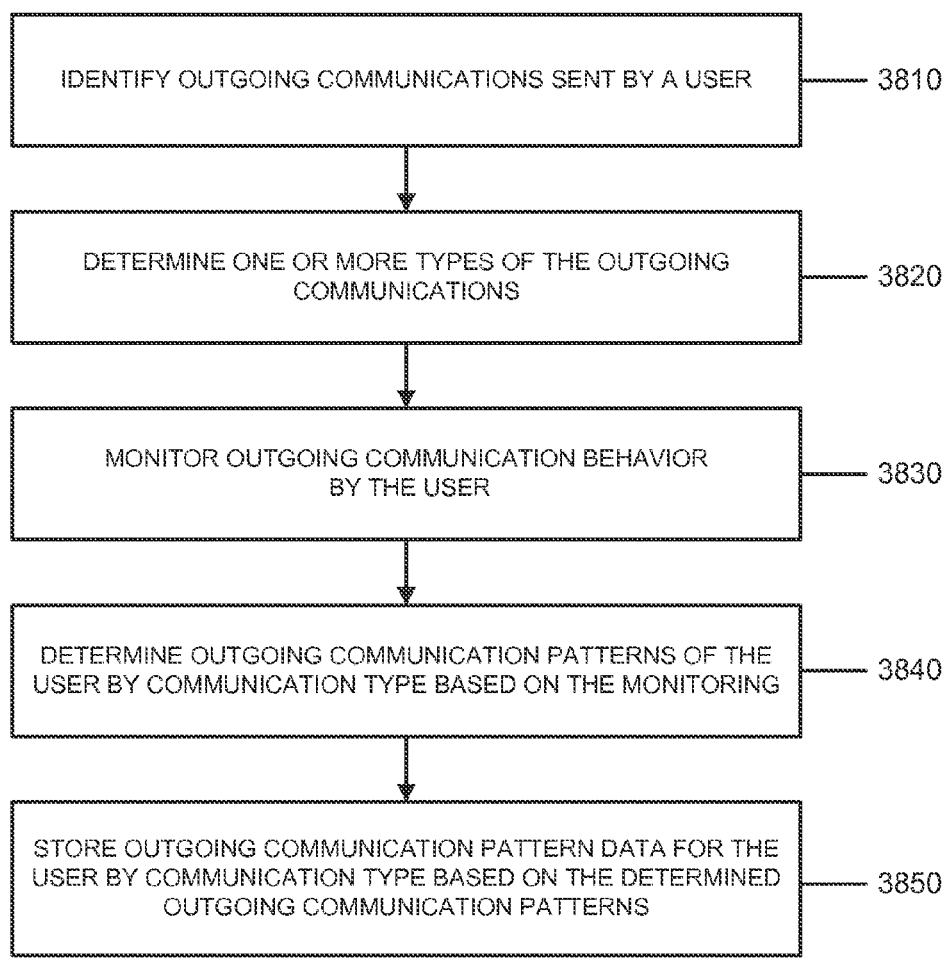

FIG. 38 illustrates an example of a process 3800 for storing outgoing communication pattern data. The process 3800 is similar to the process 300, except that the process 3800 deals with identifying patterns of a user's past history of sending any type of outgoing communications, rather than identifying patterns of a user's past history of responding to communications. The system 200 identifies outgoing communications sent by a user (3810). For example, the system 200 identifies any time the user sends an outgoing communication of any type. In this example, the system 200 detects, as part of the outgoing communications, when the user originates an outgoing communication that is not part of a prior message string, when the user responds to a previously-received communication, and when the user forwards a previously-received communication.

In addition, the system 200 identifies outgoing communications sent using any type of communication medium the system 200 is capable of monitoring. For instance, the system 200 detects, as part of the outgoing communications, when the user generates (e.g., originates, responds to, forwards, etc.) an outgoing communication using an email communication medium, when the user generates an outgoing communication using an instant message communication medium, when the user generates an outgoing communication using a text or SMS message communication medium, and when the user generates an outgoing communication using a voice phone call communication medium.

The system 200 determines one or more types of the outgoing communications (3820). For instance, the system 200 determines one or more types of the outgoing communications using techniques similar to those discussed above with respect to reference numeral 320.

The system 200 monitors outgoing communication behavior by the user (3830). For example, the system 200 monitors outgoing communication behavior by the user using techniques similar to monitoring response behavior discussed above with respect to reference numeral 330. In this example, instead of monitoring responses to communications by the user, the system 200 monitors for any instances in which the user generates (e.g., sends) an outgoing communication.

The system 200 determines outgoing communication patterns of the user by communication type based on the monitoring (3840). The system 200 determines outgoing communication patterns of the user by communication type based on the monitoring using techniques similar to determining response behavior patterns discussed above with respect to reference numeral 340. Instead of determining patterns by communication type for communications to which the user has responded, the system 200 determines patterns by communication type for all outgoing communications the user has sent.

The system 200 stores, in electronic storage, outgoing communication pattern data for the user by communication type based on the determined outgoing communication patterns (3850). For instance, the system 200 stores, in electronic storage, outgoing communication pattern data for the user by communication type based on the determined outgoing communication patterns using techniques similar to those discussed above with respect to reference numeral 350.

FIG. 39 illustrates an example data structure 3900 that stores outgoing communication pattern data. The data structure 3900 is similar to the data structure 400 described above with respect to FIG. 4, except the data structure 3900 tracks outgoing communication time (e.g., average outgoing communication time) and a time of day/day of week outgoing communication pattern, rather than tracking response time, response rate, and a time of day/day of week response pattern.

Figure 40:
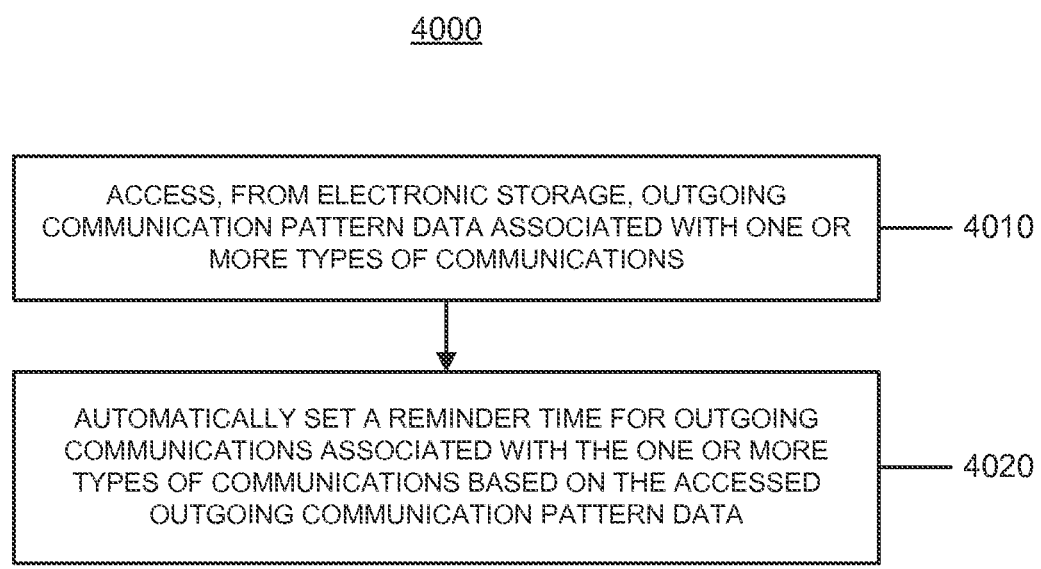

FIG. 40 illustrates an example of a process 4000 for automatically setting a reminder time for outgoing communications. The process 4000 is similar to the process 500, except that the process 4000 deals with setting a reminder to send any type of outgoing communication based on a user's past history of sending outgoing communications, rather than setting a reminder to respond to a communication based on a user's past history of responding to communications. The system 200 accesses, from electronic storage, outgoing communication pattern data associated with one or more types of communications (4010). For instance, the system 200 accesses, from electronic storage, outgoing communication pattern data associated with one or more types of communications using techniques similar to those discussed above with respect to reference numeral 530.

The system 200 automatically sets a reminder time for outgoing communications associated with the one or more types of communications based on the accessed outgoing communication pattern data (4020). The system 200 automatically sets a reminder time for outgoing communications associated with the one or more types of communications based on the accessed outgoing communication pattern data using techniques similar to those discussed above with respect to reference numeral 540. For instance, each time the user sends an outgoing communication of a particular type, the system 200 updates the outgoing communication pattern data associated with the particular type and automatically sets, based on the updated outgoing communication pattern data, a reminder time for a new reminder for outgoing communications associated with the particular type.

In some examples, the system 200 evaluates set reminders periodically. In these examples, the system 200 may evaluate set reminders every hour, every day (e.g., every twenty-four hours, once a week, etc.). The user may define the period/frequency the system 200 uses to evaluate set reminders and make a determination of whether an outgoing communication for a particular type of communication pattern is overdue. Different periods/frequencies may be used for different types of communications (e.g., sender-based reminders may be evaluated more frequently than content-based reminders).

In some implementations, the system 200 evaluates set reminders in response to an event. In these implementations, the system 200 may access the evaluate set reminders when (e.g., each time) the user initiates use of a communication system (e.g., logs into, accesses over a network, launches on a Local device, etc.). In addition, the system 200 may evaluate set reminders when (e.g., each time) the user initiates a new communication (e.g., activates a new email button, dials a telephone number, etc.) or the user begins to send any type of outgoing communication (e.g., activates a respond email button, activates a forward email button, etc.).

Figure 41:
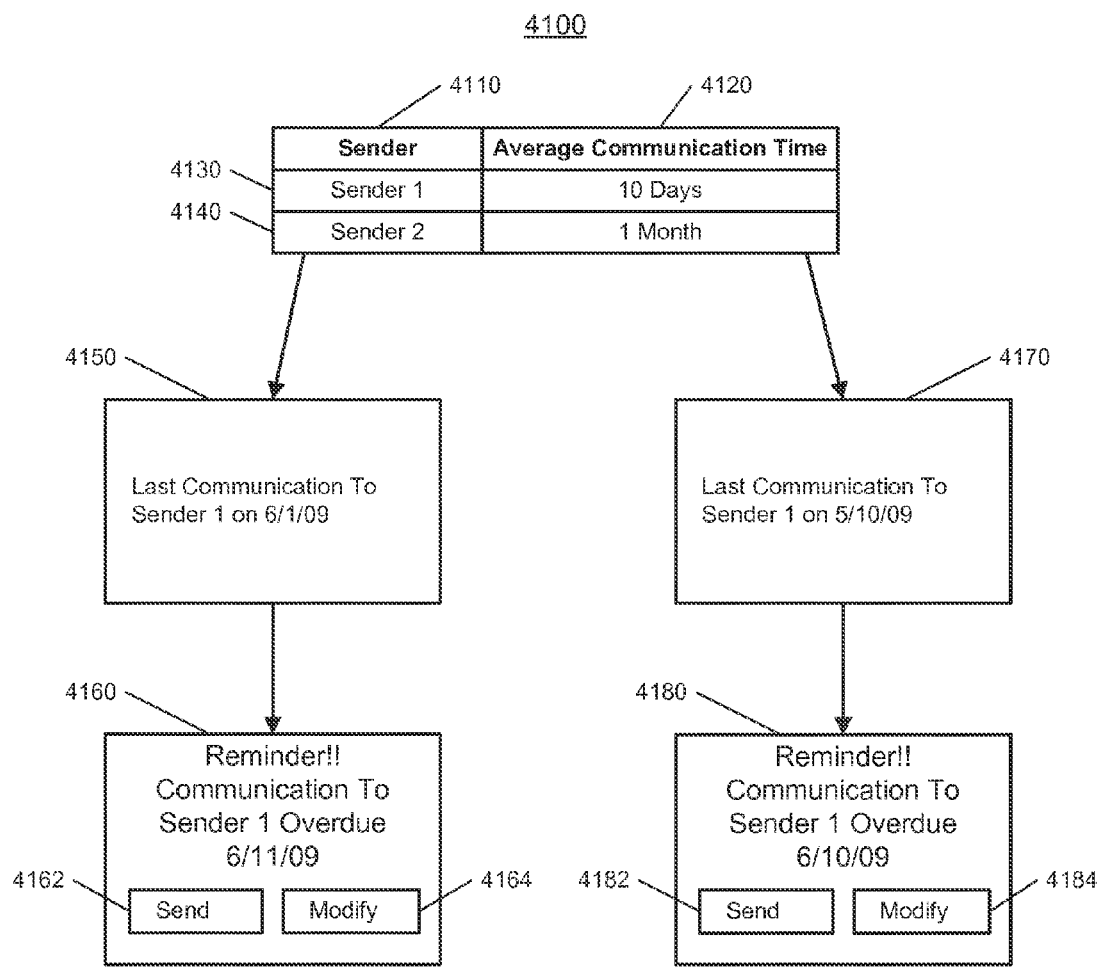

FIG. 41 illustrates an example 4100 of setting an outgoing communication reminder based on a sender type. As shown, the example 4100 includes tracked outgoing communication pattern data that has a sender column 4110 and an average communication time column 4120. The sender column 4110 includes data identifying senders of communications to which a user has communicated with in the past. The average communication time column 4120 includes data indicating an average time (e.g., period) between past outgoing communications the user has sent to the corresponding sender in the sender column 4110. In the example 4100, the tracked outgoing communication pattern data includes a first row 4130 indicating that the user sends outgoing communications to Sender I on average every ten days. The tracked outgoing communication pattern data also includes a second row 4140 indicating that the user sends outgoing communications to Sender 2 on average every month. Although the tracked outgoing communication pattern data includes two rows for ease of explanation, the tracked outgoing communication pattern data may include more rows and data corresponding to many different senders.

In one example, the system 200 determines 4150 that the last communication the user sent to Sender I was on Jun. 1, 2009. In this example, because the last communication the user sent to Sender I was on Jun. 1, 2009 and the user sends outgoing communications to Sender I on average every ten days, the system 200 provides an outgoing communication reminder 4160 related to Sender I to the user on Jun. 11, 2009. The reminder 4160 includes a reminder portion that indicates that an outgoing communication to Sender 1 is overdue, a send interface control 4162, and a modify interface control 4164. The send interface control 4162 enables the user to send a communication to Sender I (e.g., by displaying a send communication interface, such as a new email composition interface that includes an email address of Sender 1) when the user selects the send interface control 4162 (e.g., using a mouse to select the send interface control 4162). The modify interface control 4164 enables the user to modify the reminder 4160 (e.g., by displaying a modify reminder interface) when the user selects the modify interface control 4164 (e.g., using a mouse to select the modify interface control 4164). For instance, the user may use a modify reminder interface to extend the reminder time associated with the reminder 4160 (e.g., snooze the reminder 4160) or to cancel the reminder 4160. Other examples may provide a different combination (e.g., a subset) of the information provided in the reminder 4160 or other information that effectuates a reminder to the user.

In another example, the system 200 determines 4170 that the last communication the user sent to Sender 2 was on May 10, 2009 In this example, because the last communication the user sent to Sender 2 was on May 10, 2009 and the user sends outgoing communications to Sender 2 on average every month, the system 200 provides an outgoing communication reminder 4180 related to Sender 2 to the user on Jun. 10, 2009. The reminder 4180 includes a reminder portion that indicates that an outgoing communication to Sender 2 is overdue, a send interface control 4182, and a modify interface control 4184. The send interface control 4182 is similar to the send interface control 4162 and the modify interface control 4184 is similar to the modify interface control 4164.

Any of the techniques or interfaces described throughout this disclosure as being applicable to responses to communications and reminders for responding to communications may be applied to outgoing communications and reminders for sending outgoing communications. For instance, techniques similar to those described with respect to process 1600, process 2100, process 3000 may be applied in the context of outgoing communications.

The described systems, methods, and techniques may be implemented in digital electronic circuitry, computer hardware, or in combinations of these elements and software. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of nonvolatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

It will be understood that various modifications may be made. For example, other useful implementations still could be achieved if steps of the disclosed techniques were performed in a different order and/or if components in the disclosed systems were combined in a different manner and/or replaced or supplemented by other components. Accordingly, other implementations are within the scope of the following claims.

What is claimed is:

1. A method comprising:
   at a receiving device comprising one or more processors and a memory storing one or more programs for execution by the one or more processors:
   receiving a first electronic message addressed to a particular user, from a sender;
   making the first electronic message available to the particular user; and
   in accordance with a determination that the particular user has not responded to the first electronic message, alerting the particular user, at a predefined time, to the first electronic message; wherein
   the predefined time is determined based at least in part on response pattern data corresponding to a portion of the content of the first electronic message; and
   the portion of the content based on which the predefined time is generated is selected without human intervention.

2. The method of claim 1, wherein the response pattern data includes
   a time or a date of the receipt of the first electronic message.

3. The method of claim 1, wherein the response pattern data includes
   an identity of the first sender.

4. The method of claim 1, wherein the response pattern data includes:
   type information of the receiving device;
   priority information of the first electronic message;
   a medium of the first electronic message; and
   a size of the first electronic message.

5. The method of claim 1, wherein the response pattern data further includes:
   information indicating whether the sender belongs to a sender group, and,
   when the sender belongs to the sender group, an identity of the sender group.

6. The method of claim 1, wherein the first electronic message is also addressed to one or more other recipients distinct from the particular user, and wherein the response pattern data further includes:
   one or more identities of the other recipients; and
   an address line that indicates whether the first electronic message is directly addressed to, or copied to the particular user.

7. The method of claim 1, wherein the first electronic message is received by the particular user, along with one or more other electronic messages, as a part of a message string, and wherein the response pattern data further includes:
   history information of the message string, and
   response pattern data associated with a respective electronic message, distinct from the first electronic message, in the message string.

8. A system comprising:
   one or more processors;
   memory; and
   one or more programs, wherein the one or more programs are stored in the memory and configured to be executed by the one or more processors, the one or more programs including instructions for:
   receiving a first electronic message addressed to a particular user, from a sender;
   making the first electronic message available to the particular user; and
   in accordance with a determination that the particular user has not responded to the first electronic message, alerting the particular user, at a predefined time, to the first electronic message; wherein
   the predefined time is determined based at least in part on response pattern data corresponding to a portion of the content of the first electronic message; and
   the portion of the content based on which the predefined time is generated is selected without human intervention.

9. The system of claim 8, wherein the response pattern data includes
   a time or a date of the receipt of the first electronic message.

10. The system of claim 8, wherein the response pattern data includes
    an identity of the sender.

11. The system of claim 8, wherein the response pattern data includes:
    type information of the receiving device;
    priority information of the first electronic message;
    a medium of the first electronic message; and
    a size of the first electronic message.

12. The system of claim 8, wherein the response pattern data further includes:
    information indicating whether the sender belongs to a sender group, and,
    when the sender belongs to the sender group, identity of the sender group.

13. The system of claim 8, wherein the first electronic message is also addressed to one or more other recipients distinct from the particular user, and wherein the response pattern data further includes:
   one or more identities of the other recipients; and
   an address line that indicates whether the first electronic message is directly addressed to, or copied to the particular user.

14. The system of claim 8, wherein the first electronic message is received by the particular user, along with one or more other electronic messages, as a part of a message string, and wherein the response pattern data further includes:
   history information of the message string, and
   response pattern data associated with a respective electronic message, distinct from the first electronic message, in the message string.

15. A non-transitory computer readable storage medium storing one or more programs, the one or more programs comprising instructions, which when executed by a computer system with one or more processors, cause the computer system to:
   receive a first electronic message addressed to a particular user, from a first sender;
   make the first electronic message available to the particular user; and
   in accordance with a determination that the particular user has not responded to the first electronic message, alert the particular user, at a predefined time, to the first electronic message; wherein
      the predefined time is determined based at least in part on response pattern data corresponding to a portion of the content of the first electronic message; and
      the portion of the content based on which the predefined time is generated is selected without human intervention.

16. The non-transitory computer readable storage medium of claim 15, wherein the response pattern data includes
   a time or a date of the receipt of the first electronic message.

17. The non-transitory computer readable storage medium of claim 15, wherein the response pattern data includes
   an identity of the sender.

18. The non-transitory computer readable storage medium of claim 15, wherein the response pattern data includes:
   type information of the receiving device;
   priority information of the first electronic message;
   a medium of the first electronic message; and
   a size of the first electronic message.

19. The non-transitory computer readable storage medium of claim 15, wherein the response pattern data further includes:
   information indicating whether the sender belongs to a sender group, and,
   when the first sender belongs to the sender group, an identity of the sender group.

20. The non-transitory computer readable storage medium of claim 15, wherein the first electronic message is also addressed to one or more other recipients distinct from the particular user, and wherein the response pattern data further includes:
   one or more identities of the other recipients; and
   an address line that indicates whether the first electronic message is directly addressed to, or copied to the particular user.

21. The non-transitory computer readable storage medium of claim 15, wherein the first electronic message is received by the particular user, along with one or more other electronic messages, as a part of a message string, and wherein the response pattern data further includes:
   history information of the message string, and
   response pattern data associated with a respective electronic message, distinct from the first electronic message, in the message string.

* * * * *